(12) United States Patent
Bohannon et al.

(10) Patent No.: US 7,908,264 B2
(45) Date of Patent: Mar. 15, 2011

(54) METHOD FOR PROVIDING THE APPEARANCE OF A SINGLE DATA REPOSITORY FOR QUERIES INITIATED IN A SYSTEM INCORPORATING DISTRIBUTED MEMBER SERVER GROUPS

(75) Inventors: James John Bohannon, Pleasanton, CA (US); Greg Michael Wolfe, San Francisco, CA (US)

(73) Assignee: Mypoints.com Inc., San Francisco, CA (US)

( * ) Notice: Subject to any disclaimer, the term of this patent is extended or adjusted under 35 U.S.C. 154(b) by 1010 days.

(21) Appl. No.: 11/691,923

(22) Filed: Mar. 27, 2007

(65) Prior Publication Data

US 2007/0260611 A1    Nov. 8, 2007

Related U.S. Application Data

(60) Provisional application No. 60/797,340, filed on May 2, 2006.

(51) Int. Cl.
G06F 7/00 (2006.01)
G06F 17/30 (2006.01)

(52) U.S. Cl. ............ 707/713; 707/714; 707/716; 726/1; 726/4

(58) Field of Classification Search .......... 707/600–831, 707/899, 999.001–999.206
See application file for complete search history.

(56) References Cited

U.S. PATENT DOCUMENTS

| | | | |
|---|---|---|---|
| 5,802,518 A * | 9/1998 | Karaev et al. ................. 1/1 |
| 2002/0116362 A1* | 8/2002 | Li et al. ...................... 707/1 |
| 2003/0041147 A1* | 2/2003 | van den Oord et al. ....... 709/227 |
| 2003/0046311 A1* | 3/2003 | Baidya et al. ............... 707/200 |
| 2003/0182463 A1* | 9/2003 | Valk ........................... 709/310 |
| 2004/0088405 A1* | 5/2004 | Aggarwal ................... 709/224 |
| 2004/0133677 A1* | 7/2004 | Paul et al. .................. 709/225 |
| 2004/0172385 A1* | 9/2004 | Dayal ......................... 707/3 |
| 2005/0080657 A1* | 4/2005 | Crow et al. ................... 705/8 |
| 2005/0210008 A1* | 9/2005 | Tran et al. .................... 707/3 |
| 2005/0228788 A1* | 10/2005 | Dahn et al. ................... 707/3 |
| 2006/0075120 A1* | 4/2006 | Smit ......................... 709/227 |
| 2006/0129540 A1* | 6/2006 | Hillis et al. ................... 707/3 |
| 2006/0149724 A1* | 7/2006 | Ritter et al. .................. 707/4 |
| 2006/0161528 A1* | 7/2006 | Dettinger et al. .............. 707/3 |
| 2006/0167829 A1* | 7/2006 | Dreyfus et al. ............... 707/1 |
| 2006/0167931 A1* | 7/2006 | Bobick et al. .............. 707/102 |
| 2006/0224562 A1* | 10/2006 | Yan et al. ................... 707/2 |
| 2006/0265489 A1* | 11/2006 | Moore ...................... 709/223 |
| 2006/0294199 A1* | 12/2006 | Bertholf .................... 709/217 |

* cited by examiner

Primary Examiner — Mohammad Ali
Assistant Examiner — Angelica Ruiz
(74) Attorney, Agent, or Firm — Marshall, Gerstein & Borun LLP

(57) ABSTRACT

Queries to an enterprise data system based on discrete groups of servers may display the sets of data satisfying a query as if the query results originated from a single data repository. Further, queries within the system may efficiently search through a large set of satisfying records while accounting for data latency or system performance.

13 Claims, 29 Drawing Sheets

744

```
My Account at MyPoints - Mozilla Firefox
File Edit View Go Bookmarks Tools Help
Back Forward Reload Stop Home   https://www.mypoints.com/emp/u/member/accountStatement3M.nm
▲ My Account at MyPoints
```

Do you or someone in your household occasionally suffer from:
○ Heartburn
○ Acid Reflux Disease (ARD)
○ Gastroesophageal Reflux Disease (GERD)
○ None of the above

[Next]

Frequently Asked Account Questions (?)
1. What are pending Points?
2. What do I do if I think my Point Balance is incorrect?
3. How soon are Points credited to My Account after I earn them?
4. When I make a purchase through MyPoints, will I earn Points for tax and shipping and handling?

Transactions for the 3 months of March 01, 2006 to May 31, 2006    | Show Weekly View |
hide detail

| Activity Type | Date | Transaction Details | Point Amount | $Amount | Status |
|---|---|---|---|---|---|
| Clickthru | 04-26-06 | RealAge.com April BonusMail | | | |
| Earn | 04-26-06 | RealAge.com April BonusMail | +5 points | | |
| Clickthru | 04-12-06 | My Exclusive Offers - April | | | |
| Clickthru | 04-10-06 | Prevacid Web Poll | | | |
| Clickthru | 04-10-06 | Prevacid Web Poll | | | |
| Earn | 04-10-06 | Prevacid Web Poll | +10 points | | |
| Clickthru | 04-03-06 | MyPoints Travel Center Hotel Reservation -- Search | | | |
| Clickthru | 04-03-06 | MyPoints Travel Center Hotel Reservation -- Search | | | |
| Clickthru | 04-03-06 | MyPoints Travel Center Hotel Reservation -- Search | | | |
| Clickthru | 04-03-06 | MyPoints Travel Center Hotel Reservation -- Search | | | |
| Clickthru | 04-03-06 | MyPoints Travel Center Hotel Reservation -- Search | | | |
| Clickthru | 04-03-06 | MyPoints Travel Center | | | |
| Clickthru | 03-29-06 | Book Center Web Poll | | | |
| Earn | 03-29-06 | Book Center Web Poll | +5 points | | |
| Clickthru | 03-23-06 | MyPoints Rewards Visa | | | |
| Clickthru | 03-23-06 | $10 Starbucks Card - Clickthru | | | |
| Clickthru | 03-23-06 | $10 Starbucks Card - Clickthru | | | |
| Clickthru | 03-22-06 | Omaha Steaks March BonusMail | | | |
| Earn | 03-22-06 | Omaha Steaks March BonusMail | +5 points | | |
| Clickthru | 03-18-06 | Prevacid LeadGen Questionaire March BonusMail | | | |
| Earn | 03-18-06 | Prevacid LeadGen Questionaire March BonusMail | +10 points | | |
| Clickthru | 03-18-06 | Prevacid LeadGen Questionaire March BonusMail | | | |
| Clickthru | 03-06-06 | MyPoints Games | | | |
| Clickthru | 03-06-06 | MyPoints Games | | | |
| Clickthru | 03-06-06 | LendingTree March BonusMail | | | |
| Earn | 03-06-06 | LendingTree March BonusMail | +5 points | | |

Done

Member Information -- MyPoints Admin EMP - Mozilla Firefox
File Edit View Go Bookmarks Tools Help Back Forward Reload Stop Home  https://www.mypoints.com/emp/u/member/accountStatement3M.nm  Go ▲ My Account at MyPoints respond to questions
view profile

Change Member Status
from Open
to [--choose--▼] [change]

Freeze Account
from Open
[Freeze due to large purchases]
[Freeze due to fraud]

Close Account
from Open
[Close Due to Fraud]
[Close on Member Request]

Change Member email address
from davidrosen@hotmail.com
to [         ]
[Change]

Fraud Handling
[Set Purchase Fraud Flag] [Clear Purchase Fraud Flag]
[Set Duplicate Fraud Flag] [Clear Duplicate Fraud Flag]
[Grant Immunity to Purchase Fraud Freezinng]

Pending Points
as of 05-08-06: +75 points=> 32167 points available
as of 05-13-06: +1196 points=> 33363 points available
as of 05-18-06: +10 points=> 33373 points available
as of 06-01-06: +250 points=> 33623 points available
view with: [no transactions] [1 week of transactions] [3 months of transactions] [6months of transactions]

Transaction Details
Transaction in period: <-earlier-week- April 30,2006 to May 06, 2006
hide trivial

| Type | Id | Member Services Rep | Posted Date | Description | Points | Notes |
|---|---|---|---|---|---|---|
| Clickthru | 576742227313444317 | | 05-01-06 | United Airlines Shopping | | ip: 205.245.170.147 |
| Purchase | 5778681272463121084 | | 05-01-06 | United Airlines Shopping | | +$266.60 |
| Earn | 577305177292890773 | | 05-01-06 | United Airlines Shopping | +250 points | pending until June 01, 2006 |
| >>>>> | | Providian MyPoints Rewards Visa Web Offer Click | | | | |
| Action | 577868127246264603 | | 05-01-06 | Providian MyPoints Rewards Visa Web Offer Click | | |
| Earn | 577305177292843294 | | 05-01-06 | Providian MyPoints Rewards Visa Double Points Bonus+2032 points | | |
| See all related transactions | | | | | | |
| Clickthru | 576742227313401888 | | 05-01-06 | ISP Center Web Poll | | ip: 205.245.170.147 |
| Clickthru | 576742227313401887 | | 05-01-06 | ISP Center Web Poll | | ip: 205.245.170.147 |
| Clickthru | 576742227313398253 | | 05-01-06 | My Exclusive Offers - April Reminder | | ip: 205.245.170.147 |

744 ⟵

Point Adjustments by Transaction Id
Target click transaction id: [         ]
[next]

Point Adjustments by Cell Id
Cell id: [         ]
[next]

Goodwill Point Adjustments
[next]

Transfer Points
From Member id: [         ]
From Member email: [         ]
[next]

Done | emp.mypoints.com

Member Information: transaction thread detail -- MyPoints Admin EMP - Mozilla Firefox

File Edit View Go Bookmarks Tools Help

Back Forward Reload Stop Home  https://emp.mypoints.com/emp/a/mc/member/viewThread.vm?member=664567978&thread=576742227282104316

▲ Member Information: transaction thr...

Members                                                                                    Logout  Admin Tool Find Another Member
Member Email: begins with [▼]
Transaction thread detail Information for David Rosen   Member ID: equals [▼]
[List]

creation date July 08, 2003
first name
last name
email                              bm
silo      S8 member status Open
member id back to transactions

Transaction Details

| Type | Id | Member Services Rep | Post Date | Description | Points | Notes |
|---|---|---|---|---|---|---|
| Clickthru | 576742227282104316 | | 08-22-05 | Providian MyPoints Rewards Visa Web Offer Click | | ip: 255.255.255.129 |
| Purchase | 577023702266720820 | | 09-26-05 | Providian MyPoints Rewards Visa Web Offer Click | | +$0.00 (purchase on 09-21-05) |
| Earn | 577305177243431478 | | 09-26-05 | Providian MyPoints Rewards Visa Activation | +1000 points | |
| Purchase | 577868127196852795 | | 09-26-05 | Providian MyPoints Rewards Visa Web Offer Click | | +$161.00 (purchase on 09-21-05) |
| Action | 577023702266720825 | | 09-26-05 | Providian MyPoints Rewards Visa Web Offer Click | | 0 : no job rule for 'Generic Offline B' (action on 09-21-05) |
| Purchase | 577023702266720826 | | 09-26-05 | Providian MyPoints Rewards Visa Web Offer Click | | +$0.00 (purchase on 09-21-05) |
| Earn | 577305177243431484 | | 09-26-05 | Providian MyPoints Rewards Visa Purchase | +161 points | |
| Action | 577868127199827775 | | 10-12-05 | Providian MyPoints Rewards Visa Web Offer Click | | (action on 10-11-05) |
| Earn | 577305177246406464 | | 10-12-05 | Providian MyPoints Rewards Visa Double Points Bonus | +161 points | |
| Purchase | 577868127204002225 | | 10-31-05 | Providian MyPoints Rewards Visa Web Offer Click | | +$0.00 (purchase on 10-22-05) |
| Action | 577868127205848665 | | 11-10-05 | Providian MyPoints Rewards Visa Web Offer Click | | |
| Earn | 577305177252427354 | | 11-10-05 | Providian MyPoints Rewards Visa Double Points Bonus | +287 points | |
| Purchase | 577868127209204477 | | 11-23-05 | Providian MyPoints Rewards Visa Web Offer Click | | +$69 |
| Earn | 577305177255783166 | | 11-23-05 | Providian MyPoints Rewards Visa Purchase | +69 points | |
| Purchase | 577868127217644991 | | 12-24-05 | Providian MyPoints Rewards Visa Web Offer Click | | +$311.00 (purchase on 12-23-05) |
| Earn | 577305177264223680 | | 12-24-05 | Providian MyPoints Rewards Visa Purchase | +311 points | |
| Action | 577023702288922962 | | 01-03-06 | Providian MyPoints Rewards Visa Web Offer Click | | |
| Earn | 577305177265633624 | | 01-03-06 | Providian MyPoints Rewards Visa Double Points Bonus | +879 points | |
| Purchase | 577868127223769334 | | 01-26-06 | Providian MyPoints Rewards Visa Web Offer Click | | +$11.00 (purchase on 01-25-06) |
| Earn | 577305177270348023 | | 01-26-06 | Providian MyPoints Rewards Visa Purchase | +11 points | |
| Action | 577868127225189628 | | 02-01-06 | Providian MyPoints Rewards Visa Web Offer Click | | |
| Earn | 577305177271768318 | | 02-01-06 | Providian MyPoints Rewards Visa Double Points Bonus | +822 points | |
| Purchase | 577868127230368017 | | 02-23-06 | Providian MyPoints Rewards Visa Web Offer Click | | +$0.00 (purchase on 02-22-06) |
| Purchase | 577868127237830769 | | 03-25-06 | Providian MyPoints Rewards Visa Web Offer Click | | +$92.00 (purchase on 03-24-06) |
| Earn | 577305177284409458 | | 03-25-06 | Providian MyPoints Rewards Visa Purchase | +92 points | |
| Action | 577868127239514979 | | 04-02-06 | Providian MyPoints Rewards Visa Web Offer Click | | |
| Earn | 577305177286093668 | | 04-02-06 | Providian MyPoints Rewards Visa Double Points Bonus | +1419 points | |
| Purchase | 577868127244263040 | | 04-23-06 | Providian MyPoints Rewards Visa Web Offer Click | | +$8.00 (purchase on 04-22-06) |
| Earn | 577305177290841729 | | 04-23-06 | Providian MyPoints Rewards Visa Purchase | +8 points | |
| Action | 577868127246264603 | | 05-01-06 | Providian MyPoints Rewards Visa Web Offer Click | | |
| Earn | 577305177292843294 | | 05-01-06 | Providian MyPoints Rewards Visa Double Points Bonus | +2032 points | |

Done                                                                                       emp.mypoints.com

Member Services Request  Page 1 of 1

☺ Refer-a-Friend  👤 Help/FAQs  ☑ My Account

MyPoints
Rewards You!

Welcome, Randall!! (Not Randall? Please Sign In)
You have 215 Points

My Home Page   Shopping   Mother's Day   Easy Points   Great Deals

Privacy Policy | FAQs | My Account | My Points rewards Visa

Welcome to MyPoints...the internet's smartest shopping program! It's FREE...and easy as 1-2-3...learn more >>

Member Services Request:

[Select by Category ▼]
[Select by Merchant ▼]

The following information will be available to the Member Services Representative when they view your correspondence:

Activity Type   Date   Transaction Details   Points   $ Amount   Status

Clickthru  04-27-06  Got Voice April v.1 BonusMail

Please enter your Question here

[                                                    ]

| Tell Us ☐ |
| What's New |

Complete this questionnaire and earn 100 Points (Once)
Do you or someone in your household occasionaly suffer from:

○ Heartburn
○ Acid Reflux Desease (ARD)
○ Gastroesophageal Reflux Desease (GERD)
○ None of the above

[Next]

Help Center

FAQs
 Contact Member Services
 My Account
 Privacy and Security

Reason
[Select Issue ▼]
Additional Contact Information
[        ]
[Submit]

AdjustPoints -- MyPoints Admin EMP - Mozilla Firefox

File Edit View Go Bookmarks Tools Help

Back Forward Reload Stop Home  https://www.mypoints.com/emp/a/mc/member/transactions.vm?member ▲ AdjustPoints -- MyPoints Admin EMP Home Clients Campaigns Tools Members Fulfillment Reports
Businesses|Contracts|Plans|Jobs|Cells|Email Tasks|Blocks|Ads|SKUs|Inventory|Pending Fulfillments|Members User:
Role: Root
Logout Admin Tool
MyPoints

Point Adjustments

Member Id:
Click Id: 576742227282104316
Click Date: 08-22-05
Conversion Id: 577023702314131071
Total Purchase: 8.0
Cell Id: 51888
Cell Description: Providian MyPoints Rewards Visa Web Offer Click
Trigger: Generic Offline C -> Providian MyPoints Rewards Visa Purchase
Action Date: April 22 2006
Merchant Name: 50322
Merchant Order Id: 1819377873426517419
Amount:
[next]

Done  emp.mypoints.com

Member Information -- MyPoints Admin EMP - Mozilla Firefox

File Edit View Go Bookmarks Tools Help https://www.mypoints.com/emp/a/mc/member/transactions.vm?member=

▲ Member Information -- MyPoints Ad...

sign-up cell: FastWeb.com Offline Enrollment Campaign FastWeb.com Offline Enrollment CAMPAIGN_ID=20947
member id
member Vuser Data: -LoyaltyUserLogin (For BE: 1) [last modified: 2005-07-23 00:00:00.0]
enabled - skillJamEnabled (For BE: 1) [last modified: 2006-03-19 13:10:09.0]
TMY2525315 (For BE: 52624) [last modified: 2006-03-03 13:53:26.0]
respond to questions
view profile

Freeze Account — from Open — [Freeze due to large purchases] [Freeze due to fraud]

Close Account — from Open — [Close Due to Fraud] [Close on Member Request]

Change Member email address — from [ ]otmail.com to [ ] [Change]

Fraud Handling — [Set Purchase Fraud Flag] [Clear Purchase Fraud Flag] [Set Duplicate Fraud Flag] [Clear Duplicate Fraud Flag] [Grant Immunity to Purchase Fraud Freezing]

Change Member Status — from Open to [--choose--▼] [change]

Pending Points as of 05-30-06: +450 points => 2458 points available
view with: [no transactions] [1 week of transactions] [3 months of transactions] [6 months of transactions]

Transaction Details

Transaction in period: <-earlier-week- April 30, 2006 to May 06, 2006
hide trivial

| Type | Id | Member Services Rep | Posted Date | Description | Points | Notes |
|---|---|---|---|---|---|---|
| Clickthru | 648799821351671464 | | 05-01-06 | Boca Java May BonusMail | | ip: 70.110.2.101 |
| Clickthru | 648799821351671424 | | 05-01-06 | Boca Java May BonusMail | | ip: 70.110.2.101 |
| Earn | 649362771331224500 | | 05-01-06 | Boca Java May BonusMail | +5 points | |
| >>>>> | 1-800-Contacts Web | | | | | |
| Purchase | 649925721284412306 | arun@sifycorp.com* | 04-30-06 | 1-800-Contacts Web | | +$104.75 (purchase on 03/29/06) |
| Earn | 649362771330990995 | arun@sifycorp.com* | 04-30-06 | 1-800-Contacts Web | +500 points | |
| See all related transactions | | | | | | |

* indicated a member services adjustment.

Point Adjustments by Transaction Id
Target click transaction id: [ ]
[next]

Point Adjustments by Cell Id
Cell id: [ ]
[next]

Goodwill Point Adjustments
[next]

Transfer Points
From Member id: [ ]
From Member email: [ ]
[next]

Done | emp.mypoints.com

*FIG. 23*

METHOD FOR PROVIDING THE APPEARANCE OF A SINGLE DATA REPOSITORY FOR QUERIES INITIATED IN A SYSTEM INCORPORATING DISTRIBUTED MEMBER SERVER GROUPS

RELATED APPLICATION DATA

This application is related to U.S. Provisional Application Ser. No. 60/797,340, which was filed on May 2, 2006.

TECHNICAL FIELD

This relates generally to a large-population information management system and, more particularly, to a system for tracking activity using the World Wide Web as a conduit for rewarding on-line and off-line activity based on specific user actions.

BACKGROUND

Users of the World Wide Web distributed computing environment may freely send and retrieve data across long distances and between remote computing devices. The Web, implemented on the Internet, presents users with documents called "web pages" that may contain information as well as "hyperlinks" which allow the users to select and connect to related web sites. The web pages may be stored on remote computing devices, or servers, as hypertext-encoded files. The servers use Hyper Text Transfer Protocol (HTTP), or other protocols to transfer the encoded files to client users. Many users may remotely access the web sites stored on network-connected computing devices from a personal computer (PC) through a browser application running on the PC.

The browser application may act as an interface between user PCs and remote computing devices and may allow the user to view or access data that may reside on any remote computing device connected to the PC through the World Wide Web and browser interface. Typically, the local user PC and the remote computing device may represent a client and a server, respectively. Further, the local user PC or client may access Web data without knowing the source of the data or its physical location and publication of Web data may be accomplished by simply assigning to data a Uniform Resource Locator (URL) that refers to the local file. To a local client, the Web may appear as a single, coherent data delivery and publishing system in which individual differences between other clients or servers may be hidden.

A system may provide web site proprietors with web site user demographics information and is generally described in U.S. application Ser. No. 09/080,946, "DEMOGRAPHIC INFORMATION GATHERING AND INCENTIVE AWARD SYSTEM AND METHOD" to Bistriceanu et al., the entire disclosure of which is hereby incorporated by reference. Generally, the system may include users, web site proprietors or clients, and an enterprise system hosting a central web site. The users may register with the central web site and may earn "points" for performing specific on- or off-line tasks in exchange for disclosing their demographic information during registration. The users may then redeem their earned points at participating proprietors for merchandise or services. The central web site manages the system by performing a number of tasks including: maintaining all user demographic information, tracking user point totals, and awarding points according to specific, proprietor-defined rules.

BRIEF DESCRIPTION OF THE DRAWINGS

FIG. 14 illustrates a screenshot of an exemplary account statement thread;

FIG. 15 illustrates a screenshot of an exemplary account statement illustrating a link to a set of causally related transactions;

FIG. 16 illustrates a screenshot of an exemplary account statement illustrating transactions from FIG. 15;

FIG. 18 illustrates a screenshot of an exemplary account statement illustrating a pre-populated customer care inquiry form;

FIG. 21 is a screenshot of an exemplary account statement illustrating campaign rule details for a cell;

FIG. 22 is a screenshot of an exemplary account statement illustrating a particular item in a thread selected for an adjustment;

FIG. 23 is a screenshot of an exemplary account statement illustrating a member with an adjustment.

DETAILED DESCRIPTION

Figure 1:
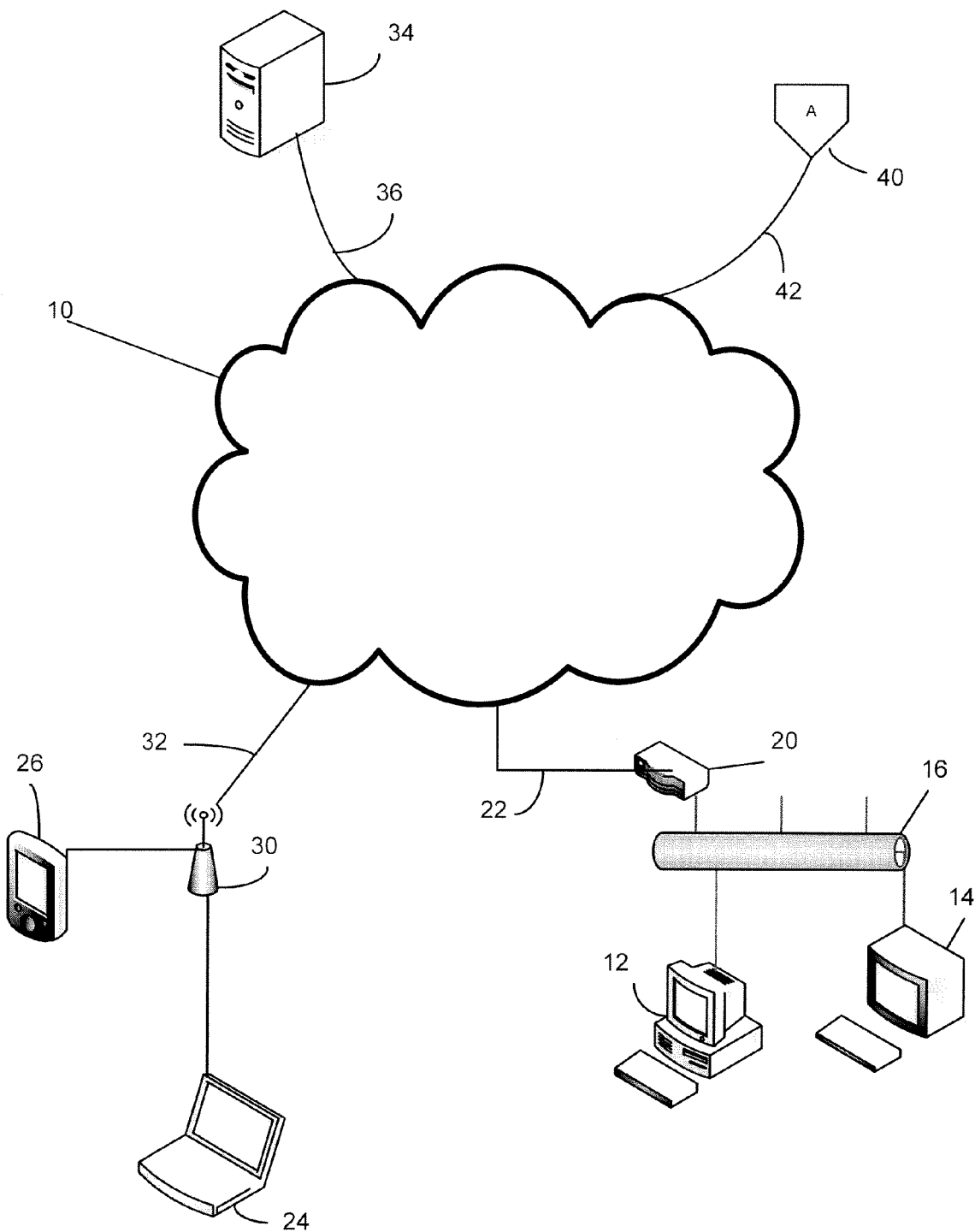
FIG. 1 is a diagram of one example of a network and network devices.

FIG. 1 illustrates an example of a network typical of the World Wide Web. A network 10 may be a virtual private network (VPN), or any other network that allows one or more computers, communication devices, databases, etc., to be communicatively connected to each other. The network 10 may be connected to a PC 12 and a computer terminal 14 via an Ethernet 16 and a router 20, and a land line 22. The network 10 may also be wirelessly connected to a laptop computer 24 and a personal data assistant 26 via a wireless communication station 30 and a wireless link 32. Similarly, a server 34 may be connected to the network 10 using a communication link 36. Also, an enterprise system 40 for awarding points to registered users in exchange for demographic information, as generally illustrated in FIGS. 3, 5, 7, and 8 may be connected to the network 10 using another communication link 42. Where the network 10 includes the Internet, data communication may take place over the network 10 via an Internet communication protocol. In operation, the client PC 12 may view or request data from any other computing device connected to the network 10. Further, the PC 12 may send data to any other computing device connected to the network 10.

Figure 2:
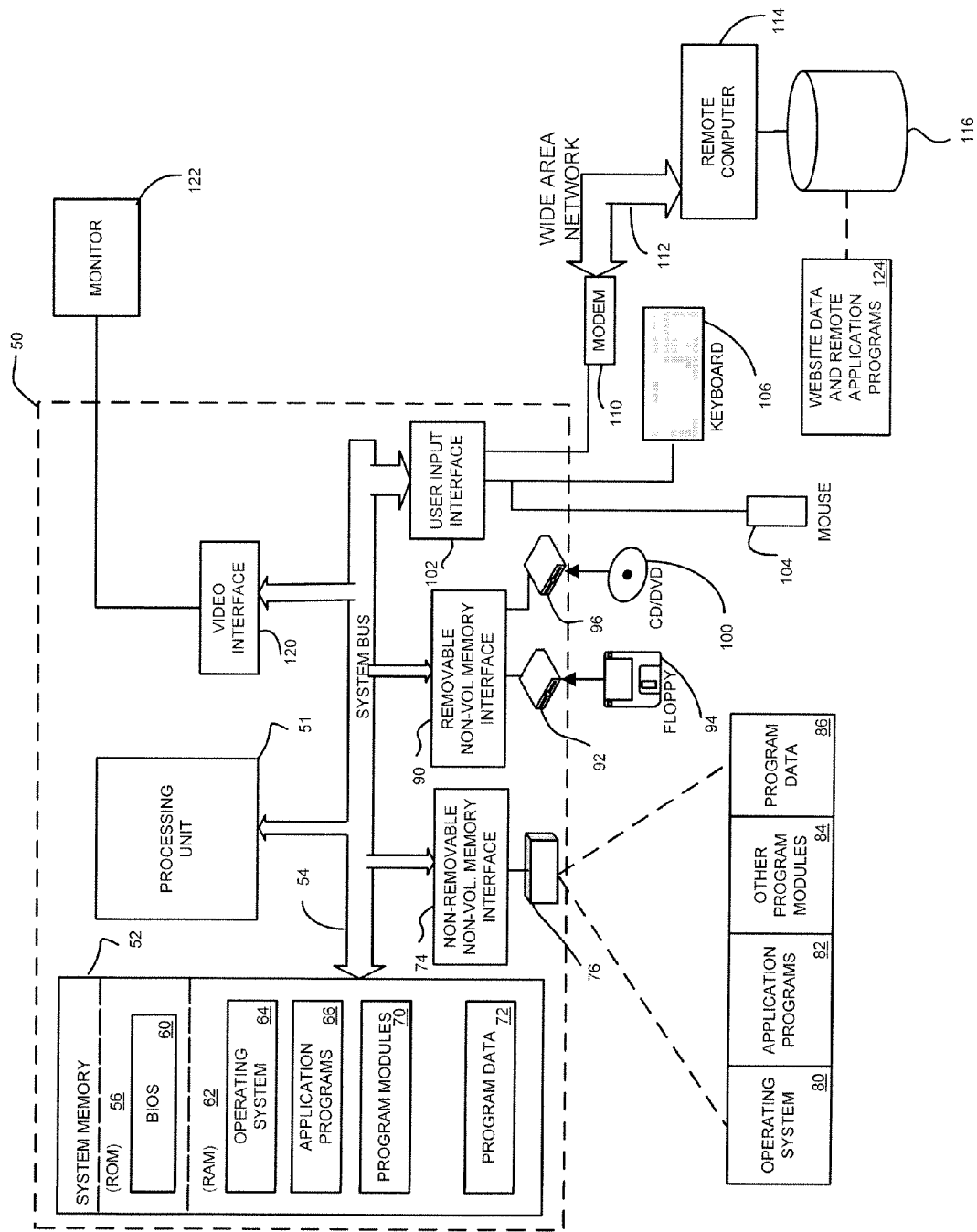
FIG. 2 is a diagram of one example of a general computing device that may operate in accordance with the claims.

FIG. 2 illustrates a typical computing device 50 that may be connected to the network 10 of FIG. 1 and participate in a distributed computing environment such as the World Wide Web. FIG. 2 may also be an example of an appropriate computing system on which the claimed apparatus and claims may be implemented, however, FIG. 2 is only one example of a suitable computing system and is not intended to limit the scope or function of any claim. The claims are operational with many other general or special purpose computing devices such as PCs 12, server computers 34, portable computing devices such as a laptop 24, consumer electronics 26, mainframe computers, or distributed computing environments that include any of the above or similar systems or devices.

With reference to FIG. 2, a system for implementing the steps of the claimed apparatus may include several general computing devices in the form of a computer 50. The computer 50 may include a processing unit, 51, a system memory, 52, and a system bus 54 that couples various system components including the system memory 52 to the processing unit 51. The system bus 54 may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The computer 50 may include an assortment of computer-readable media. Computer-readable media may be any media that may be accessed by the computer 50. By way of example, and not limitation, the media may include both volatile and nonvolatile media, removable and non-removable media. Media may also include computer storage media and communication media. Computer storage media may include volatile and nonvolatile, removable and non-removable media that stores information such as computer-readable instructions, program modules, data structures, or other data. Computer-storage media may include RAM, ROM, EEPROM, or other memory technology, optical storage disks, magnetic storage devices, and any other medium which may be used to store computer-accessible information. Communication media may be computer-readable instructions, data structures, program modules, or other data in a modulated data signal or other transport mechanism. Communication media may include wired media such as a wired network or direct-wired connection, and wireless media such as RF, infrared, and other wireless media.

The system memory 52 may include storage media in the form of volatile and/or non-volatile memory such as ROM 56 and RAM 62. A basic input/output system 60 (BIOS), containing algorithms to transfer information between components within the computer 50, may be stored in ROM 56. Data or program modules that are immediately accessible or are presently in use by the processing unit 51 may be stored in RAM 62. Data normally stored in RAM while the computer 50 is in operation may include an operating system 64, application programs 66, program modules 70, and program data 72.

The computer 50 may also include other storage media such as a hard disk drive 76 that may read from or write to non-removable, non-volatile magnetic media, a magnetic disk drive 251 that reads from or writes to a removable, non-volatile magnetic disk 94, and an optical disk drive 96 that reads from or writes to a removable, nonvolatile optical disk 100. Other storage media that may be used includes magnetic tape cassettes, flash memory cards, digital versatile disks, digital video tape, solid state RAM, and solid state ROM. The hard disk drive 76 may be connected to the system bus 54 through a non-removable memory interface such as interface 74. A magnetic disk drive 92 and optical disk drive 96 may be connected to the system bus 54 by a removable memory interface, such as interface 90.

The disk drives 92, 96 transfer computer-readable instructions, data structures, program modules, and other data for the computer 50 to different storage media 94, 100 for storage. A hard disk drive 76 may store an operating system 64, application programs 66, other program modules 70, and program data 72. These components may be the same or different from operating system 64, application programs 66, other program modules 70 and program data 72. The components associated with the hard disk drive 76 may be different copies than those associated with RAM 62.

The user may interact with the computer 50 through input devices such as a keyboard 106 or a pointing device 104 (i.e., a mouse). A user input interface 102 may be coupled to the system bus 54 to allow the input devices to communicate with the processing unit 51. A display device such as a monitor 122 may also be connected to the system bus 54 via a video interface 120.

The computer 50 may operate in a networked environment using logical connections to one or more remote computers 114. The remote computer 114 may be a PC 12, a server 34, a router 20, or other common network node as illustrated in FIG. 1. The remote computer 114 typically includes many or all of the previously-described elements regarding the computer 50, even though only a memory storage device 116 is illustrated in FIG. 2. Logical connections between the computer 50 and one or more remote computers 114 may include a wide area network (WAN) 112. A typical WAN is the Internet. When used in a WAN, the computer 50 may include a modem 110 or other means for establishing communications over the WAN. The modem 110 may be connected to the system bus 54 via the user input interface 102, or other mechanism. In a networked environment, program modules depicted relative to the computer 50, may be stored in the remote memory storage device 116. By way of example, and not limitation, FIG. 2 illustrates website data and remote application programs 124 as residing on the memory device 116. As may be appreciated, other means of establishing a communications link between the computer 50 and the remote computer 1140 may be used.

As previously described, the system may award users with redeemable points for many reasons, such as, in exchange for collecting and releasing user demographic information to proprietors or clients and for users taking any action associated with a "campaign," or set of rules negotiated by the proprietor. As used herein, a user or member may be any person, apparatus, method, or the like that employs a computing device 200 to access the system to earn redeemable points by completing proprietor-defined tasks in exchange for submitting and releasing demographic information to the system.

Further, as used herein, "demographic information" may be broadly construed and may include any kind of member descriptive data, any activity associated with a member, or any transaction associated with a member. Demographic information may be gathered by the system upon user registration in the form of a questionnaire designed to solicit various demographics data of interest to the proprietors. The questionnaire may be in the form of a website page or any other format able to collect demographics information from the user. Users may register in a variety of ways including direct registration at the central web site hosted by the enterprise system, registration through web site proprietors, a web based "refer-a-friend" program, third-party direct mailing, or other partner relationships. A user may need only to register with the system once. However, the user may earn additional points by completing future, supplementary questionnaires. Typical examples of information gathered by the questionnaires may be the user's age, income, occupation, etc. Further, the system may award a user for specific actions such as viewing web-based content, purchasing goods or services through a system-sponsored website, a proprietor's website, a proprietor's brick-and-mortar facility, or any other action associated with the system. The demographics information, to include but not limited to information gathered by questionnaire or records of any user action taken at the suggestion of or related to the system and a proprietor campaign, may be aggregated into a unique user profile. Once the user creates a profile, all future user activity within the system may be uniquely associated with the user's profile. A user may participate in the system by using a network 10 and a PC 12.

Further, as used herein, a proprietor or client may be any entity, corporation, web site manager, business owner, or the like that coordinates with the system by submitting a set of proprietor-defined award rules or tasks that a user may complete to earn redeemable points. The proprietor may also purchase user demographic information from the system and provide product price reductions or other benefits to users in exchange for user demographic information, or may complete any combination of these functions. This set of proprietor-defined rules or tasks may be called a "campaign." Each campaign may further include a template for e-mails to be sent by the system to targeted users. A proprietor may compensate the system for receiving the users' demographic information in a number of ways including: monthly sponsorship fees for the system displaying their offers on the central web site; per action fees when users follow specific actions provided to the system; per click fees for users clicking on hyperlinks provided in targeted e-mails advertising proprietor services or products and directing the user to a proprietor Web page; per e-mail delivery fees; advertisement placement within "newsletter" e-mails that the system may send to all system-registered users; and other fee combinations including indirect, agency relationships between proprietors and the system. Also, the system may compensate a proprietor for soliciting new memberships. The system may further automate billing clients based on a set billing rules within each campaign. The billing rules may be associated with award rules and user activity. For example, within a particular campaign, an award campaign rule may award a member two hundred points for making a single purchase with a proprietor. The campaign may also include a billing rule indicating that the proprietor may be billed at five percent one all purchases made by the member, even though only the first transaction awarded points. Also, a proprietor may customize its campaign to award a user points in a variety of methods. For example, a proprietor may choose the number of points to be awarded to users, may specify activities or questions that must be completed by the user before points are awarded, or may limit the frequency at which users can be awarded points for visiting the site. A proprietor may also dictate different user questionnaires during the registration process or may provide an additional questionnaire as a user task to be completed by the user to earn additional points.

Also, as used herein, the system may refer generally to the method or apparatus that coordinates user and proprietor functions by collecting user demographic information, awarding redeemable points to the users, tracking points for the users or proprietors, aggregating statistical information concerning user activity and the demographic information, maintaining the proper function of all user and proprietor activity, providing statistical and demographic information to the proprietors, sending targeted e-mail to the users, and executing any other management or coordination functions. The targeted e-mails may contain hyperlinks that direct users to proprietor offers that may award or redeem points to a specific user account. The system may be a collection of devices, typically general purpose computing devices 50, servers, 34, and data stores connected to and in communication with a user PC 12 through a network 10.

A system for collecting demographics information in exchange for awarding redeemable points may include a variety of structures and components as generally described in relation to FIGS. 3, 5, 7, and 8. Therefore, the system configurations described in relation to FIGS. 3, 5, 7, and 8 may include any combination of elements described in relation to each figure.

Figure 3:
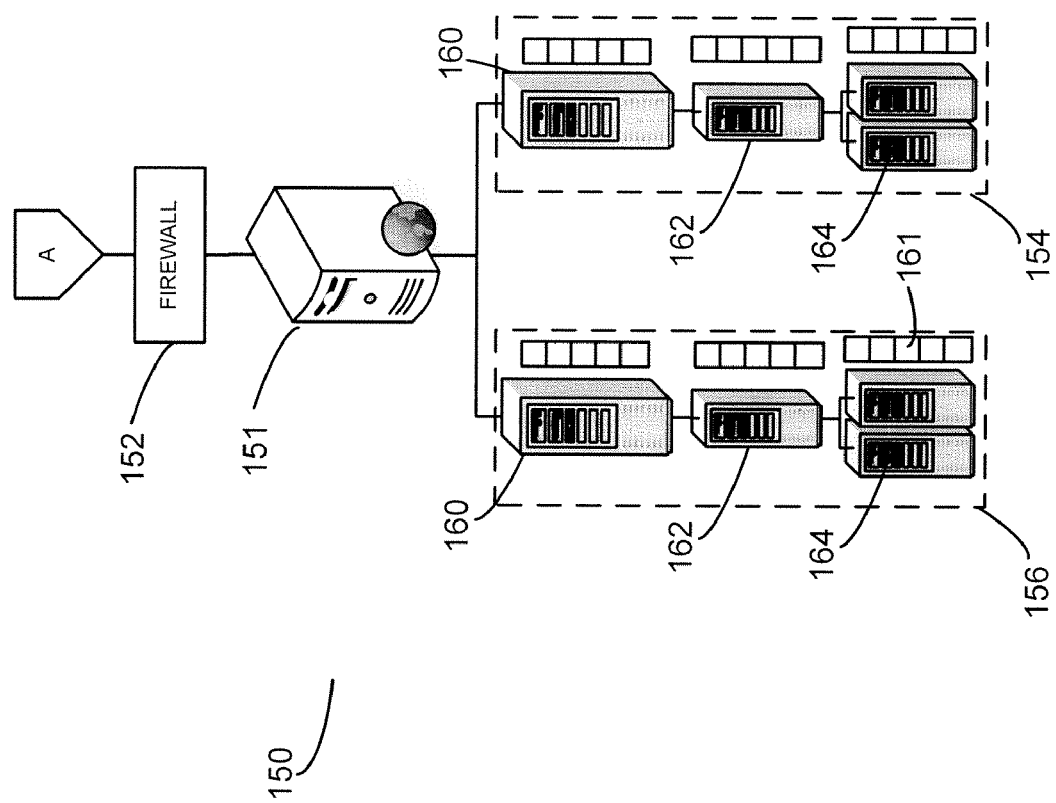
FIG. 3 is a diagram of one example of an enterprise system including two groups of servers, a web server, and a firewall as connected to the network of FIG. 1.

With reference to FIG. 3, the system 150 may include an architecture that is N-tier with a web server 151 in communication with a system firewall 152 through which a user may access a website hosted on the web server 151 by the system 150. The system firewall 152 may provide a secure, high-speed connection to a computer network such as the Internet as illustrated in FIG. 1. The web server 151 may face the users and communicate with a number of server groups or "silos" such as silo 154 and silo 156. A silo may be a conceptual collection of servers that work together through an application interface. Each silo may include, for example, an application server 160 that may execute a system application program 161.

With reference to FIG. 2 and FIG. 3, a system application program 161 running on the application server 160 may be an application program 66 or a remote application program 124 and may perform any coordination, transformation, or update process on the data entering or exiting the master data server 162. Further, a system application program 161 may execute on any general computing device 50 or any system 150 component. A system application program 161 running on the application server 160 may include, for example, any combination of an e-mail engine, a query engine, a validation engine, a crypto engine, an award engine, or a transaction engine.

Returning to FIG. 3, the application server 160 may communicate between the web server 151 and a master data server 162 to pass data from the web server 151 or to pass data generated by the system application programs 161 to the master data server 162 or any other system 150 element. The master data server 162 may include a portion of the total system 150 data, consisting of, for example, user demographic data, campaign data, and any other data used by the system 150. In turn, the master data server 162 may communicate with replication data servers 164. The replication data servers 164 may include a duplicate copy of the user profile data assigned to the silos 154, 156.

The system capacity is expanded simply by adding more silos 154, 156. The silos 154, 156 may also provide specialized functions within the system 300. For example, the silo 156 may be an administrative silo 156. The administrative silo 156 may be used by the system 150 to manage system information, campaign information, or any other information not related to the user profiles. The administrative silo 156 may also include a lookup table that may direct any data queries to the correct member silo 154. The administrative silo 156 may combine several different functions together, or it may be split apart into separate silos. For example, one administrative silo may contain campaign information while a separate administrative silo may contain a lookup table to direct any data queries to the correct member silo 154. Alternatively, there could be a third administrative silo which manages, for example, inventory information for redemptions. Thus, the administrative functions need not be confined to a single administrative silo. It should be noted that separating some functions into multiple administrative silos may increase the scalability of the system as a whole.

The member silo may hold the system 150 member information. The member information may include, for example, the user profile, demographics data, transactions, or point balances. As illustrated in FIG. 3, a system comprising one member silo 154 may hold approximately 100% of the total system 150 user information. Upon registration, a member's information may be stored in the member silo 154. The silo containing the member's registration data may be called the member's "home silo." Each member's information may be kept in the member's "home silo," and may remain in the home silo unless more member silos are added to the system 150.

Figure 4:
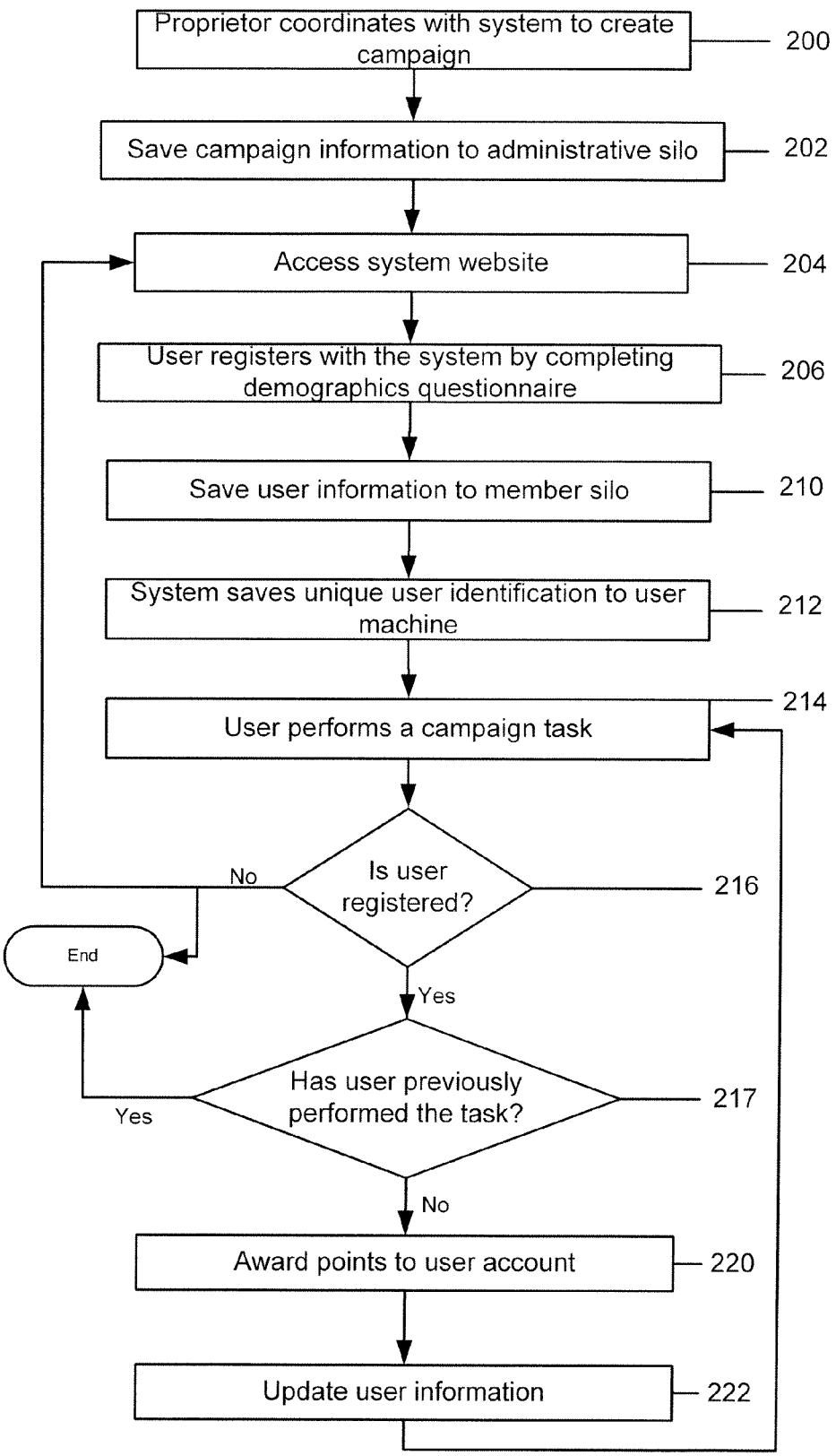
FIG. 4 is a flowchart describing a method of one example of using the system of FIG. 3 to award points in exchange for demographics information.

With reference to FIG. 1, FIG. 3, and FIG. 4, a method employing the enterprise system 300 may provide a user with a number of redeemable points for the user's submission of demographic information and participation in a variety of ecommerce related activities, including making purchases from proprietors. The user may then redeem their points for products and services from the participating proprietors such as retailers, theaters, restaurants, airlines, and hotels, among others. At step 200, a proprietor may coordinate with the system 150 to create a campaign For example, the proprietor may request information from the system 150 to target a specific demographic variable such as age, gender, income, or job. At step 202, the campaign information may be distributed to the silos 154, 156 and distributed across all system master data servers 162. At step 204, a user may login to the system 150 using a general purpose personal computer (PC) 12 connected to a network 10 such as the Internet.

As previously described, at step 206, the user may register with the system 150 by accessing a web site hosted by the system 150 at the web server 151. During registration, the user may complete a demographics questionnaire in the form of a web site or other electronic document. The demographics questionnaire may include various questions concerning the user's background including, for example, the user's age, sex, zip code, job title, or marital status. The system, 150 may collect the demographics data in a variety of formats including free form text, drop down menu selections, or Boolean values.

At step 210, the user's registration information and demographic data may be saved to a member silo 154. At step 212, the system may save a unique user identification to the users PC 105. The unique user identification may be used by the system to associate proprietor campaign tasks and user actions to award points. The unique user identification may be encrypted in the form of a "cookie" associated with the user's browser that may be used to associate the user with the registration information stored on the administrative silo 156. Further, the system may assign a 64-bit random number to each user upon registration. Because of the extremely low statistical probability of assigning identical 64-bit random numbers to more than one member upon registration, the system 150 need not verify that the random number has been previously assigned. The random user identification assignment may allow the system 150 to more easily select random user demographic information for analysis. Particularly, because the numbers are randomly assigned, any set of records associated with a sequential selection of the random user identifier may be very unlikely to overlap with any other set chosen by the random number. Further, because the random numbers are only used for choosing a random set of members for statistical analysis, a small number of users with identical random numbers will not distort the results. Therefore, because the probability of the system 150 assigning identical 64-bit random numbers is very small, and a few identical numbers will have very little effect on statistical analysis, it may be unnecessary to ensure that a random number has not been previously assigned.

At step 214, the user may perform any of the tasks or actions specified in the proprietor's campaign stored on the administrative silo 156 to earn redeemable points. For example, a campaign task may be visiting the proprietor's web site or responding to a system 150 generated e-mail.

Each proprietor web site may include a visual cue that the web site is a member of the points-awarding program. The visual cue may include a hyperlink pointing to the web server 151. The hyperlink may include a code called an "cell identification" that may optionally be encrypted and may associate the user's selection of the hyperlink with a campaign task saved on the administrative silo 156. Further, the cell identification may provide information associated with all campaign rules. A user may also receive and select hyperlinks associated with a proprietor's campaign in an e-mail message generated by an e-mail engine running as a system application program 161 on the replication server 164.

The e-mail engine could alternatively be run on the application server 160. However, to increase efficiency, the e-mail engine is run on one or more of the replication servers 164 on each member silo 154. In this way, the e-mail engine communicates locally with the database, avoiding network traffic and also avoiding additional load on the application server 160 which is servicing member requests in real-time. This is possible because the e-mail engine is able to work with a replicated copy of the member information. This provides for a great deal of scalability, as additional replication servers 164 could be added. For example, the replication servers 164 could be increased from two to four so that more than one e-mail engine is running for a given member silo 154.

At step 214, the administrative silo 156 and the application server 160 may validate the user's registration with the award program by comparing the user's cookie file with the registration information stored on the administrative silo 156. The validation process may be performed by a validation engine running as a system application program 161 on the application server 160. If the information received by the application server 315 is encrypted, a crypto engine running as a system application program 161 on the application server 160 may decrypt the information. If the user is not registered, at step 216, the process may terminate or, alternatively, the user may be directed to the system registration web site at step 204. If the user is validly registered, the system 150 may proceed to step 217.

At step 217, the validation engine may determine if the user has previously completed the campaign task associated with step 214. As described above, awarding points may be conditional and defined by the proprietor campaign rules. The campaign tasks and rules may be defined by the proprietor and stored on the administrative silo 156 or distributed across all system 150 silos 154, 156. The tasks and rules may be indexed on the administrative silo 156 by the cell identification. Using the cell identification, the validation engine may determine that a particular cell identification has been previously used, also indicating that the user has previously performed the task and that the user is ineligible for additional points. If the user has previously performed the task, the system 150 may terminate or direct the user to perform a different task. If the user has not yet performed the task, the system may proceed to step 220.

At step 220, if the user is validly registered and has not yet performed the present campaign task, a transaction engine running as a system application program 161 on the application server 160 may award a predetermined number of points to the user's account saved on the member's home silo 154 by associating the campaign task, cell identification, and point quantity with the unique user identification.

At step 222, the transaction engine running as a system application program 161 on the application server 160 may update transaction information associated with the user at the member's home silo 154. Transaction information may later be used by the system 150 to develop demographic information and statistics associated with the user actions to provide to the proprietors. Therefore, upon visiting the proprietor site, the system 150 may automatically award points to the registered user without requiring the user to leave the proprietor web site. The system 150 may be distributed across multiple participating web sites and may operate without the knowledge of the user. Optionally, the proprietor's web sites may determine whether a web site visitor is one of the participating users.

The system 150 may also provide hyperlinks to redemption sites at which the users may convert earned points into products or services. The hyperlinks may be embedded in e-mails generated by the e-mail engine system application program 161. Further, the hyperlinks may point to redemption web sites hosted by the system 150 or on hosts at any other proprietor-designated site. The system 150 may automatically accept redemption orders, place purchase orders with vendors for the requested product or service, and may direct the proprietor or vendor to deliver the redeemed products to the user. The points may be automatically deducted from the user's account.

The system 150 may also develop demographic information and statistics to provide for the proprietors. The system 150 may associate the user demographic information with the users actions associated with the proprietor or any other web site. For example, the percentage of the males visiting a particular web site or web pages may be calculated by looking at each participating visitor in the member silo 154, checking a field in the member silo 154 for each member's sex, and tabulating the results.

Figure 5:
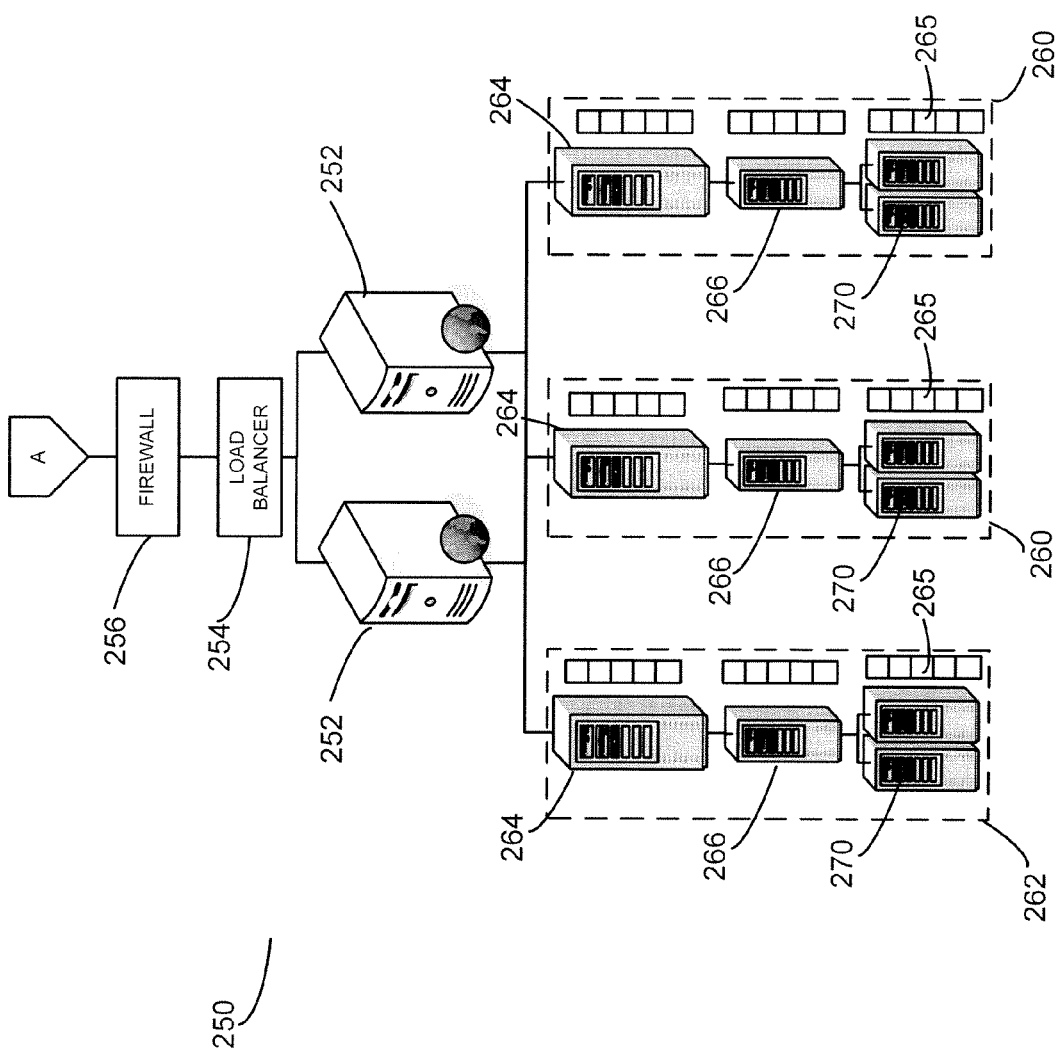
FIG. 5 is another diagram of one example of an enterprise system including a load balancer, a plurality of member server groups, and a single administrative server group.

With reference to FIG. 5, the system 250 may include a distributed architecture that is N-tier with web servers 252 that may communicate with a load balancer element 254, wherein the load balancer element 254 communicates with a system firewall 256 and the web servers 252. The load balancer 254 may randomly distribute all data entering the system 250 through the firewall 256 across the web servers 252. The web servers 252 may then determine a silo 260, 262 to send the data. Thus, upon the receipt of data, the load balancer 254 may select a random web server 252, and the randomly-selected web server 252 may forward the data to a specific silo 260, 262, or to a randomly-selected silo 260, 262. The randomly-selected silo 260, 262 may then determine whether to process the data or forward the data to another silo 260, 262. The load balancer's 254 random distribution of data may reduce data latency through the system 250. The load balancer element 254 may include a method executing on a general purpose computer 50 or on any device associated with the system 250 as either software or hardware.

The system firewall 256 may provide a secure, high-speed connection to a computer network such as the Internet as illustrated in FIG. 1. The web server 252 may face the users and communicate with a number of silos 260, 262. A silo may be a conceptual collection of servers that work together through an application interface. Each silo may include, for example, an application server 264 that may execute a system application program 265. A system application program 265 running on the application server 264 may perform any coordination, transformation, or update process on the data entering or exiting the master data server 266. Further, a system application program 265 may execute on any general computing device 50 in communication with the master data server 266. A system application program 161 running on the application server 160 may include, for example, any combination of an e-mail engine, a query engine, a validation engine, a crypto engine, an award engine, or a transaction engine. Each silo may include an application server 264, wherein the application server 264 may communicate between the web server 252 and a master data server 266, and the master data server 266 may communicate with replication data servers 270. The replication data servers 270 may include a duplicate copy of the user profile data assigned to a silo 260, 262.

The silos 260, 262 may provide simple system expandability by providing more silos 260, 262 to the system. The silos 260, 262 may also provide specialized functions within the system 250. For example, the silos 260, 262 may include an administrative silo 262 and member silos 260. The administrative silo 262 may be used by the system 250 to manage system information, campaign information, or any other information that may not relate to the user profiles. The administrative silo 262 may also include a lookup table that may direct any data queries to the correct member silo 260. The member silos 260 may hold an equal or approximately equal fraction of the total amount of user information contained in the system 250 as determined by the load balancer 254. As illustrated in FIG. 5, a system comprising two member silos may each hold approximately 50% of the total system 250 user information. Upon registration, a user's information may be stored on a single, randomly selected member silo 260. The silo containing the user's registration data may be called the user's "home silo." Each user's information may be kept in the user's "home silo," and may remain in the home silo unless the member silos 260 are rebalanced. By randomly assigning profiles to the silos, the system load may be balanced and the number of user profiles saved to a single member silo 260 may be no more than any other individual silo 260.

Figure 24:
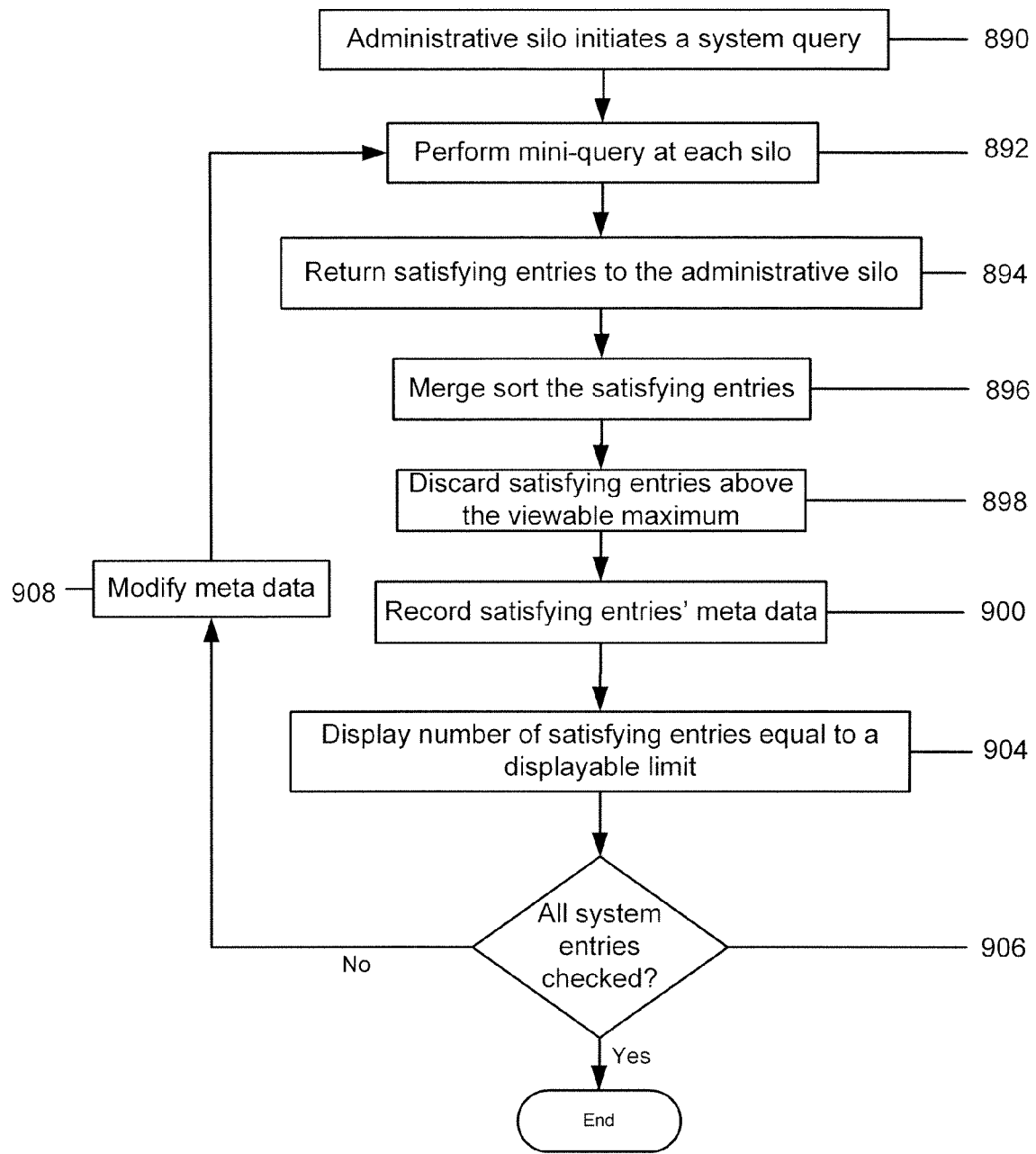
FIG. 24 illustrates an exemplary flowchart illustrating several steps utilized in a method for providing the appearance of a single data repository for queries initiated in a system incorporating distributed member server groups.

With reference to FIG. 2 and FIG. 24, one function of the administrative silo 262 may be to perform distributed queries to the member silos 260. In particular, queries initiated from the administrative silo 262 may give the appearance of a single data repository, despite being distributed across multiple member silos 260. Furthermore, the distributed architecture may allow the system 250 to distribute the query across multiple system elements to minimize system processing latency. For example, in FIG. 24 at step 890, a user at an administrative silo 262 may initiate a query for a particular set of member data from the member silos 260. The query may be administered on the system 250 in a Standard Query Language (SQL) format, for example, the MySQL® series database software and systems, or a subset thereof, as produced by MySQL AB of Uppsala, Sweden.

An administrative user of the system 250 may perform a number queries on the data stored at the member silos 260. For example, an administrative user may desire to query the system 250 for all records or rows created within a certain period of time, associated with a particular campaign, demographic value, or e-mail domain, stored on a particular silo 260, based on a member's last status change, or any possible combination of record attributes stored at the silos 260. The system 250 may contain a very large number of entries that satisfy the query. However, a system variable may limit the displayable number of entries to any subset of the total satisfying entries. For example, a particular query may return a total of one million entries, but the system 250 may only display a set or "page" of ten entries to the user at one time. Because the number of displayable entries is limited, at step 892, the system need only perform, in parallel, a subset of the larger query, or a "mini-query" at each member silo 260 to obtain a complete listing of all satisfying entries at the silo.

For instance, the system 250 may contain only two member silos 260 and the number of entries the system 250 may display at one time may be limited to ten. Because there may be a chance that the system only contains ten or fewer displayable, satisfying entries and that a single silo 260 contains all query-satisfying entries, a query to the system 250 may be configured to return the first ten rows of the sorted result. An SQL query may use the "LIMIT" optimization to return a specified number of rows from each silo 260. If every record searched at step 892 satisfies the query parameters, at step 894, the system 250 may return a total of twenty entries to the administrative silo 262.

Further, individual software components may be responsible for performing each SQL query at a particular silo 260. The individual components may execute one mini-query from a set of mini-queries at each data repository 260; each component may execute its mini-query at the same time as the remaining components. At the conclusion of each request for a successive page of entries, the components may combine the gathered data. The components may be executed on the administrative silo as a number of threads from a "thread pool." Each thread may be assigned one of the silos for each query and execute successive mini-query page requests. After each successive request, the threads may be integrated to compile and combine the data. If a particular silo 260 is unavailable, the data returned may include a warning indicating an incomplete result. For example, an incomplete request may indicate that a particular silo is unavailable or that a calculated percentage of the system is available, so that a user is aware that any results are approximations. By both distributing the query across the silos 260 and iteratively querying each silo for only a small number of satisfying entries, the query process may reduce the amount of system resources consumed and the system data latency.

At step 896, the satisfying entries returned to the admin silo at step 894 may be combined and sorted according to the criteria selected by the administrative user or by other criteria. One example of a process by which the data may be combined and sorted is a merge sort algorithm.

At step 898, the system 250 may discard a number of entries retrieved at step 894 and sorted at step 896 from the set of total records received from the silos 260 that are above the maximum number of displayable entries. At step 900, the system 250 may then record meta data about the satisfying entries in a "cursor cache" at the administrative silo 262 or any other memory location. The cursor cache may contain information to locate any previously-displayed entries or to perform the next mini-query on a silo 260. For example, the system 250 may record meta data comprising the number of entries returned by each silo 260, the record and silo number for a satisfying, displayable entry from each silo 260, or a member identification number at which the query was satisfied at each particular silo 260. The meta data may allow the system 250 to locate a particular query's satisfying entries without saving the actual entries and may also be stored so that later identical queries may be performed more efficiently. Further, as a user scrolls through successive pages of satisfying entries, the method may save each page's meta data to allow the user to selectively view any previously-viewed page. At step 904, the administrative user may view the sorted data that satisfies the query without caching the data or creating new database tables containing the combined and sorted data.

At step 906, if all system 250 entries have been checked against the query, the method may terminate. If, at step 906, more system entries remain to be checked against the query, the method may perform another set of mini-queries to incrementally satisfy the larger query. At step 908, the system 250 may modify the meta data stored at step 900 and perform another mini-query at each silo 260 until all system 250 records are searched and the query is complete at each silo. If, after the meta data modification of step 908, a particular silo 260 has no remaining entries to search, a next series of mini-query page requests will skip the exhausted silo 260.

To ensure that the system 250 returns unique satisfying entries with each subsequent mini-query, at step 908, the system 250 may modify the meta data stored at step 900 to resume a next mini-query at the proper home silo 260 record. For example, the user may be viewing a page of members sorted by the member identification number. The system 250 may then increment the last member identification number or record number at which the query was satisfied at a particular silo 260 to begin the next mini-query at the record matching the incremented entry. Alternatively, the system 250 may simply use unmodified meta-data from a previous mini-query for a subsequent mini-query. For example, the system 250 may begin a next mini-query at the same record location as the last returned record from a previous mini-query. Thus, the meta data stored at step 900 may allow an administrative user to move freely between satisfying entry pages.

Mini-queries may also produce a count of the total number of satisfying entries on the system. For example, a system 250 having a first home silo 260 and a second home silo 260 may execute a mini-query at each silo 260 including a "COUNT (x)" query (where "x" is the condition to be satisfied). If the first silo 260 contains 32 satisfying entries and the second silo contains 40 satisfying entries, the total number of satisfying records on the system would be 72. Therefore, a system 250 containing 72 satisfying entries and limiting the number of displayable entries to 10 per page may result in 8 pages of satisfying entries.

Using the total number of satisfying entries on the system 250, the administrative user may switch viewing between a number of different query result pages without viewing each intervening page. For example, after performing a first mini-query, the system 250 may estimate a total of eight pages of satisfying results and display a selectable hyperlink to each page. The user may select the link representing any page, and, after performing a merge sort on each silo's 260 satisfying data, the system 250 may modify the meta data stored at step 900 to begin a new mini-query at a record representing the first record of the selected page. A user may select the fifth page of a query returning a total of eight pages with a first home silo 260 containing 100 total records. The system 250 may modify the meta data to begin successive mini-query page requests at the record number representing ⅝ of the total of number of records at each silo, or at approximately the $62^{nd}$ record of the first silo 260 participating in the query. The system 250 may perform the same estimation at each silo 260 to return an approximation of the fifth page of satisfying entries.

The user may also view each intervening page of data before viewing a desired page. By viewing every intervening page of data, the system 250 may accurately acquire and modify the satisfying records' meta data. Each subsequently displayed page will be an accurate representation of the order of satisfying records on the system. To further facilitate viewing a record found on a high-numbered page of the query, the number of displayable entries may be selectively increased. For example, if a user wishes to view the $1000^{th}$ satisfying entry of a query returning 500 pages of 10 entries each page, the user may choose to increase the number of viewable entries to more easily view the later entry. By selecting a higher number of satisfying entries per page, the user may quickly view a higher-numbered satisfying entry.

Alternatively, the system 250 may modify the number of entries fetched by each mini-query to allow the user to display a desired record number from the estimated total number of returned results. For example, a query returning a total of 100,000 satisfying entries to be displayed 10 entries at a time may result in increased system 250 latency due to increased data transfers to view the $10,000^{th}$ satisfying record. Therefore, a query may trigger the system 250 to modify the number of entries fetched to a higher or lower number without displaying the intervening satisfying records to maximize viewing efficiency while minimizing system 250 latency. To display satisfying records 10,000 through 10,010, the system 250 may consider the amount of available system resources or an amount of memory allotted to complete the combine and sort function of step 896 to modify a number of fetched entries. The system 250 may determine that it would be most efficient to perform ten mini-queries at each silo 260 for 1000 satisfying records without displaying satisfying records 1 through 9999 before performing an eleventh mini-query to display records 10,000 through 10,010. Further, the system may display all query records as one page.

Figure 24A:
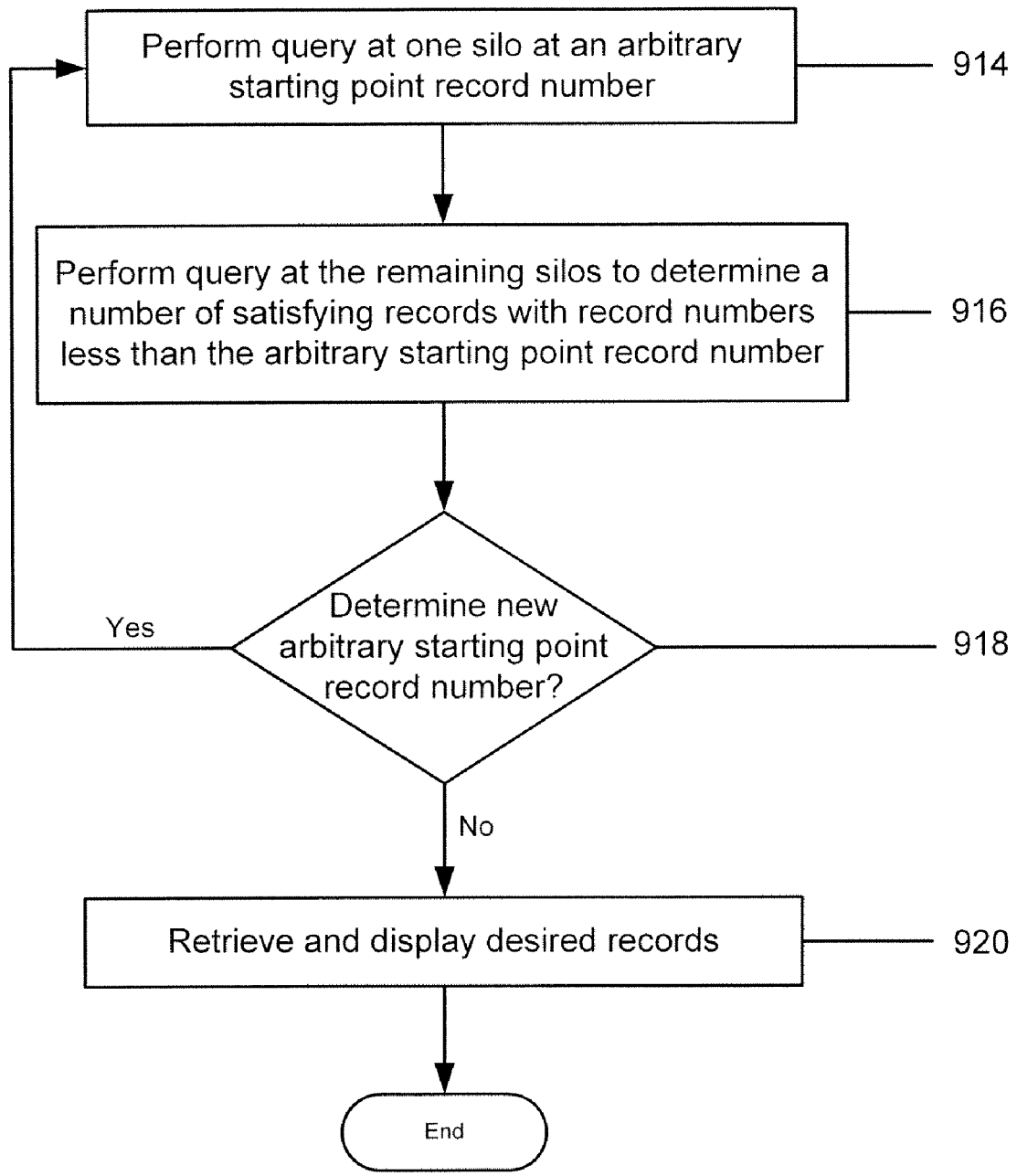

With reference to FIG. 5 and FIG. 24a, a user may also jump directly to a desired satisfying record by performing a type of binary search on the member silos 260. At step 914, on a particular member silo 260 (i.e., silo X) containing a number of satisfying records, the system 250 may perform a query for a sorted list of the satisfying records and retrieve the record number of an arbitrary starting point. For example if the system 250 contained 10 member silos 260 and the user desires to view the $10,000^{th}$ through $10,010^{th}$ satisfying records across all silos, an arbitrary starting point may be 10,000/10=the $1,000^{th}$ satisfying record on silo X, where the total number of member records is roughly distributed across all the silos 260. Further, all member records may not be evenly distributed across all member silos 260 and other arbitrary starting points may be preferable; the starting point need only represent a reasonable estimation of a beginning record location for the particular silo.

At step 916, the system 250 may perform a query on the remaining member silos 260 to determine a number of satisfying records stored on the member silos 260 with record numbers that are less than the arbitrary starting point record number chosen from silo X. For example, silo X is silo 1 and all other member silos are i=2, 3, 4, . . . . The number of records that are less that the arbitrary starting point record of silo 1 may be represented as Li for each i, and L1 may be the arbitrary starting point record number.

At step 918, the system 250 may evaluate the accuracy of the arbitrary starting point record number. For example, if the sum of the values Li for i=1, 2, 3, 4 . . . for all the silos is not 10,000, a new value for the arbitrary starting point record may be determined. By determining a new starting point record number, system 250 may more accurately return the $10,000^{th}$ through the $10,101^{th}$ satisfying record. For example, the system 250 may determine that the sum of the value Li for i=1, 2, 3, 4 . . . is substantially less than the desired record number; the total number of records retrieved at step 916 may equal 3,333 when the arbitrary starting point record number at silo X equaled 1,000. Because 1,000 is less than ⅓ of the total number of system records that are "less than" the arbitrary starting point, an arbitrary starting point that is three times larger than the original arbitrary starting point may more accurately return the desired records. The system 250 may then monotonically modify the query starting point for the remaining member silos. After modifying the arbitrary starting point record number, the system 250 may execute the process until an arbitrary starting point number returns the desired total number of satisfying records from the silos 260. Where the total number of records retrieved at step 916 is less than the desired number, the arbitrary starting point record number may be proportionately increased, so that the count of sorted records below the starting point is higher on the next try, and closer to the desired number.

If, at step 918, the arbitrary starting point record number returns a reasonably accurate representation of the desired number of records, then, at step 920, system may begin mini-queries at each silo 260 at the arbitrary starting point record number to retrieve and display the desired satisfying records. By only retrieving and displaying the desired records once the arbitrary starting point record number is accurately determined, the system 250 avoids performing queries at each member silo 260 to retrieve or display all intervening satisfying records.

Also, a user may desire to view a number of satisfying entries that, after performing merge sort, occur at the end of the returned list of satisfying entries. The system 250 may reverse the order of the merge sort process so that the user is first presented with the last ordered entries. Alternatively, a user may select to view a reverse order of any record attribute after the system 250 has performed a first query.

The previously-described methods may exhibit some redundancies while ensuring displayed data accuracy. Because the method related to FIG. 24 does not cache any satisfying records above the viewable maximum and discards the additional records at step 898, the method may execute mini-queries that re-acquire records retrieved in a previous mini-query. While this method may result in a slight loss of system 250 performance due to the redundancy of the mini-queries at the silos 260, the method may enhance the accuracy of the query process. Specifically, the query of step 892 may return a set of information that accurately represents all records in the system 250 at the time of the query. While a first administrative user executes the query, a second administrative user or member may access, change, or add records to the silos 260. Therefore, the system 250 information and records stored at the silos 260 may change while the first administrative user executes a query and a mini-query returns a number of satisfying entries. A next mini-query iteration may then re-acquire previously-retrieved entries that were discarded as being above the maximum number of viewable entries, and it may also retrieve any new or updated records from the silos. Therefore, while the method may result in increased data latency, each iteration may display current system information.

Further, any mini-query associated with the FIG. 24 method may return and display apparent inaccuracies if a new satisfying record is added between mini-query iterations. For example, a first iteration of the method may display the first ten satisfying entries available to the system 250. An intervening new record may be added that, had it existed at the time of the first iteration, would have appeared at position eight of the first displayed page. This addition may, in effect, move the first page entries eight, nine, and ten to a lower position on the first displayed page. The entry at position ten may re-appear as an entry on the second displayed page. Therefore, the system may present apparent inaccuracies in the query process by displaying a single entry on both a present and subsequent page of displayed entries.

Figure 25:
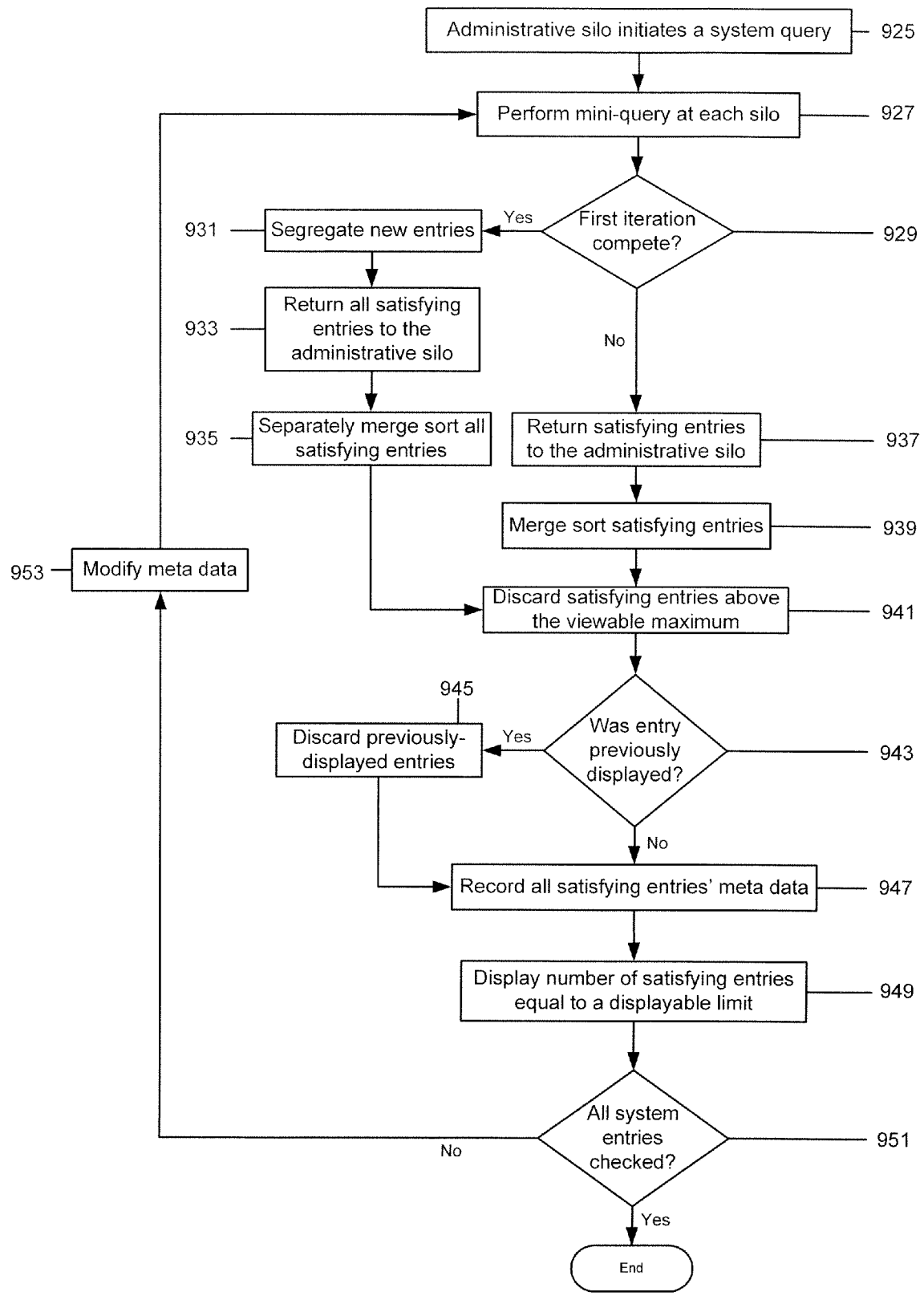
FIGS. 25-27 illustrate exemplary flowcharts illustrating several steps utilized in methods for providing the appearance of a single data repository for queries initiated in a system incorporating distributed member server groups.

With reference to FIG. 5 and FIG. 25, a method may prevent the previously-described inaccuracies by presenting intervening new or changed entries within a subsequent page and eliminating the redundant presentation of satisfying entries. At step 925, a user at an administrative silo may initiate a system query. At step 927, the query may be distributed across all home silos 260 as a set of "mini-queries." If, at step 929, a first series of mini-query page requests has been completed, at step 931, the system 250 may identify and segregate any entry at the silo that is new or has changed since the last round of mini-queries. For example, the system 250 may compare a record timestamp against the time the query was initiated. If the record timestamp is more recent than the time of query initiation, then the record is either new or has been modified since the last round of queries. At step 933, the system 250 may return a set of satisfying entries from both the new intervening or changed entries and the set of searchable entries as limited by the number of viewable entries. At step 935, the system 250 may separately merge and sort each set of entries returned at step 933. If, however, at step 929, a first round of mini-queries has not been completed, at step 937, the system 250 may return all satisfying entries as limited by the viewable maximum. At step 939, the system 250 may merge and sort the satisfying entries returned from the previous step. At step 941, a number of satisfying entries above the viewable maximum may be discarded. The method may prevent re-displaying entries that appeared on the previous page by recording a displayed record attribute that uniquely identifies the record. For example, if, at step 943, any entry was previously displayed, at step 945, the record may be discarded before, at step 947, all satisfying entries' meta data is recorded. Alternatively, if, at step 943, any entry has not been previously displayed, at step 947, all satisfying entries' meta data may be recorded. Further, added or removed records may be detected and displayed by beginning each subsequent query at a silo at the record location corresponding to the last record displayed from a subsequent query.

At step 949, the system 250 may display a number of satisfying entries up to a viewable limit. Additionally, intervening new or changed entries may be displayed in a prominent location or in a particular color to denote their status. At step 951, the system 250 may determine that all records have been checked, and terminate the query. However, at step 949, if records remain to be checked in the system 250, at step 951, the system 250 may modify the meta data stored at step 945 to identify the next record set for another round of page requests, and repeat the method.

Figure 26:
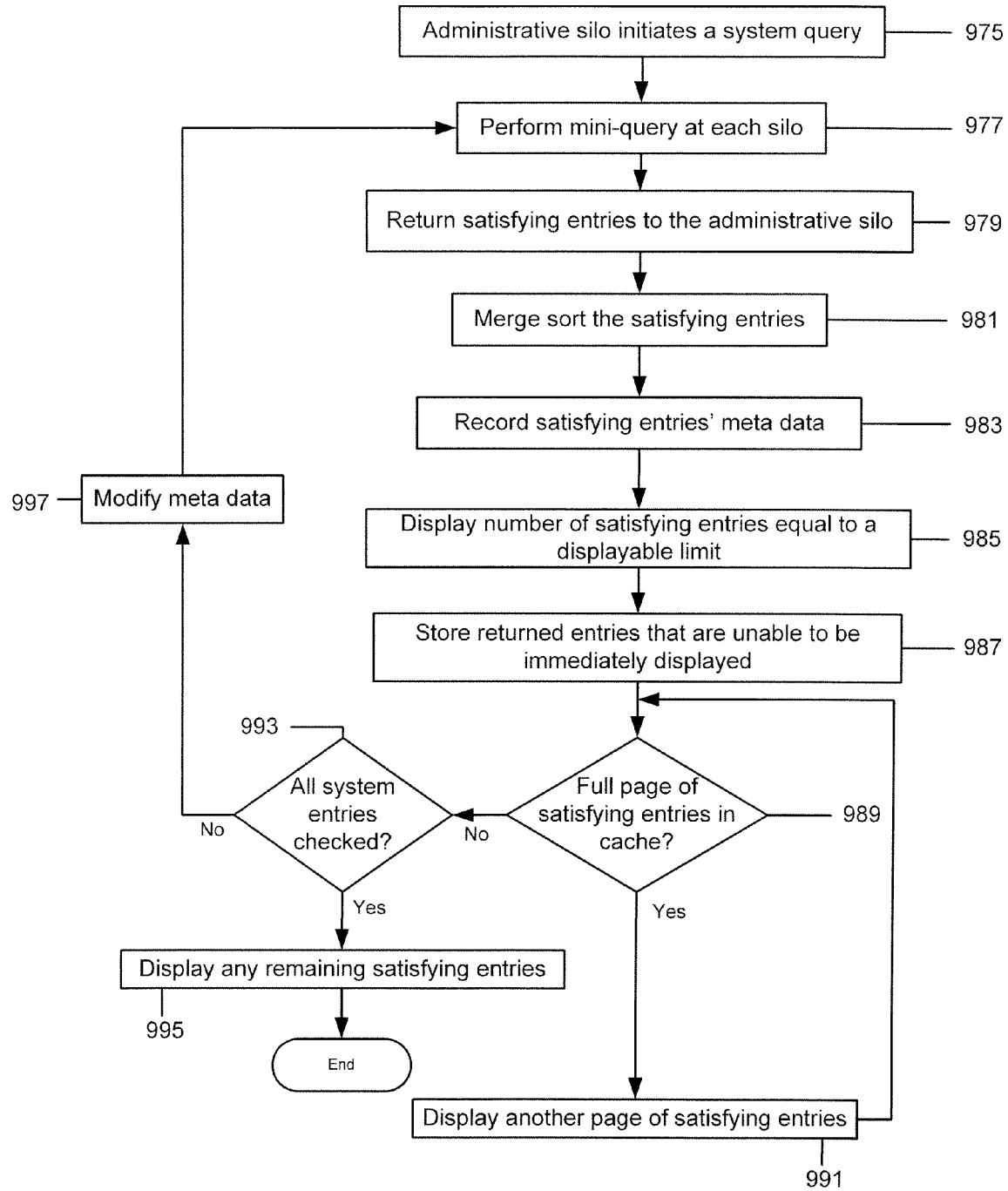

With reference to FIG. 5 and FIG. 26, a method may cache data retrieved by each mini-query to avoid re-querying previously retrieved satisfying entries. As discussed in relation to FIG. 24, at step 975, an administrative silo 262 may initiate a query for a particular set of member data from the member silos 260. At step 977, the system need only perform a subset of the larger query, or a "mini-query" at each member silo 260 equal to the number of displayable entries. At step 979, the system 250 may return from each silo 260 a number of sorted entries equal to the number of displayable entries. Alternatively, at step 979, the system 250 may request enough sorted, satisfying entries to fill several pages. At step 981, the administrative silo 262 may then combine and sort the entries according to the criteria selected by the administrative user or by other criteria. At step 983, the system 250 may then record meta data about the satisfying entries to locate any previously-displayed entries or to perform the next mini-query on a silo 260. At step 985, the administrative user may be able to view a full page or several pages of sorted data that satisfies the query. At step 987, the system 250 may store the entries it cannot display due to the viewable limit discussed above in relation to step 985.

At step 989, if the number of excess records stored at step 987 in combination with any other previously-stored, satisfying records in the cache, are equal to or greater than the number of viewable entries, at step 991, the user may display another full page of satisfying entries. If there is less than a full page of satisfying entries in the cache and, at step 993, all system 250 entries have been checked against the query, the method may, at step 995, display any remaining satisfying entries and terminate. If, at step 993, more system entries remain to be checked against the query, the method may, at step 997, modify the meta data stored at step 987 and perform another set of mini-queries until all system 250 records are searched.

Also, for each subsequent mini-query to a member silo 260, the system 250 may request less than the number of viewable entries. For example, if the number of viewable entries is ten, and the number of satisfying entries originating from a particular silo 260 and currently stored is three, a subsequent mini-query to that particular silo 260 may request a maximum of seven satisfying entries. The system 250 may then combine and sort all entries at the administrative silo 262 as before. Therefore, the data associated with the satisfying entries stored at step 987 may be no more than the number of displayable satisfying entries for each silo. Requesting only the fewest number of needed satisfying entries may further reduce system latency during the query process. Because each query is made up of a number of mini-queries based on the viewable number of records, the system 250 may ensure that the administrative user sees only the most accurate, up-to-date member information.

Figure 27:
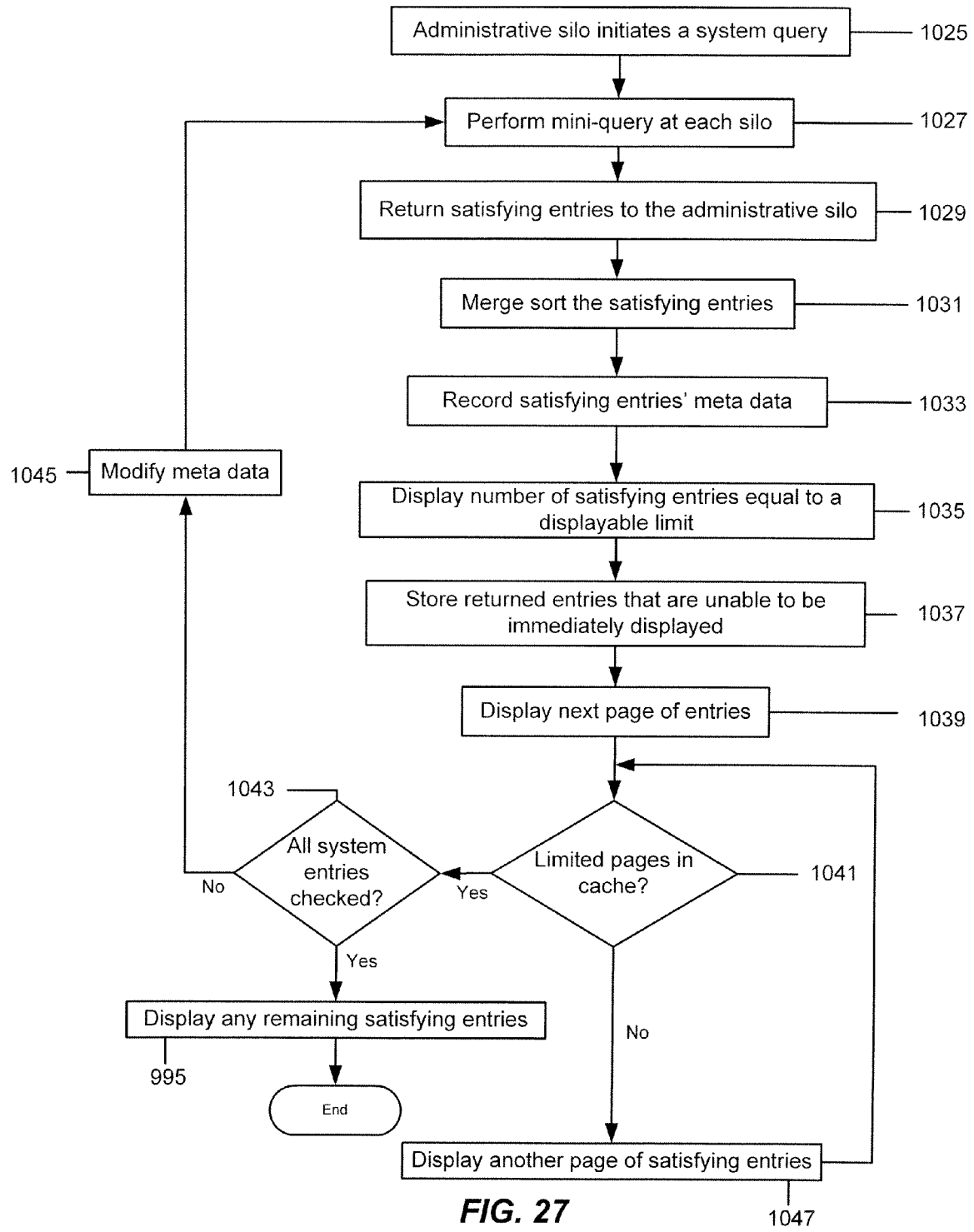

With reference to FIG. 5 and FIG. 27, an administrative user may have immediate access to a previous, current, and subsequent page of query data. As discussed in relation to FIG. 24, FIG. 25, and FIG. 26, at step 1025, an administrative silo 262 may initiate a query for a particular set of member data from the member silos 260. At step 1027, the system may perform a subset of the larger query, or a "mini-query" at each member silo 260. The mini-query may search a number of entries at each silo 260 equal to a displayable maximum. Alternatively, the system may search for a number of entries based on the potential for system latency. For example, the system 250 may take a number of factors into consideration including a number of satisfying entries at a particular silo 260 based on an estimation of the silo's 260 contents, the number of other queries or operations currently taking place on the system 250, a measurement of system latency, or other system performance factors to determine the number of entries each mini-query may search. Further, the system, 250, may return a factor of the displayable limit in order to guarantee that several pages of satisfying entries may be available for the administrative user's immediate viewing. The factor of the satisfying record displayable limit could mean, for example, five times the displayable limit or 50% of the displayable limit, etc. One of ordinary skill in the art will appreciate that the factor could be any possible manipulation or derivative of the satisfying record displayable limit.

At step 1029, the system 250 may return a number of sorted, satisfying entries from the number of records searched at step 1027. At step 1031, the satisfying entries may be merged with the other mini-query results and sorted. At step 1033, the satisfying entries' meta data may be recorded. At step 1035, a number of satisfying entries equal to a displayable limit may be displayed. At step 1037, a number of satisfying entries that are unable to be immediately displayed may be stored. The information stored at step 1037 may be the actual records or merely the meta data to locate the actual records. The information stored may be enough to display another page of satisfying entries. At step 1039, a user may choose to view a previous or subsequent page of satisfying entries. Because the next page of satisfying entries is available in cache, the method may readily display the entries without performing another round of mini-queries.

If, at step 1041, a limited number of satisfying entry pages remains in the cache and, at step 1043, all system records have not been checked, at step 1045, the method may modify the meta data and perform a successive page request as the user views the current page of satisfying entries. If, at step 1041, there are a satisfactory number of pages in the cache, the user may, at step 1047, readily display another page. The number of pages remaining in the cache to trigger successive mini-queries may be set according to an amount of memory available at the cache, or any of a variety of other factors. Therefore, the method may, as a background process, pre-fetch another displayable set of satisfying records for ready viewing while the user views a current set.

Figure 6:
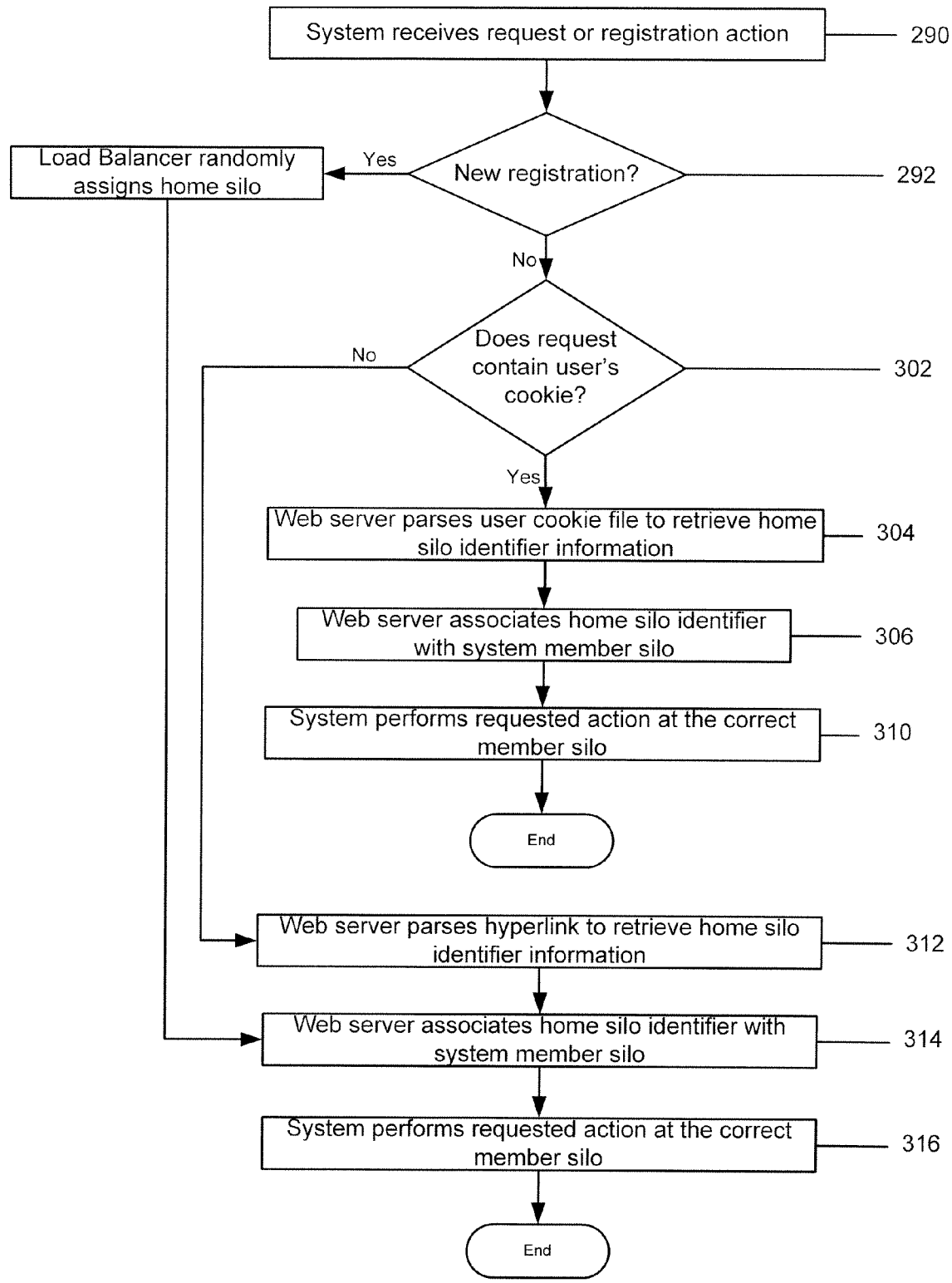
FIG. 6 is another flowchart describing a method of one example of using the systems of FIGS. 5, 7, and 8 to award points in exchange for demographics information.

With reference to FIG. 5 and FIG. 6, and as previously described in relation to FIG. 4, the system 250 may need to periodically retrieve or update member silo 260 data to the user's home silo. To correctly identify the user's home silo upon a retrieve or update action, the user's home silo identifier may be persistently stored in several different forms. Particularly, the home silo identifier may be part of a hyperlink in a bulk e-mail sent from the system 250 to the user. Further, the home silo identifier may be part of a URL stored at the user's computer, or may be part of a cookie file. The persistent storage of the user's home silo identifier on the user's computer may also reduce any system 250 overhead associated with finding the user's information. However, once the user is at the system 250, the home silo identifier is not needed to view any successive pages during a single session; the system only requires the home silo identifier upon the first action a user takes at the system 250 during the session. Therefore, the system 250 may acquire user's unique identification number and home silo identifier through encrypted information embedded in a hyperlink included in an e-mail or from any other source. By using the encrypted information, the user may not need to login to the system 250 to complete a transaction. A user may only need to explicitly login to the system 250 when the user visits the central website without going through a hyperlink containing the encrypted identification information and the user's browser does not contain an identifying cookie, or, when the user may perform a "sensitive" action associated with a user's private information or a transaction that may decrease the user's accumulated points.

The system 250 may identify not only the user's home silo but also cached user information through the use of an "application server session." During an application server 264 session, the system 250 may automatically store a cookie on the user's browser. The cookie may then be used to locate any cached information (including the user's home silo identifier) on successive page views. During an application server session, the cookie may be referred to as a "session cookie." Thus, while the user is actively at the system 250 and keeping his session with the system 250 open (i.e. does not end the session by closing the browser, deleting all browser cookies, or otherwise ending his session), the system 250 may not need to actively find the user's home silo identification. The system 250 may automatically forward requests to a user's home silo based on the user's application server 264 session. The system may automatically forward the requests using an Apache™ web server 252 with ModJK extensions to a Jetty™ Java™ servlet engine application server 264.

At step 290, the system 250 may receive a user login request, registration request, or update action. If, at step 292, the system 250 receives a new registration, the load balancer 254 may forward the data to a random web server 252 and the web server 252 may assign the registration information a random home silo identifier. By randomly assigning all registrants a home silo identifier, each member silo may contain an approximately equal amount of member information. Further, the data need not retain its home silo identification for its lifetime and may be distributed to other silos 260, 262 as needed for redistribution because no particular data characteristic may tie the data to a silo 260, 262.

After storing the new member information, the system 250 may proceed to step 314. The user request or update action may come from a hyperlink embedded in a targeted e-mail generated by the e-mail engine executing as a system application program 265 on the application server 264. The hyperlink may include the user's home silo identifier information, or alternatively, the action may originate from the user's browser and include the user's cookie file.

If, at step 292, the system 250 receives a non-registration request, the system may, at step 302, determine if the request contains the user's cookie file. At step 304, if the request contains the user's cookie file, the web server 252 may parse the user's cookie file to retrieve the user's home silo identifier information. At step 306, the web server 252 may associate the home silo identifier with a particular system 250 member silo 260. At step 310, the system 250 may perform the requested action at the user's home silo 260. Therefore, the system 250 may perform the action with the user's home silo 260 without performing a lookup or redirect action when the action includes the user's cookie file.

If, at step 302, the request does not contain the user's cookie file, the request likely originated from a system-generated hyperlink that was targeted to a particular user, or the user's browser may not contain the cookie file that correctly associates the user with the user's home silo. The hyperlink therefore may contain the user's home silo identifier 260. At step 312, the web server 252 may then parse the hyperlink to retrieve the user's home silo identifier information. At step 314, the web server may associate the home silo identifier with the correct member silo 260. Therefore, the system 250 may perform the action with the user's home silo 260 without performing a lookup or redirect action when the action originates from a hyperlink containing the user's home silo identifier.

Further, the user's cookie file may contain an inaccurate home silo identifier due to data redistribution or any other reason that may result in the user's data being moved to a location other than a location indicated by the cookie file. If the inaccurate information leads the action to an incorrect silo, the receiving member silo 260 may treat the action as if no browser cookie existed and perform a lookup action to re-direct the data to the correct silo and save a new, accurate, cookie file to the user's browser. Therefore, the system 250 may perform the action with the user's home silo 260 by performing a lookup or redirect action when the action includes an inaccurate cookie file.

Further, if the user's cookie is not set, the system may perform a lookup action by accessing the lookup table residing on the administrative silo 262. Also, if the member's cookie is not set or not present, the load balancer 254 may direct the user to a random member silo 260. A system application program 265 running on the application server 264 may query the master data server 266 or the replication data servers 270 to determine if the action relates to member information stored at that silo 260. If the member data is not stored on the silo 260, the application server 264 may broadcast a request to all silos 260, 262 to find the user's home silo. Once the user's home silo 260 is found, the system 250 generates a re-direct message to the user's browser to re-establish a connection to the system 250 through the web server 252 at the proper home silo 260. The user's browser may then re-establish a connection to the system 250 with a connection message containing the correct home silo 260 identifier. Once the web server 252 receives the re-connect request, user is directed to the proper home silo 260, and the transaction may continue. At step 316, the system 250 may perform the requested action at the correct member silo 260.

As may be appreciated by one of ordinary skill in the art, the system's silo architecture is scalable and inexpensive. Further, the system is robust in that a single silo's malfunction will not degrade the function of the entire system.

Figure 7:
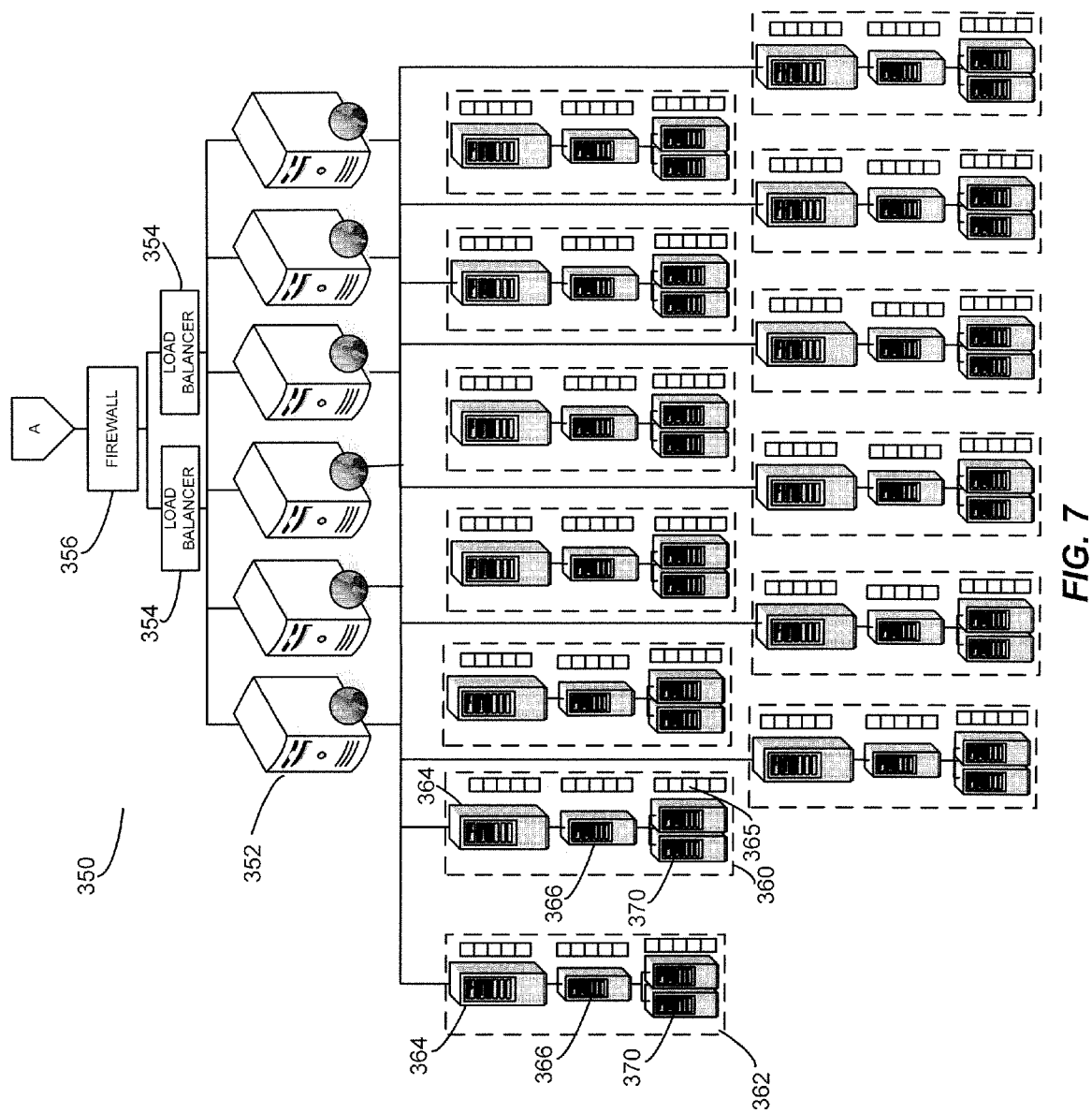
FIG. 7 is another diagram of one example of an enterprise system including twelve member server groups and a single administrative server group.

With reference to FIG. 7, the system 350 may also include a distributed architecture that is N-tier with six web servers 352 that may communicate with two load balancer elements 354, wherein the load balancer elements 354 communicate with a system firewall 356 and the web servers 352. The load balancer 354 may randomly distribute all data entering the system 350 through the firewall 356 across the web servers 352. The load balancer's 354 random distribution of data may reduce data latency through the system 350. The load balancer element 354 may include a method executing on a general purpose computer 50 or on any device associated with the system 350 as either software or hardware. The system firewall 356 may provide a secure, high-speed connection to a computer network such as the Internet as illustrated in FIG. 1. The web servers 352 may face the users and communicate with a number of silos 360, 362. A silo may be a conceptual collection of servers that work together through an application interface. Each silo may include an application server 364 executing a system application program 365, wherein the application server 364 may communicate between the web servers 352 and a master data server 366, and the master data server 366 may communicate with replication data servers 370. The master data server 366 and the replication data servers 370 may contain the member profile data to include demographic information, member transaction information, and all member-related data. Member transaction information may include records of every activity in which the member participates including registration information, purchase and activity tracking information, and point-earning information. A system application program 365 running on the application server 364 may perform any coordination, transformation, or update process on the data entering or exiting the master data server 366. Further, a system application program 365 may execute on any general computing device 50 in communication with the master data server 366. A system application program 365 running on the application server 364 may include, for example, any combination of an e-mail engine, a query engine, a validation engine, a crypto engine, an award engine, or a transaction engine. The replication data servers 370 may include a duplicate copy of the user profile data assigned to a silo 360, 362.

The silos 360, 362 may provide simple system expandability by providing more silos 360, 362 to the system. As illustrated in FIG. 7, the system may be expanded to 13 silos 360, 362. The silos 360, 362 may also provide specialized functions within the system 350. For example, the silos 360, 362 may include an administrative silo 362 and twelve member silos 360. The administrative silo 362 may be used by the system 350 to manage system information, campaign information, or any other information that may not relate to the user profiles. The administrative silo 362 may also include a lookup table that may direct any data queries to the correct member silo 360. The member silos 360 may hold an equal or approximately equal fraction of the total amount of user information contained in the system 350 as determined by the load balancer 354 random assignment. As illustrated in FIG. 7, a system comprising twelve member silos may each hold approximately 8% of the total system 350 user information. Upon registration, a user's information may be randomly stored in one member silo 360. The silo containing the user's registration data may be called the user's "home silo." Each user's information may be kept in the user's "home silo," and may remain in the home silo unless the member silos 360 may be rebalanced. By randomly assigning profiles to the silos, the system load may be balanced and the number of user profiles saved to a single member silo 360 may be no more than any individual silo 360.

Further, the member silos 360 may have differing storage capacities. The random distribution of data stored on each member silo 360 may then be based on the percentage of system capacity represented by a particular member silo 360 by weighting the preference of the web server 352 to select a home silo 260 upon registration. Thus, a silo 360 having twice the capacity as another silo 360 may be given twice the weighting during random selection. Each user's information may be kept in the user's "home silo," and may remain in the home silo unless the member silos 360 may be rebalanced. By randomly assigning profiles to the silos, the system load may be balanced and the number of user profiles saved to a single member silo 360 may be no more than any individual silo 360. Also, each silo 360 may poll the system 350 to determine its percentage of system capacity. Instead of random home silo selection, a closed-loop selection mechanism may, for new registrations or anonymous requests, prefer the silo 360 with the least-utilized capacity. Capacity may be measured by any suitable function and may take into account, for example, the amount of disk space available, the system processing load, the I/O capacity, the number of members, or other factors.

Figure 8:
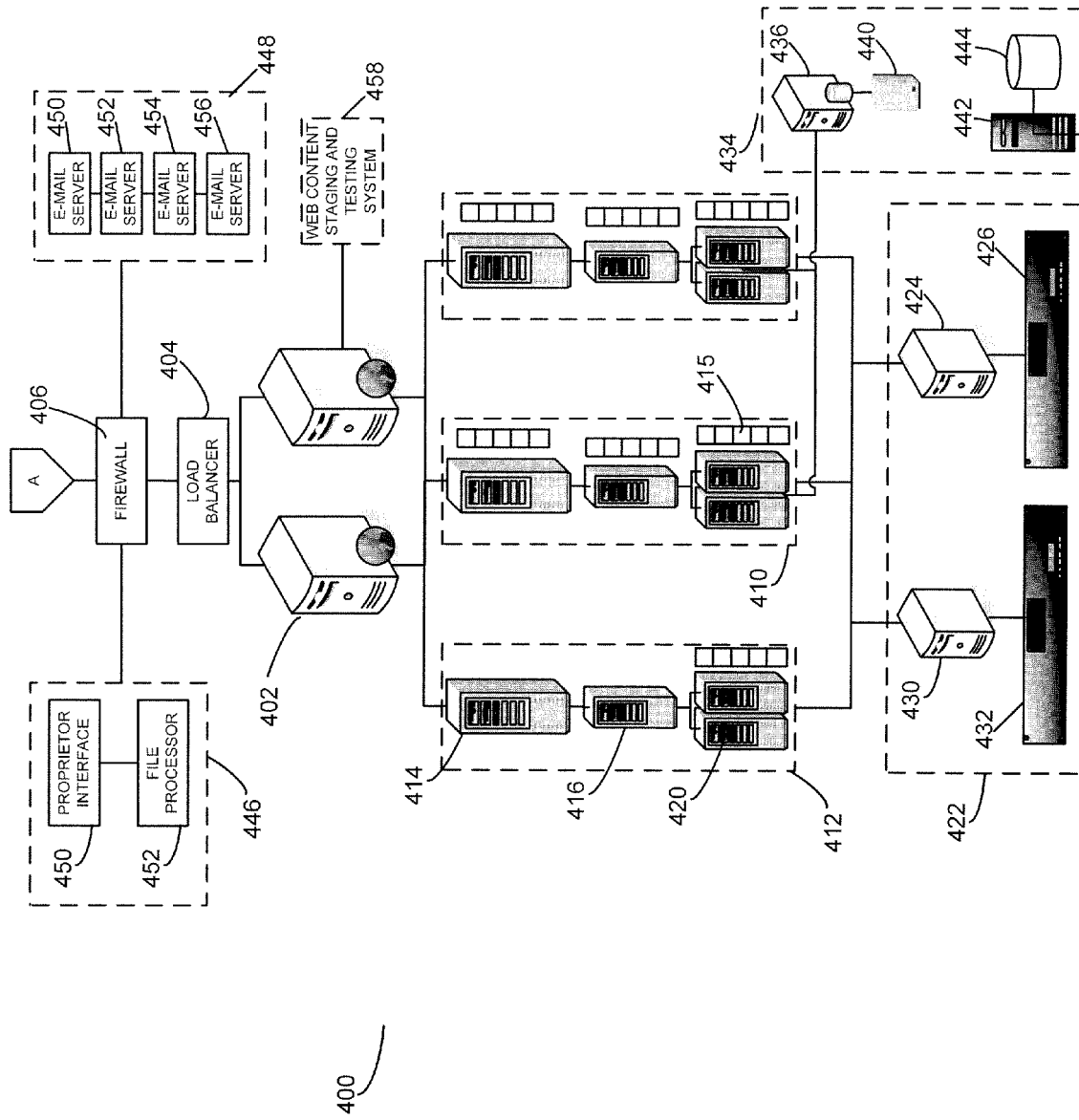
FIG. 8 is another diagram of one example of an enterprise system including a plurality of member server groups, a single administrative server groups, and several components and systems that may enhance system function.

With reference to FIG. 8, the system 400 may also include several components that may complement the awarding of points as previously described. Further, the components may also be added to any of the systems 150, 250, 350 as previously described. As described above, the system 400 may include a distributed architecture that is N-tier with web servers 402 that may communicate with a load balancer element 404, wherein the load balancer element 404 communicates with a system firewall 406 and the web servers 402. The load balancer 404 may randomly distribute all data entering the system 400 through the firewall 406 across the web servers 402. The load balancer 404 random distribution of data may reduce data latency through the system 400. The load balancer element 404 may include an application executing on a general purpose computer 50 or on any device associated with the system 400 as either software or hardware.

The system firewall 406 may provide a secure, high-speed connection to a computer network such as the Internet as illustrated in FIG. 1. The web server 402 may face the users and communicate with a number of silos 410, 412. A silo 410, 412 may be a conceptual collection of servers that work together through an application interface. Each silo 410, 412 may include an application server 414 executing a system application program 415, wherein the application server 414 may communicate between the web server 402 and a master data server 416, and the master data server 416 may communicate with replication data servers 420. A system application program 415 running on the application server 414 may perform any coordination, transformation, or update process on the data entering or exiting the master data server 416. Further, a system application program 415 may execute on any general computing device 50 in communication with the master data server 416. A system application program 415 running on the application server 414 may include, for example, any combination of an e-mail engine, a query engine, a validation engine, a crypto engine, an award engine, or a transaction engine. The replication data servers 420 may include a duplicate copy of the user profile data assigned to a silo 410, 412.

The silos 410, 412 may provide simple system expandability by providing more silos 410, 412 to the system. The silos 410, 412 may also provide specialized functions within the system 400. For example, the silos 410, 412 may include an administrative silo 412 and member silos 410. The administrative silo 412 may be used by the system 400 to manage system information, campaign information, or any other information that may not relate to the user profiles. The administrative silo 412 may also include a lookup table that may direct any data queries to the correct member silo 410. The member silos 410 may hold an equal or approximately equal fraction of the total amount of user information contained in the system 400 as determined by the load balancer 404. As illustrated in FIG. 8, a system comprising two member silos may each hold approximately 50% of the total system 400 user information. Upon registration, a user's information may be randomly stored in one member silo 410. The silo containing the user's registration data may be called the user's "home silo." Each user's information may be kept in the user's "home silo," and may remain in the home silo unless the member silos 410 may be rebalanced. By randomly assigning profiles to the silos 410, 412, the system load may be balanced and the number of user profiles saved to a single member silo 410 may be no more than any individual silo 410.

Further, the silos 410, 412 may collectively communicate with a backup system 422. The backup system 422 may store a duplicate copy of all data stored in the system silos 410, 412. The backup system 422 may include a very high memory capacity server including a primary backup server 424. An example of a very high memory capacity server 424 may be a 2 TB array server. The primary backup server 424 may communicate with a high capacity data cache 426. An example of a high capacity data cache may be a 21 slot, 2-drive LTO2 tape library such as the Exabyte® Ultrium™ family of LTO tape drives. The backup system 422 may further include a secondary backup server 430. The secondary backup server 430 may also be a 2 TB array server. The secondary backup server 430 may also communicate with a secondary high capacity data cache 432. An example of a secondary high capacity data cache may be an LTO3 tape drive such as the Quantum® LTO-3 drive.

The member silo 410 replication data servers 420 may collectively communicate with a data warehouse system 434. The replication data servers 420 may communicate with a database server 436. The database server 436 may include an extract/transform/load (ETL) server. The database server 436 may communicate with a data warehouse server 440. The data warehouse server 440 may include a 2 TB array. The data warehouse system 434 may also include legacy data related to prior versions of the points-awarding system 400. The legacy data may be stored in a modular workgroup server 442 such as the Sun Microsystems® E420R. The workgroup server 442 may further communicate with one or more data stores 444 containing the legacy data.

A proprietor interface system 446 may also communicate directly with the system 400 through the system firewall 406. The proprietor interface system 446 may allow a proprietor to directly access user data stored on the system silos 410, 412. This access may allow the proprietors to collect demographic and statistical information concerning the user data on the silos 410, 412. The proprietor interface system 446 may include a proprietor interface 450. The proprietor interface 450 may be a secure connection to allow the proprietors to upload or download data to the system 446. The proprietor interface 450 may employ a protocol enabling the secure transmission of web pages such as hypertext transfer protocol over a secure socket layer (https).

The proprietor interface 450 may be in communication with a file processing element 452. The file processing element 452 may allow proprietors to access the system 400 to shop for demographics information or to store and process client information or added demographics questions for use during user registration. Proprietors may also upload member activity which is stored as member transactions in the member's home silo and which may, further, trigger both billable activity transactions and award transactions in association with each particular member and each particular campaign.

An e-mail relay system 448 may also communicate with the system 400 though the firewall 406. The e-mail relay system 448 may include four servers 450, 452, 454, 456 in communication with the system 400. The e-mail relay system 448 may direct incoming e-mails, such as delayed bounces from outgoing bulk mails sent by the system, to the proper components of the system 400.

A web content staging and testing system 458 may also communicate with the system in a variety of methods. For example, the web content staging and testing system 458 may communicate with the system 400 through the web severs 402. The web content staging and testing system 458 may comprise a number of general computing devices 50 that may provide a secure and efficient environment for system 400 administrators to develop a variety of data for the system 400 before the data may be deployed live.

Figure 9:
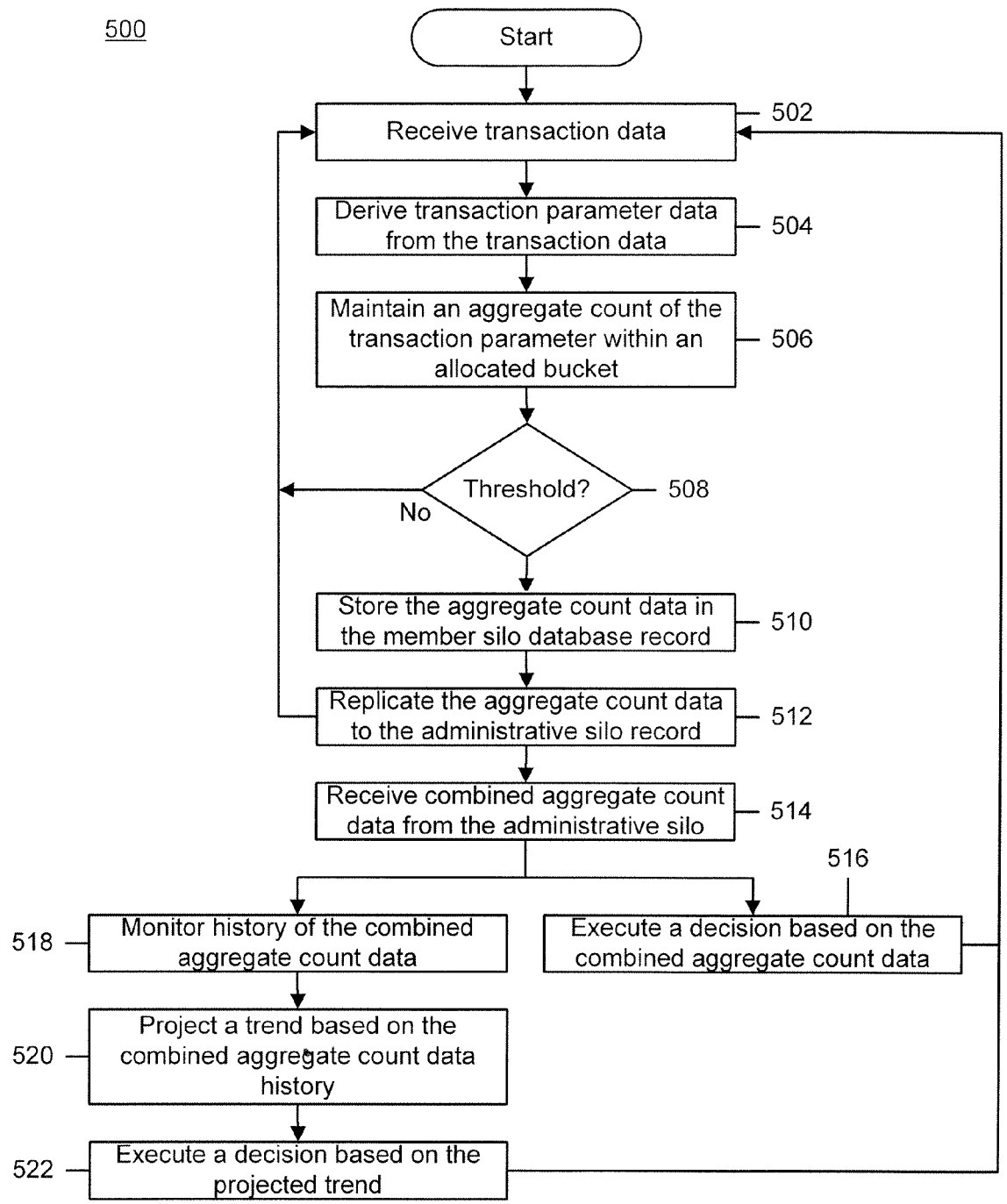
FIG. 9 is flowchart describing a method of one example of real-time aggregate counting of transaction parameters using the member server groups of FIGS. 5, 7 and 8.
Figure 10:
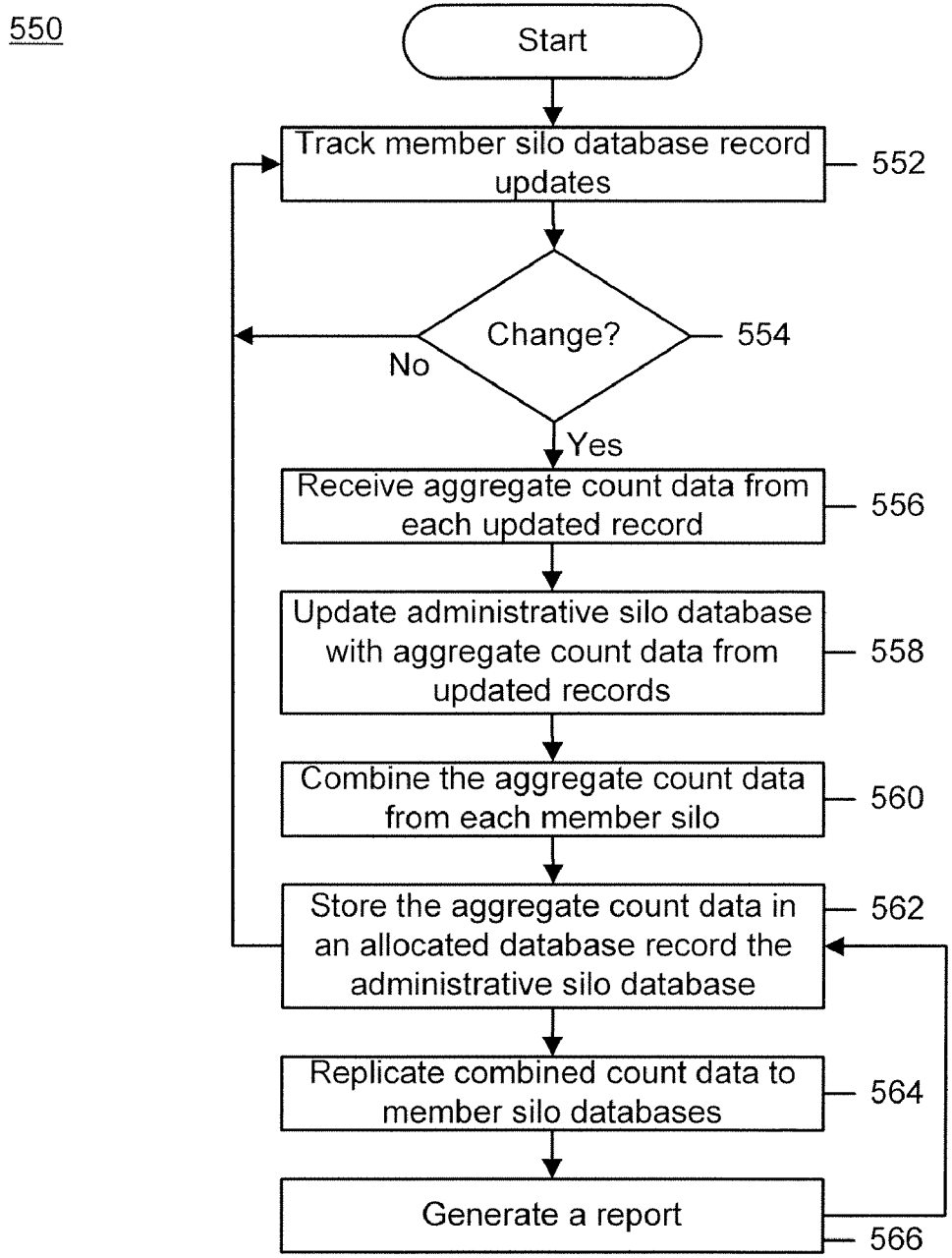
FIG. 10 is flowchart describing a method of one example of real-time aggregate counting of transaction parameters using the administrative server groups of FIGS. 5, 7 and 8.

An efficient method of real-time aggregate counting of activity parameters distributes the tasks of counting across a number of member silos/server groups, an exemplary embodiment of which is illustrated in FIGS. 9 and 10. The methods of FIGS. 9 and 10 may be utilized in conjunction with any of the exemplary system architectures disclosed in FIGS. 1-3, 5, 7, and 8, as well as any other similar architecture. The methods 500, 550 are disclosed hereafter with reference to the components shown in FIG. 7, however one of ordinary skill in the art will appreciate that the methods 500, 550 could be implemented using the components from the embodiments disclosed in FIGS. 1-3, 5, 8, or any other similar embodiments. As an overview, activity data is continuously received by one or more of the member silos 360 in the enterprise system 350. Various activity parameters may be derived from the activity data, and counts may be maintained for each of the activity parameters. The activity parameters are counted in the memory of the application servers 364 of each of the member silos 360 where the aggregate counts are periodically flushed to the master data server 366, and replicated to the administrative silo 362 when updated counts are available. The administrative silo 362 combines the counts from the various member silos 360 and replicates the combined counts back to the member silos 360 so that every part of the distributed system has a total aggregate system-wide count with only a slight delay (e.g., a few seconds or minutes). This configuration provides scalability to a large number of different "real-time aggregates," allowing for different classes of events to be counted efficiently and the performance thereof to be monitored in real-time (e.g., accurate to within less than a minute). For example, the real-time aggregates may provide an efficient way for the web servers 352 and/or the load balancers 354 to determine the relative utilization of each member silo 360, because each member silo 360 is aware of both its own rate of activity (e.g., the number of activities per minute, the number of activities per day, the number of members, etc.) and the rate of activity system-wide. That is, each member silo 360 may determined, locally, whether its rate of activity is below average or above average and provide such information to the web servers 352 and/or the load balancers 354. A member silo 360 may thereby indicate its ability, or lack thereof, to take on additional loads (e.g., new members, etc.) because of its known utilization in relation to system-wide utilization of other member silos 360.

Referring to FIG. 9, a member silo 360 may receive activity data based upon any activities which may be measured by the system (block 502). For example, the activity may relate to a campaign, such as a campaign for offers to members, campaigns to acquire members, marketing activity, emails, errors, or any kind of system activity, business activity, or member activity on the system. The activity data may relate to a member action in connection with the campaign, such as reading an email, signing up for a service, etc. The activity data may be received by the system at a high rate and received by each member silo 360.

Various activity parameters may be derived from the activity data (block 504), which may be generated from the activities on the system. Examples of various activity parameters may include, but are not limited to, a click on an Internet link, points awarded, a dollar amount, a registered member, a unit of measurement, an email sent, an email read, an email bounce, an error occurrence, an error type, or any activity parameter which may be a useful measurement of system activity, business activity, or member activity. Within a particular campaign, a large number of activity parameters may be created, due to a multiplicative nature of the activity parameters. For example, in a marketing offer, there may be a set of activity parameters for each offer and there may be many offers. For instance, if 10 activity parameters are tracked for each offer (e.g., click-throughs, conversions, sign-ups, points awarded, revenue generated, etc.) and there are 500 offers, there are 5000 total activity parameters to be tracked. Due to the distributed nature of the system, each of the member silos may receive the activity data related to any one campaign.

In order to track an activity parameter, an aggregate count of each activity parameter may be maintained and stored in smaller memory portions of the application server 364 memory (block 506). The smaller memory portion of the application server 364 may be called a "bucket." As such, each aggregate count or aggregate type is allocated a memory portion or "bucket," where the aggregate type relates to an aggregated count of an activity parameter and the memory portion or "bucket" maintains the aggregate count data resulting from the aggregated count of the activity parameter. In the memory, there could be a very large number of aggregate types, for example thousands or hundreds of thousands, due to the number of campaigns at any particular time, each having various activity parameters being tracked to monitor the performance of the campaign. For each aggregate type, different counts may be maintained, such as daily, monthly, total since inception or any other choice of time horizon. Accordingly, an aggregate type may be any kind of desired count of any time horizon, with separate memory portions or "buckets" maintained for each time horizon. Examples of aggregate types may correspond with the activity parameters, such as the number of click-through activities for a marketing campaign, the number of points awarded under a marketing campaign, the number of clicks on an Internet link, the number of members who visited a web site, the total dollars in revenue earned, the total bounties payable under a contract, a unit of measurement, etc. The increments for each count may be individual events or any other kind of numeric value (e.g., dollars/cents, points, pounds, gallons, etc.), and may be either positive or negative.

However, within any given time window (e.g., a few seconds or a few minutes), only a small number of the memory portions or "buckets" are being updated with new aggregate count data. For example the system may have thousands of different campaigns that were active at one time or another, but only a small percentage of which are still active. As a result, only those campaigns that are still active result in an updating activity to a memory portion or "bucket" such that new or updated aggregate count data is maintained by the memory portion or "bucket" allocated to the particular activity parameter(s) associated with the active campaign. The member silos 360 may maintain only the active memory portions or "buckets" within a memory of the application server 364. Memory portions or "buckets" that have not been referenced within a threshold period of time (e.g., 1 minute, 15 minutes, a day, etc.) or based on any other threshold measurement, may be removed from the memory of the application server 364 and stored within an aggregate database record allocated to the campaign or activity parameter within the master data server 366 until the memory portion or "bucket" is needed again, if ever. For example, if a memory portion or "bucket" is allocated to an activity parameter and new activity data having the activity parameter is received, but the memory portion or "bucket" is not in the memory of the application server 364, the memory portion or "bucket" may be recreated in the memory of the application server 364 (block 506). The system may then fetch the last total from the database, bring the total to the memory portion or "bucket" and the memory portion or "bucket" may begin maintaining the aggregate count data again.

Periodically (e.g., every few seconds, minutes, etc.), the aggregated count data maintained within a memory portion or "bucket" is flushed to an aggregate database record maintained in a database of the member silo 360, such as the master data server 366 or replication servers 370. This allows an in-memory counter to be rapidly updated (e.g., 100 times per second), but the operation of updating an aggregate database may occur at a slower rate thereby allowing the update process to be less time-consuming than updating the aggregate database record with each update to the memory portion or "bucket," for example. For example, if 100 updates per second are occurring, then 100 updates to the memory portion or "bucket" may result in only a single database update rather than 100 database updates, which may be of particular importance if each update takes, say, ½ second. The database could not keep up. It would take 50 seconds to update the database with 100 updates, but the system only has one second to do so, without falling behind. The period in which the aggregate count data is flushed to the aggregate database record may be tunable.

It should be noted that during each period in which aggregate count data is flushed to an aggregate database record, the system may be designed such that the only aggregate count data which is actually flushed by writing to the database is aggregate count data which changed since the last flush, which, during any given interval, may be only a small portion of all the aggregates which are otherwise being actively updated during any given larger period of time. As such, the aggregate count data within a memory portion or "bucket" may be tracked and only updates to the aggregate count data may be flushed to the aggregate database record, and the efficiency of the process is enhanced. Further, it should be noted that in addition to creating separate aggregate database records for each activity parameter, separate database records may be maintained for particular time periods, such that activity parameter data aggregated within a particular hour, day, week, and/or any other defined time period may be maintained within separate aggregate database records. Database records may only be created and aggregate count data stored therein if an activity occurs within the time period. If a memory portion or "bucket" is inactive (e.g., no activity occurs within the defined time period), the aggregate database record associated with the time period may not be created. Referring again to FIG. 9, the routine 500 maintains a threshold count (e.g., size of the aggregate count data, period of time, etc.) and if the threshold is met (block 508), the aggregate count data may be stored within (e.g., flushed to) the aggregate database record (block 510).

An aspect of the real-time aggregate counting includes the ability to take the aggregate count data from each of the distributed databases in each of the member silos 360 and periodically accumulate the aggregate count data (e.g., every few seconds, minutes, hours, daily, etc.) into a single database maintained by the administration silo 362 for easy monitoring and reporting. In this way, high activity rate real-time aggregation counts may be recorded and displayed efficiently across a large distributed system. To this end, each of the member silos 360 may periodically receive a database query, such as an SQL query, from the administrative silo 362 to find only those aggregate database records that have been updated with additional aggregate count data. If a member silo 360 receives such a database query and has one or more aggregate database records that have been changed or updated since the last time the member silo 360 replicated the aggregate count data of the aggregate database record to the administrative silo 362, the member silo 360 may replicate the aggregate count data to the administrative silo (block 512).

As described further below, the administrative silo 362 collects aggregate count data from each member silo 360 within the system and combines the aggregate count data to track the aggregate count data system-wide. The combined aggregate count data may be replicated back to each member silo 360 (block 514), such that each member silo 360 within the distributed system has the total aggregate, system-wide count of an activity parameter. Each member silo 360 may use the combined aggregate count data to perform various functions, such as using the combined aggregate count data to execute a decision (block 516). For example, in a marketing campaign that has an offer to sign up a limited number of people, the sign-ups may occur on any of the member silos 360. The system can keep track of the total sign-ups by having each member silo 360 count the number sign-ups associated with that member silo 360, combining the aggregate count data of the sign-ups from each of the member silos 360 on the administrative silo 362 and replicating the combined counts back to the member silos 360. Using the system-wide, combined aggregate count data of the number of sign-ups, the member silos 360 may individually (locally) make the decision to stop signing up more members when the offer limit is reached. As a result, each member silo 360 may make decisions based on system-wide knowledge.

In another example, each member silo 360 may monitor the history of the combined aggregate count data (block 518) and make projections (e.g., project trends) based on the history (block 520). The projections may be determined based on linear regression, curve fitting or any number of modeling and projection techniques. Using the projection, the system can intelligently and timely respond to activity system-wide, even if the replication delay is large, and make decisions accordingly (block 522).

Referring to FIG. 10, an administrative silo 362 may track updates to the aggregate database records of each of the member silos 360 (block 552). In particular, the administrative silo 362 keeps track of which aggregate database records have changed since the last time the particular aggregate database record was changed or updated. The tracking may be accomplished using a database query, or SQL query, to find updated records. If updates to aggregated database records occur (block 554), based on responses from the member silos 360, the administrative silo 362 may receive the values of the aggregate count data of the updated aggregate database records (block 556) and use only the updated aggregate count data to update the combined aggregate database record maintained by the administrative silo 362 (block 558), rather than trying to update every record for every aggregate count type.

The administrative silo 362 combines all of the aggregate count data received from each of the member silos 360 (block 560) to create the real-time combined (i.e., system-wide) aggregate count of an activity parameter, which may be stored within a combined aggregate database record maintained by the administrative silo 362 (block 562). As mentioned above, the combined aggregate count data may be replicated back to each of the member silos 360 (block 564). The administrative silo 362, the web server 352 and/or the load balancer 354 may also use the combined aggregate count data to perform a variety of functions. For example, reports relating to one or more activity parameters may be generated (block 566) in order to monitor the performance of a particular campaign and/or make real-time decisions (e.g., load balancing) based on the system-wide combined aggregate count data.

Figure 11:
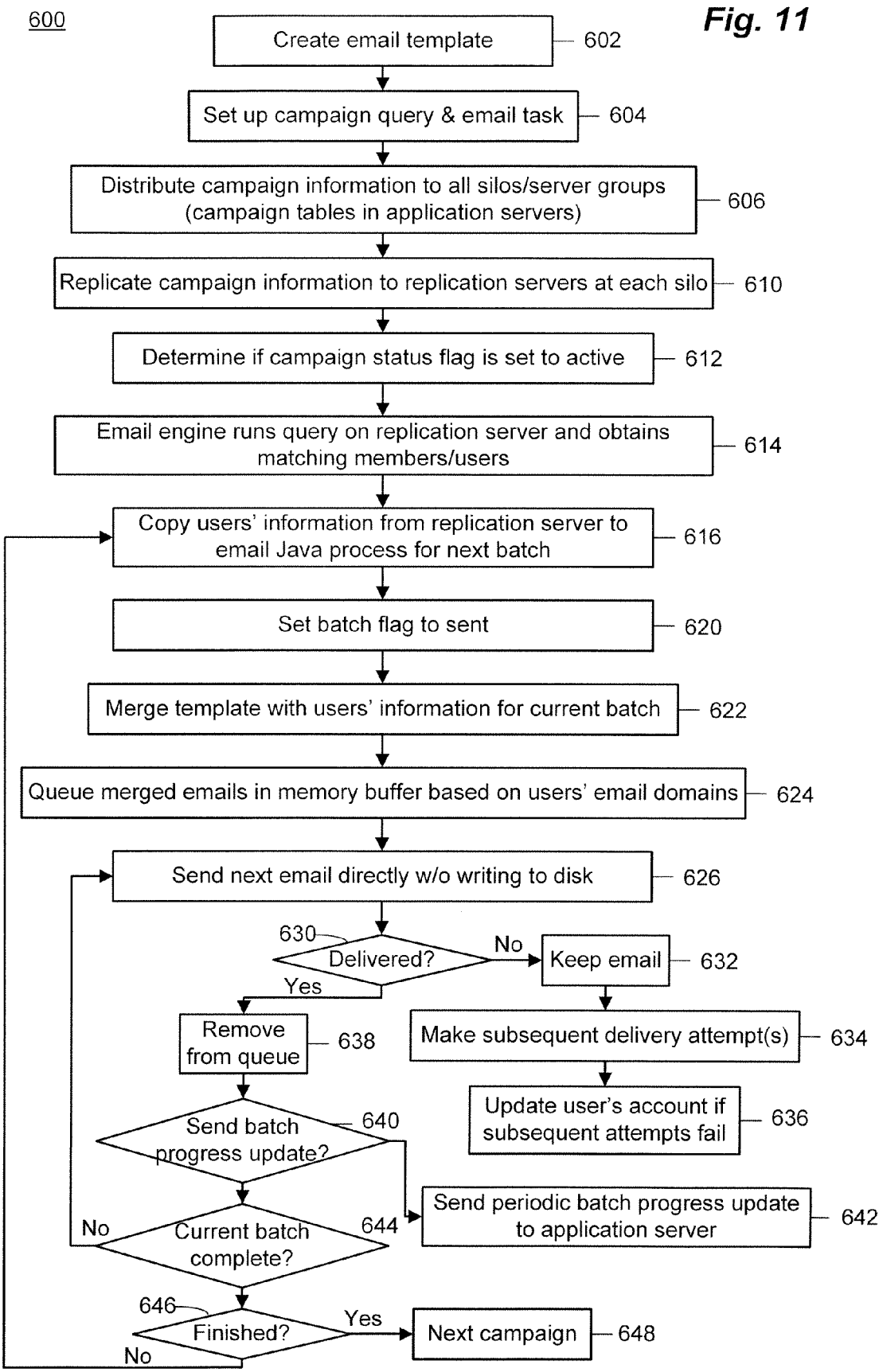
FIG. 11 illustrates exemplary flowchart illustrating several steps that may be utilized in a method of efficiently generating and sending e-mails.

An efficient method of generating and sending e-mails distributes the tasks across a number of member silos/server groups, an exemplary embodiment of which is illustrated in FIG. 11. The method 600 of FIG. 11 may be utilized in conjunction with any of the exemplary system architectures disclosed in FIGS. 1-3, 5, 7, and 8, as well as any other similar architecture. The method 600 is disclosed hereafter with reference to the components shown in FIG. 7, however one of ordinary skill in the art will appreciate that the method 600 could be implemented using the components from the embodiments disclosed in FIGS. 1-3, 5, 8, or any other similar embodiments. As an overview, a query for sending out a large number of e-mails is distributed across all of the member silos 360 in the enterprise system 350, wherein the member silos 360 are all running in parallel. This configuration provides automatic scalability for outbound mail as well as for member transactions capabilities. This is accomplished with the use of e-mail engines 365 at the member silos 360.

The e-mail engine 365 runs on one or more of the replication servers 370 in each member silo 360. While the e-mail engine 365 could alternatively run on the application server 364, it is more scalable and efficient for the e-mail engine 365 to run on the same server machine as the database engine itself. The results of running the e-mail engine for 65 on the replication server 370 is that the load associated with outbound e-mails and related database queries is isolated from the load of incoming transactions and other requests from members.

Referring to FIG. 11, a user may create an e-mail template (block 602) and set up a campaign query along with an e-mail task (block 604). The e-mail template, campaign query, and e-mail task may be transferred to the administrative silo 362 or created on the administrative silo 362, and then distributed to all member silos/server groups 360 in the system 350 (block 606). A campaign query and e-mail task that is distributed to the member silos 360 may include all of the information associated with the campaign query, or a portion thereof. This data distributed to the members silos 360 is relatively small in comparison to the member data stored at the member silos 360. The campaign data is then replicated down to the replication servers 370 and stored in campaign tables through the normal replication mechanism. Thus, it is not necessary to send a separate command to the replication servers 370 to run the campaign.

As previously discussed, the in-memory bulk e-mail engine 365 is an example of a distributed application that resides on each of the member silos/server groups 360 and may further reside on each silo's replication data servers 370. Because the e-mail engine is distributed onto the replication servers in each member silo 360, the e-mail engine 365 does not affect the performance of system transactions involving the user data. This is because the transactions taking place in the master database servers are not affected by the load of running the email engine.

The e-mail engine 365 may be further programmed to consider which campaigns need to be completed, which e-mail tasks have been assigned, which campaigns have been set to active (block 612), calculate a priority for a particular task, etc. In other words, the e-mail engine 365 automatically queries whether campaigns have been set to become active or inactive, either explicitly by a user and/or by the passage of time based on scheduled start and end dates during which the campaign must run. The e-mail engine 365 may be configured to start campaigns that become active and reach the scheduled start date. The e-mail engine 365 may also be configured to stop campaigns, even if some of the e-mails in the campaign were not sent, upon being set manually to inactive or upon reaching the end date of the campaign. In particular, this occurs not only before the campaign query, but even as the campaign is running. A campaign may be temporarily halted and continued at a later date or time as well, and the system may ensure that no duplicate e-mails are sent and that sending resumes where the e-mail engine 365 left off.

Calculating system-wide priorities of e-mail tasks is an example of the use of real-time aggregates. Counts of e-mails sent, emails queued, emails bounced, and so on, may be tracked by real-time aggregates and are available to an administrative interface for a view of the system-wide email activity. This can be used to make decisions about launching additional email campaigns, setting relative priorities and dates for completion of campaigns, and to identify problems (such as deliverability problems to specific domains or ISPs). For example real-time aggregates can track the relative rate of email bounces for each individual email domain during different time horizons. A spike in the level of bounces indicates a new problem.

The e-mail engine 365 runs on the silos 360 and selects the members to target by running a query on the silo's local copy of the database (i.e., replication server(s)) 370, and obtains the matching members (block 614). The e-mail engine 365 may also perform the target query in batches to further reduce the processing load on the silo 360. In other words, the campaign query is run by an e-mail engine 365 on each of the replication servers 370 in each of the server groups 360 in parallel, so that the campaign query runs all on every server group 360. The e-mail engine 365 could alternatively specify that a query and a resulting bulk e-mail should be generated only on a subset of the server groups 360. This may be useful, for example, if some server groups 360 are down for maintenance or due to other problems, or if there is further specialization of server groups.

An alternative configuration could include two or more replication servers in a single server group to be simultaneously running an e-mail engine and separately merging and sending different subsets of each e-mail campaign. This would allow for increased scalability.

After performing the target query, the e-mail engine 365 retrieves a working set of the matching members and copies those members information in memory from the replication server 370 into the e-mail process which is running in Java, or any other suitable programming language (block 616). The e-mail engine 365 may optionally set batch flag to sent for the batch of e-mails that it is currently processing (block 620).

The e-mail engine 365 then merges for the current batch, a proprietor campaign e-mail template with each user's profile information to generate a user targeted e-mail (block 622). By performing the merge in batches, rather than for each individual e-mail, the e-mail engine 365 may avoid excessive processing at the silo 360. Therefore, a silo or server crash may lose a small amount of data, but, once a batch is marked as "started processing," it is not re-processed to avoid erroneously sending multiple identical e-mails to the same member. If, for example, the email engine 365 crashes, a batch would not be re-processed. But if the email engine is gracefully shut down, such as for software upgrades or server maintenance, the email engine 365 makes a note of what batches were in progress and what member emails had been merged but not sent. Then it discards the actual merged emails and re-merges them when processing is later resumed.

In other words, if the server crashes, then the batch which was being processed at the time may be lost and an unknown number of e-mails from the batch will have been sent. The batches may be small relative to the total size of a campaign. A typical batch size might be 100 or 1000 members in a campaign which might be 100,000 or one million members. This avoids the possibility of double sending.

Furthermore, the e-mail engine 365 does not need to update the database with information about e-mails which are sent, on every individual e-mail. To do so would be very inefficient because the e-mail engine 365 may send millions of e-mails every day. This is a trade-off between perfect accuracy, which is not particularly important, and efficiency, which is more important.

An individual server in a server group may be shut down temporarily, for example, to upgrade software, or because there are problems with the system or with ISPs in which the e-mails are being sent. When this happens, the e-mail engine 365 may be programmed to remember which batch it was working on and how far it progressed before discarding the merged e-mails for the unprocessed members in the batch. When the e-mail engine 365 is later restarted, the e-mails are merged again for those members in the batch which had not yet been processed. In general, any e-mails left in the queue and remaining unsent can be regenerated by merging again. Thus, the fully merged e-mails do not need to be stored when the e-mail engine 365 is shut down. Rather, a simple list of members and associated campaigns need to be stored, which is a much smaller amount of information. E-mails may remain in the queue for several days.

Further, the e-mail engine 365 may process multiple campaigns at once and may further prioritize merging to achieve the most efficient throughput and meet campaign delivery time constraints. The e-mail engine 365 may prioritize tasks within each campaign given the total number of targeted members against the deadline for the specific e-mail task.

Still referring to FIG. 11, the method 600 may also include queuing the merged e-mails in a memory buffer based on the members' e-mail domains (block 624). The e-mail engine 365 may be configured to queue the merged e-mails in the memory buffer for very large domains which have a large number of members because it is more efficient to deliver many e-mails in a single connection to a domain. For example, the e-mail engine 365 may open a connection to Yahoo!, or any other large ISP, and deliver 100,000 e-mails to its members. The e-mail engine 365 then sends the e-mails directly without writing a copy of the merged e-mails to a disk (block 626). In other words, the e-mail engine 365 never actually creates a file, which is substantially different from traditional methods of sending bulk e-mails. Because the e-mail engine 365 does not store the generated targeted e-mails, it thereby avoids a disk input/output bottleneck at the silo 360. By executing both in-memory processing and batch-oriented status updates without the risk of double sending, the bulk e-mail engine 365 may achieve a high rate of efficiency and only a minimally less-than-perfect accuracy.

The method 600 may then determine whether or not the e-mails have been delivered (block 630). If it is determined at the block 630 that a particular e-mail was not delivered, as a result of a bounce, for example, the e-mail engine 365 may record the failed delivery in memory (block 632). The e-mail engine 365 may be further programmed to make subsequent delivery attempts to deliver the e-mail to the member (block 634). If after several delivery attempts the e-mail has still not been successfully delivered to the member, the e-mail engine 365 may be configured to update the member's account in the application server 364 (block 636). The application server 364 may record the last ten bounce messages for each member to provide information, such as troubleshooting data, to the enterprise administrators. An average bounce rate of 3% to 8% is fairly typical, so that updates to member accounts represent only a small portion of all attempted email transmissions.

The e-mail engine 365 could also be programmed to send other status information from the e-mail engine, wherever it is running, to the application server 364 so that each member's profile is updated. Examples of status information could include, for example, counts of e-mails bounced and e-mails sent for each member. This transfer of status information may be done in batches for a large number of members at one time to increase efficiency. This is possible because neither the e-mail engine 365 nor any other system components depends on this information being updated instantly, nor is any critical function jeopardize by the loss of a small amount of this information should it fail to be updated before a system crash.

If it is determined at the block 630 that the e-mail was delivered to the member, the e-mail engine 365 will remove the e-mail from the queue (block 638) without ever saving a copy of the e-mail. If the e-mail engine 365 is programmed to send periodic batch progress updates to the application server 364, the e-mail engine 365 may check to see if it is time to send a batch progress update (block 640). If it is determined at the block 640 that it is time to send a batch progress update, the e-mail engine 365 will send a batch progress update to the application server 364 (block 642). The application server 364 thus keeps information about how far into a particular e-mail task that the e-mail engine 365 has progressed so that it knows how to restart after a system failure or shutdown at an appropriate next batch.

If it is determined at the block 640 that a batch progress update is not necessary, the e-mail engine 365 may determine if the current batch of e-mails is complete (block 644). If it is determined at the block 644 that the current batch is not complete, the e-mail engine 365 will return to the block 626 and send another e-mail. If it is determined at the block 644 that the current batch has been completed, the e-mail engine 365 will determine if the current campaign is finished (block 646). If it is determined that the block 646 that the current campaign is not finished, the e-mail engine 365 may return to block 616 to complete a next batch of e-mails. If it is determined at the black 646 that the current campaign is finished, the e-mail engine 365 may move to a next campaign (block 648).

The e-mail engine 365 will merge the e-mail template with a set of information corresponding to each of the matching members from a second batch for each of the plurality of silos 360 after an occurrence on a least one of a hardware failure, a software failure, or a system shutdown during the sending of the merged e-mails in the first batch. The e-mails in the first batch that were not sent prior to the hardware failure, to suffer failure, or the system shutdown are thus not identified and not sent to the corresponding matching members.

The system may also be configured to permit an administrative user to expand a campaign by sending more emails for it, while ensuring that a member is not sent the same email twice. The e-mail engine 365, for example, could be programmed to perform this function. The e-mail engine 365 could be programmed to remember in a very efficient way which members were included in the campaign thus far and which members qualify for the query but have not yet been included in the campaign.

Figure 12:
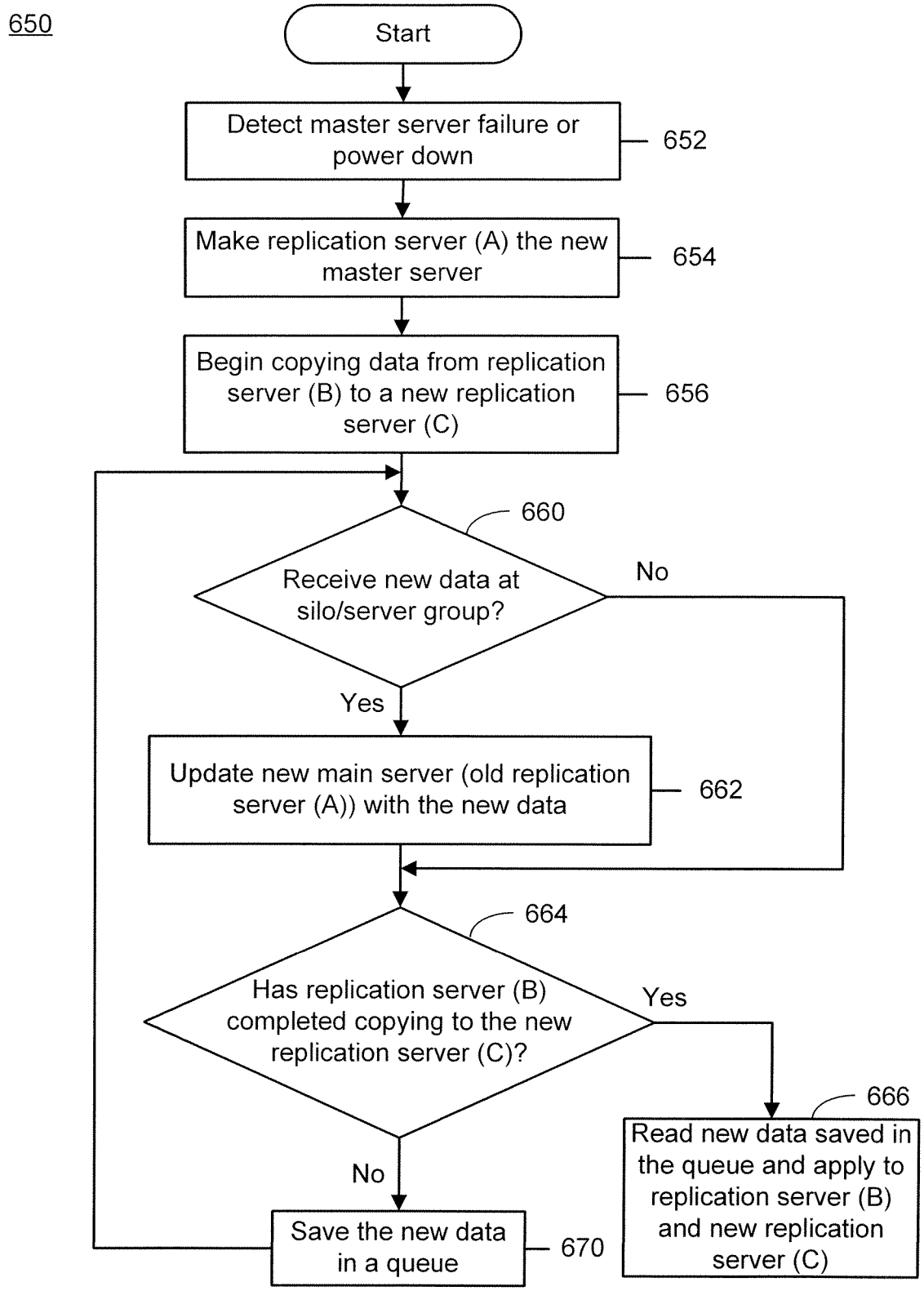
FIG. 12 illustrates an exemplary flowchart illustrating several steps in a method for providing three-way failover for a database utilizing two replication database servers.

A method for providing three-way failover for a database server group utilizing two replication database servers is shown in an exemplary embodiment which is illustrated in FIG. 12. The method 650 of FIG. 12 may be utilized in conjunction with any of the exemplary system architectures disclosed in FIGS. 1-3, 5, 7, and 8, as well as any other similar architecture. The method 650 is disclosed hereafter with reference to the components shown in FIG. 7, however one of ordinary skill in the art will appreciate that the method 650 could be implemented using the components from the embodiments disclosed in FIGS. 1-3, 5, 8, or any other similar embodiments.

Referring to FIG. 12, the method 650 may begin by detecting or identifying a master server 366 failure or power down (block 652). The failure may be, for example, a hardware failure or a software failure. If a master server 366 failure or power down is detected at the block 652, the method 650 may include designating a first replication server 370(A) as a new master server (block 654). Thereafter, the method may include copying existing data from a second replication server 370(B) to a new replication server (not shown) while the first replication server 370(A) functions as the new master server (block 656).

The method 650 may then continue with the copying while monitoring for the receipt of new data that has been directed to server group 360 (block 660), wherein the new data is associated with a portion of the existing data, and wherein the portion of the existing data was previously stored at the first and second replication servers 370(A)(B). If it is determined at the block 660 that new data was received, the new data is saved at the new master server (the first replication server 370(A)) (block 662).

After the new data has been saved at the new master server 370(A), the method 650 may check to see if the replication server 370(B) has completed copying the existing data to the new replication server (block 664). If it is determined at the block 664 that the replication server 370(B) has completed the copying of the existing data to the new replication server, the method 650 may include the second replication server 370(B) and the new replication server pulling updates from the new master server 370(A) (block 666), and each replication server does so independently at its own rate. Thus, the decision to start applying changes to the replication database is made on the replication process itself, and the new master server 370(A) does not participate in the decision. However, if it is determined at the block 664 that the replication server 370(B) has not completed copying the existing data to the new replication server, the new data may be saved in a queue at the second replication server 370(B) until the existing data stored on the second replication server 370(B) has been copied to the new replication server (block 670).

The new data is saved in the queue until the replication server 370(B) has completed copying the new data to the new replication server. The second replication server 370(B) then read the new data saved in the queue and applies the new data to the second replication server 370(B). The new replication server then pulls the new data from the new master server to the new replication server. In other words, on each replication server, there are two threads running. A thread is an application process and threads run concurrently. One thread polls the master database 366 for updated data and pulls a copy of new data from the master database's log into the replication server 370(B) and queues it there. The second thread reads from the local queue on the replication server 370(B) and applies the new data to the replication database. These threads may be referred to as thread 1 and thread 2.

Thus, the first replication server 370(A) is turned into a new "master" database server and the second replication server 370(B) is synchronized to it. That is, the data in the new master server 370(A) and the second replication server 370 (B) may be exactly equal. Then the second replication server 370(B) begins pulling new data from the new master 370(A) using its thread 1. Meanwhile, the new replication server is created by copying the second replication server's data to it. This can be done safely because thread 2 on the second replication server 370(B) is not yet running, so the data in the database on the second replication server 370(B) is not being updated. Once the copy is created in the new replication server, then it is set up to pull new data from the master database 370(A) using its own thread 1, just like the second replication server 370(B). Then, in both replication servers, thread 2 is turned on so that changes which are pulled are then applied as changes to the replication server databases.

Therefore, new data which arrives at the new master is essentially immediately transferred to a queue on at least one replication server so that if the new master were to then fail, a copy of the data would still be available. At the same time, it is safe to make a copy of the second replication server 370(B) data because no updates are being made to it. The data can not be safely copied from the new master while it was being updated with new data because it would be changing.

Thus, a number of unique synergies are realized. This includes the ability to copy data to a new replication server without putting a taxing load on the new master server 370(A) and the server group 360 does not experience any downtime. Utilizing two replication servers permits a rapid failover if any of one server fails within a server group, because the remaining two servers can be immediately reconfigured into a master-slave relationship and transaction process can continue without the risk of capturing transactions without replication. Utilizing only a single replication server, would require that a server group would have to wait for a new replication server to be set up by restoring data from backup tapes before replication could begin again. Thus, the data restore process could take hours, if not days.

Still referring to the method 650 of FIG. 12, the method could alternatively include preventing the e-mail engine 365 from running an e-mail campaign on the second replication server 370(B) until the existing data stored on the second replication server 370(B) has been copied to the new replication server. Similarly, the method 650 could include preventing the e-mail engine 365 from running a query on the second replication server 370(B) until the existing data stored on the second replication server 370(B) has been copied to the new replication server. Moreover, the method 650 could include directing a query to the new master server 370(A) until the existing data stored on the second replication server 370(B) has been copied to the new replication server. These applications, or any other applications that would require a great deal of processing power, could be halted and resumed after the existing data stored on the second replication server 370(B) has been copied to the new replication server.

It should also be noted that portions of the method 650 could be carried out manually. For example, a person could decide that the master server had failed and that a three-way failover is applicable. Those of ordinary skill in the art will readily appreciate that the steps could easily be automated as an alternative. It should also be noted that having three copies of the data under normal conditions provides greater throughput for running queries, such as for administrative users to view the data and to run reports and for the email engine to use, and so on.

A further aspect worthy of notation is that a three-way failover concept is equally applicable to a failure of a replication server. Such a method could include, for example, identifying at least one of a replication server failure or a replication server shutdown, and designating a new replication server, wherein the new replication server is operatively coupled to a first replication server 370(A), and a master server 366. The method could also include copying a set of data from the first replication server 370(A) to the new replication server and receiving new data at the server group 360 and saving the new data at the master server 366. Thereafter, the new data could be saved in a queue at the first replication server 370(A) until the set of data stored on the first replication server 370(A) has been copied to the new replication server; and the new data saved in the queue could be read and applied to the first replication server 370(A), and the new replication server could pull the set of data stored on the master server 366 to the new replication server.

One might argue that that even a single replication server could run a "thread 1" to pull new data while copying the database from backup tapes. However, this is not accurate. This is because, at least with MySQL and similar databases, replication must take place with respect to the replication database, and until it is actually restored, one does not necessarily know where to start pulling new data (i.e. to distinguish between new data and data which had already been copied into the replication database before the backup copy was created).

Figure 13A:
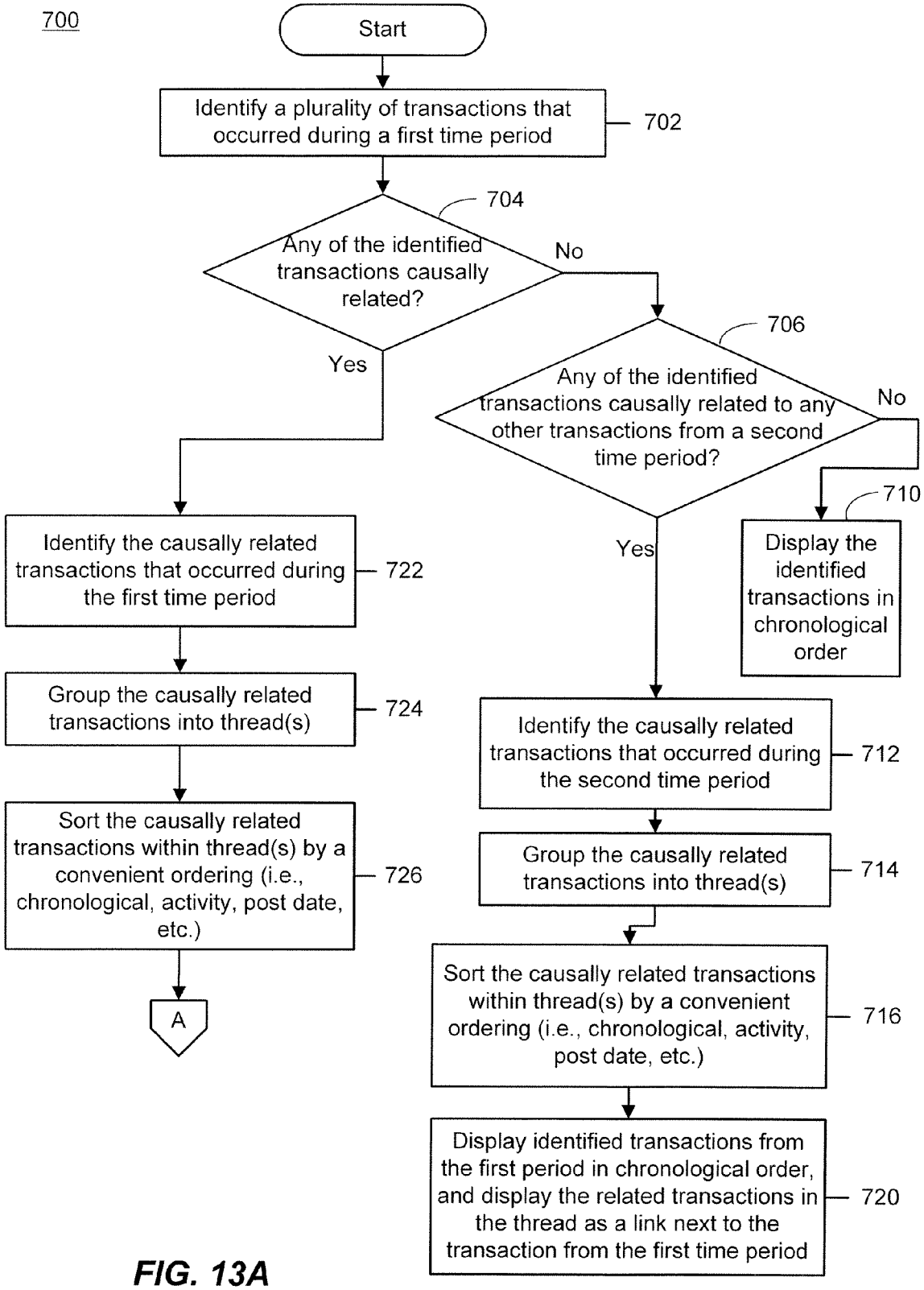
FIGS. 13A and 13B illustrate an exemplary flowchart illustrating several steps utilized in a method for associating threads with an account statement to provide access to a set of transactions.
Figure 13B:
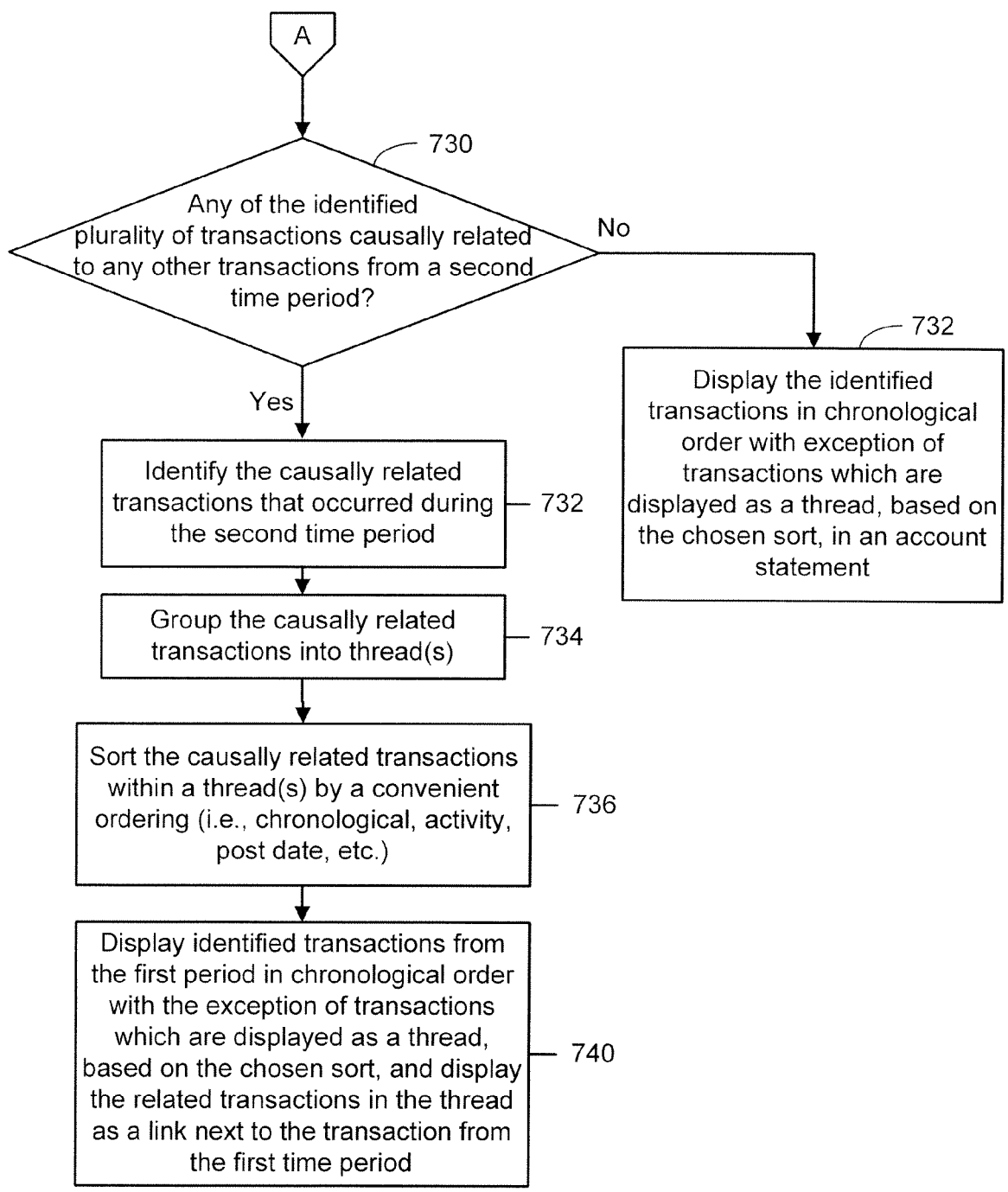

A method for associating threads with an account statement to provide access to a set of transactions related to a member is shown in an exemplary embodiment which is illustrated in FIGS. 13A and 13B. The method 700 of FIGS. 13A and 13B may be utilized in conjunction with any of the exemplary system architectures disclosed in FIGS. 1-3, 5, 7, and 8, as well as any other similar architecture. The method 700 is disclosed hereafter with reference to the components shown in FIG. 7, however one of ordinary skill in the art will appreciate that the method 700 could be implemented using the components from the embodiments disclosed in FIGS. 1-3, 5, 8, or any other similar embodiments. A screenshot 744 of a possible embodiment of an account statement is illustrated in FIG. 14.

As an overview, a thread consists of one or more causally related transactions. The transactions in a thread are not related merely by context, but instead they consist of a record of activity where one activity leads to another and another. In this way there may ultimately be an entire tree of causally related transactions within a single thread, where the root of the tree is the first (tracking) tracking transaction.

The first transaction in a thread creates the thread. The first transaction of a thread is referred to as a "tracking transaction" and frequently a tracking number is provided to proprietors so that the tracking identification may be returned with records of additional activity that leads from that initial tracking transaction. The tracking transaction frequently is used to record an agreement between MyPoints, a member, and a proprietor, to follow the rules associated with a particular campaign. That is, the tracking transaction may (but need not always) define a particular point in time where a particular member agrees to particular rules about a particular offer (with a particular cell) and its own terms and conditions. It may also represent the point in time for a particular member and MyPoints to agree on other terms and conditions such as when the member closes their account and we record a tracking transaction for the account status change, such terms and conditions including, for example, the forfeiture of points in the account at the moment it is closed. In this sense, a tracking transaction may serve as a kind of "signature", a record of agreement, by the member, with a particular date and time and a set of terms and conditions.

Typically a tracking transaction is a clickthru on a web page corresponding to a particular offer with a proprietor, or similarly, a clickthru on a link in an email which proposes an offer, although other activities may become the initial transaction (a tracking transaction) for a thread. As additional activity is generated in connection with the thread, transactions are added to the thread. Showing a view of the account statement consists of showing a set of threads and their transactions. The user decides what time period to show and each thread is selected for display only if it has at least one transaction which was posted during the user's selected time period. The threads are typically sorted so that the thread with the most recent activity during the time period appears first and the thread whose most recent activity is the least recent of all the threads in the time period is displayed last. Threads which have no activity during the time period (i.e. no transactions were added to the thread during the time period) are not displayed. Furthermore, for each thread, only the transactions which were posted during the user's selected time period are shown. If any other transactions exist for that same thread but outside of the user's selected time period, then additionally a hyperlink is provided which says "see all related transactions". Clicking on that click shows the user ALL transactions for the thread, regardless of time period. Within the display of each thread, the transactions are typically displayed in the order in which they were posted to the system.

Referring to FIG. 13A, the method 700 may begin by identifying a plurality of transactions for a member that occurred during a first time period (block 702). The method 700 may then determine if any of the identified transactions are causally related (block 704). Causally related transactions are those transactions that are related based on a similar context. Several examples of causally related transactions are described below. If it is determined at the block 704 that none of the identified plurality of transactions are causally related, it may be then determined whether or not any of the identified transactions are causally related to any other transactions from a second time period. The first time period may be, for example, one week, and the second time period may be, for example, one year or the time since the person became a member.

If it is determined at the block 706 that none of the identified plurality of transactions were causally related to any other transactions from the second time period, the method 700 may display at least a portion, such as the first 20, of the plurality of identified transactions from the first time period in a specified order, such as chronologically, for example (block 710). If it is determined at the block 706 that one or more of the identified transactions are causally related to other transactions from the second time period, the method may identify the causally related transactions that occurred during the second time period (block 712) and group the causally related transactions into one or more threads (block 714).

The method 700 may then sort the causally related transactions within each of the one or more threads by a convenient ordering (i.e., chronological, activity, post date, etc.) (block 716), display at least a portion of the plurality of identified transactions in the first time period in a specified order, such as, for example, chronologically, and display the causally related transactions from the second time period for at least one of the one or more threads as a link next to the causally related transaction in the first time period (block 720). Displaying the plurality of identified transactions may include displaying the transactions on a computer monitor or printing the transactions on a piece of paper. Also, a screenshot 746 of an exemplary embodiment of an account statement is illustrated in FIG. 15 which includes a link 748 to a set of causally related transactions. The link 748 is titled "See all related transactions." FIG. 16 illustrates a screenshot 749 of an exemplary embodiment of an account statement showing transactions from FIG. 15.

Still referring to FIG. 13A, if it is determined at a block 704 that one or more of the identified transactions that occurred during the first time period are causally related, the method 700 may identify a set of causally related transactions that occurred during the first time period, wherein the set of causally related transactions is a subset of the plurality of transactions that occurred during the first time period (block 722). The method 700 may then group a set of causally related transactions into one or more threads (block 724) and sort the set of causally related transactions within each of the one or more threads by a convenient ordering (i.e., chronologically, activity, post date, etc.) (block 726).

The method 700 then continues to FIG. 13B, where it determines if any of the plurality of transactions that occurred during the first time period are causally related to any other transactions from a second time period (block 730). If it is determined at the block 730 that there are no other causally related transactions from the second time period, the method 700 will display the identified plurality of transactions in a specified order such as, for example, chronological order, with the exception of transactions which are displayed as a thread based on the chosen sort (block 732).

If it is determined at the block 730 that any of the identified plurality of transactions are causally related to other transactions from the second time period, the method 700 may identify the causally related transactions that occurred during the second time period (block 732), group causally related transactions that occurred during the second time period into one or more threads (block 734), and sort the causally related transactions within each of the threads by a convenient ordering (i.e., chronologically, activity, post date, etc.) (block 736). The method 700 may then display at least a portion of the identified transactions from the first period in chronological order, with the exception of transactions which are displayed as a thread, based on the chosen sort, and further display the related transactions in the at least one thread as one or more links next to the transactions from the first time period (block 740).

An example of related transactions is a "refer-a-friend" program which provides an incentive to one member when they refer a friend, another consumer, to a business to sign up for some service. The referring member may be eligible for a special award (such as a cash bonus) when the friend takes an appropriate action, but not before then. Thus, there is a string of causally related transactions: first, the referral, next, the friend's action in registering, and finally, the special award in response to the friend's action.

As another example of related transactions, a credit card offer may provide that a consumer will get a special award, such as bonus points or a cash bonus, upon successfully applying for and being issued a credit card. In addition, the consumer may be eligible every month for points or cash for particular eligible purchases on the credit card. In addition, there may be other incentive offers tied to continued usage of the card, such as, for example, a special bonus if the card is used in each of the first three months. All of these transactions may be considered causally related, and thus form a single "thread." The credit card purchases may be individual unrelated transactions, but by virtue of the incentive offers attached to credit card activity, they are tied together as related activity insofar as the incentive offers are driven by them. A single thread of transactions of this type, then, might last for any amount of time or have any number of transactions within it, and may tie together transactions that might otherwise seem unrelated.

Securities statements from brokerage houses tend to show related items together, such as all positions in the same security with individual purchased lots and a sub-total showing the purchases. However, the sales of some of those same securities will not be grouped with the purchases into a complete "related transaction" thread. Those statements are balance statement groupings of asset descriptions rather than transaction statement groupings of related activity. In short, they show related groups of what an investor owns, not what the investor and the institution did. The concept of a transaction "thread" is precisely the grouping of related activity, where one activity causally is linked to another, not merely a grouping of similar items or a chronological ordering.

The concept of a "thread" is commonly used in email discussions where a topic is chosen by some initiating party (a person) and further discussions follow in response, in chains of discussion. Email tools make it easy for users to see all the related discussions on a "thread", including when and who posted each response and what the sequence of discussion was. This concept has not been applied, to date, to transaction processing in the context of account statements.

Some incentive offers and other types of "related" transactions may cross traditional accounting periods, such as calendar months. To understand all the related transactions, a consumer would typically have to view each separate monthly statement and possibly even write down the transactions into a unified sequence to understand the overall result. However, with the "threaded" account statement view, the related transactions can be brought together so that if any activity occurs on the thread in a specified or given accounting period, all activity for the thread can be shown together and sorted by any convenient ordering, such as the post dates of the transactions in the thread. As an example, someone might be eligible for incentive points on a purchase that took place on March 12 but the points may not be issued until April 15. The April statement typically would show just the points being issued, while the March statement shows just the purchase. The consumer and customer care representative both must work hard to stitch together what actually happened. A thread view does this stitching automatically.

Note that this idea is most useful in an online statement context, but is not necessarily restricted to online applications. A paper statement organized by threads could also be generated. Any transaction ID from within a thread could be used by a customer care representative to identify, in a customer care system, which thread that a consumer inquiry is about. This could be useful, for example, if a consumer makes an inquiry over the phone or by email.

The system traces the transaction ID to the thread as a whole and then the thread itself may be connected, via other transactions within the thread, to offer details, purchase activity, and any other relevant information or activity. Each transaction in the thread could contain both a post date (when it was included into the thread by the system) and an activity date (such as purchase date, return date, referral date, etc.).

In short, these concepts provide an integration of several powerful features into a unified useful whole. In particular, these concepts include combining, tracking, and displaying causally related transactions into "threads" in an account statement and providing a context for a consumer inquiry that pulls in offer details, actual transaction history, and the consumer's question with the minimum possible effort for both the consumer and customer care representative. Thus, a thread may reference information that goes beyond the traditional definition of a "transaction," such as "offer details" that a consumer is presented with. Therefore, the concepts provide a natural way of bringing all related transactions together for viewing, even when those transactions span a large period of time.

In traditional systems, online account statements do not provide a way of clicking on a transaction to directly inquire about it. Instead, a consumer is required to initiate an inquiry directly with a customer care form or window or through email or telephone, and the details of the transaction must be communicated by the consumer to the customer care agent. This creates the potential for miscommunication and the difficulty for the consumer to correctly specify the transaction of interest in an unambiguous way. It is for this reason that customer care agents typically ask the consumer what the date of the transaction is, and what the amount is, and then hopefully from that information they can identify the transaction context relevant to the consumer's inquiry. This takes time and is somewhat cumbersome and always involves a human being searching for the relevant information.

Figure 17:
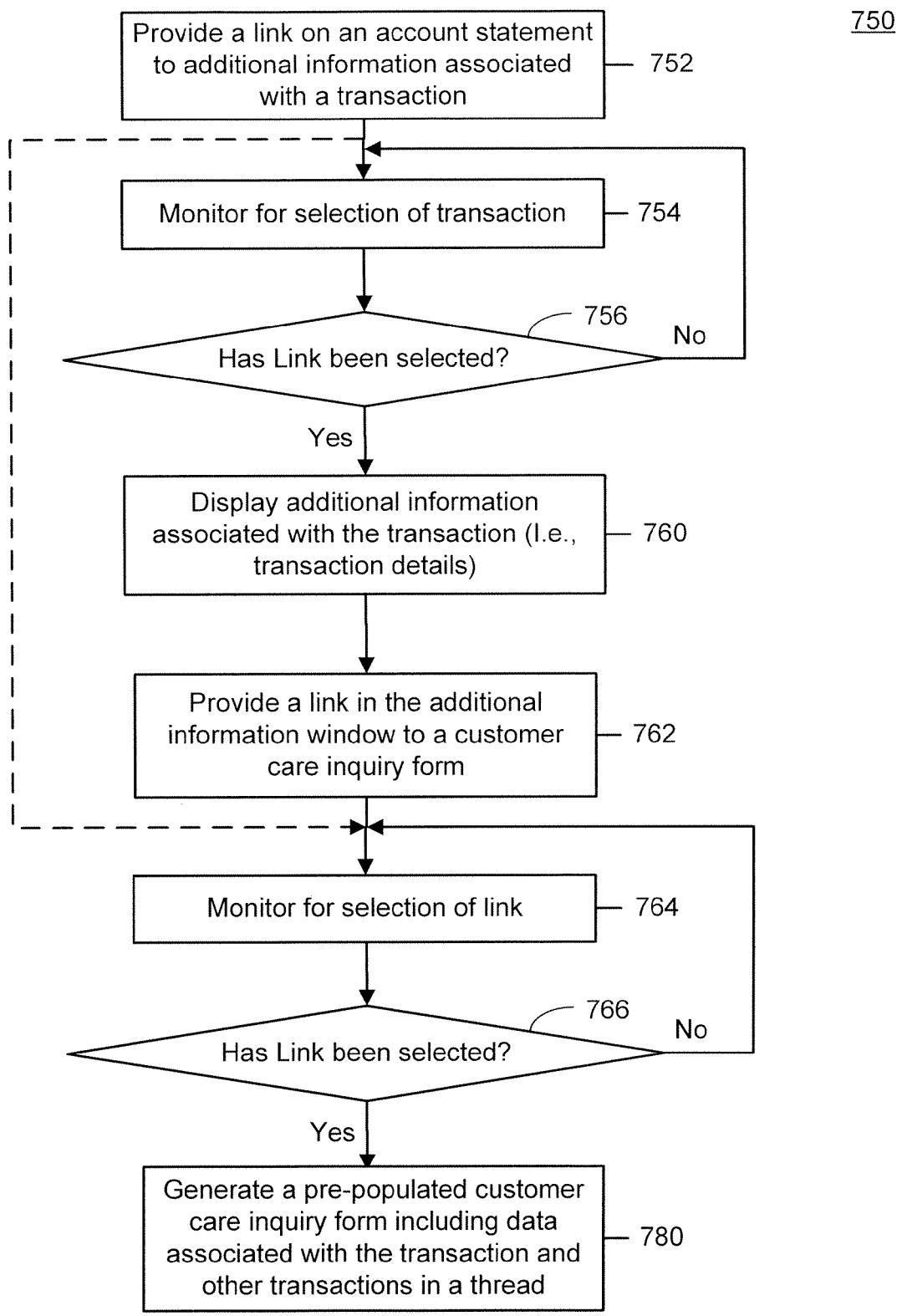
FIG. 17 is an exemplary flowchart illustrating several steps utilized in a method for generating a pre-populated customer care inquiry form for a specific transaction by clicking on an entry in an account statement.

A method of generating a pre-populated customer care inquiry form is shown in an exemplary embodiment which is illustrated in FIG. 17. The method 750 of FIG. 17 may be utilized in conjunction with any of the exemplary system architectures disclosed in FIGS. 1-3, 5, 7, and 8, as well as any other similar architecture. The method 750 is disclosed hereafter with reference to the components shown in FIG. 7, however one of ordinary skill in the art will appreciate that the method 750 could be implemented using the components from the embodiments disclosed in FIGS. 1-3, 5, 8, or any other similar embodiments. A screenshot 751 of a possible embodiment of a pre-populated customer care inquiry form is illustrated in FIG. 18.

Referring to FIG. 17, the method 750 may begin by providing a link on an account statement to additional information associated with a particular transaction (block 752) and monitoring for a selection of the particular transaction on an online account statement (block 754). The method 750 may then check to see if the link has been selected (block 756) and generate and display an additional information window after detection of the selection of the particular transaction, wherein the additional information window includes a set of detailed information associated with the particular transaction (block 760). The method 750 may include a customer care inquiry form link on the additional information window (block 762) and monitor for a selection of the customer care inquiry form link for the particular transaction (block 764).

The method 750 and then determined if the link has been selected at block 766, and thereafter generate a pre-populated customer care inquiry form after detection of the selection of the cost per care Inc. reform link, wherein generating the pre-populated customer care inquiry form includes retrieving and displaying a first set of data retrieved from a database, the first set of data associated with a particular transaction (block 780). A second set of data that is causally related to the particular transaction may also be retrieved from the database and displayed to the member. The type of data retrieved and displayed that is associated with the particular transaction may include, for example, an activity type, a post date, a transaction detail, an amount status, etc. A window may also be provided on the pre-populated customer care inquiry form to allow entry of a question related to the particular transaction.

As shown in FIG. 17, the method 750 may alternatively skip the generation and display of the additional information window and simply provide the link to the pre-populated customer care inquiry form directly on the account statement. This would enable the member to simply select a transaction displayed an account statement to generate the pre-populated customer care inquiry form.

As a simple example of the "offer" context that a thread provides relates to the credit card example discussed above. A consumer may successfully apply for and receive the credit card, but perhaps there is a system problem and the consumer was not awarded the bonus points for applying for the card. With the method 750, the consumer could view an account statement online showing the original application as a transaction (internally tied with the terms and conditions of the offer within the system, and possibly revealing those terms and conditions to the consumer as well) and the consumer could simply click on that transaction, or any transaction in the thread of transactions, and make an inquiry. A web form would pre-populated with details of the transaction thread of interest and the consumer could provide a comment explaining their question (for example: "Why didn't I get may signup bonus points?") In this way, the consumer need not communicate complicated details to customer care. They just click on the relevant part of the account statement (with all related transactions conveniently grouped together as a single thread) and provide their basic question. The system provides the thread context and the consumer's inquiry to the customer care representative who may then research the issue and respond.

Figure 19:
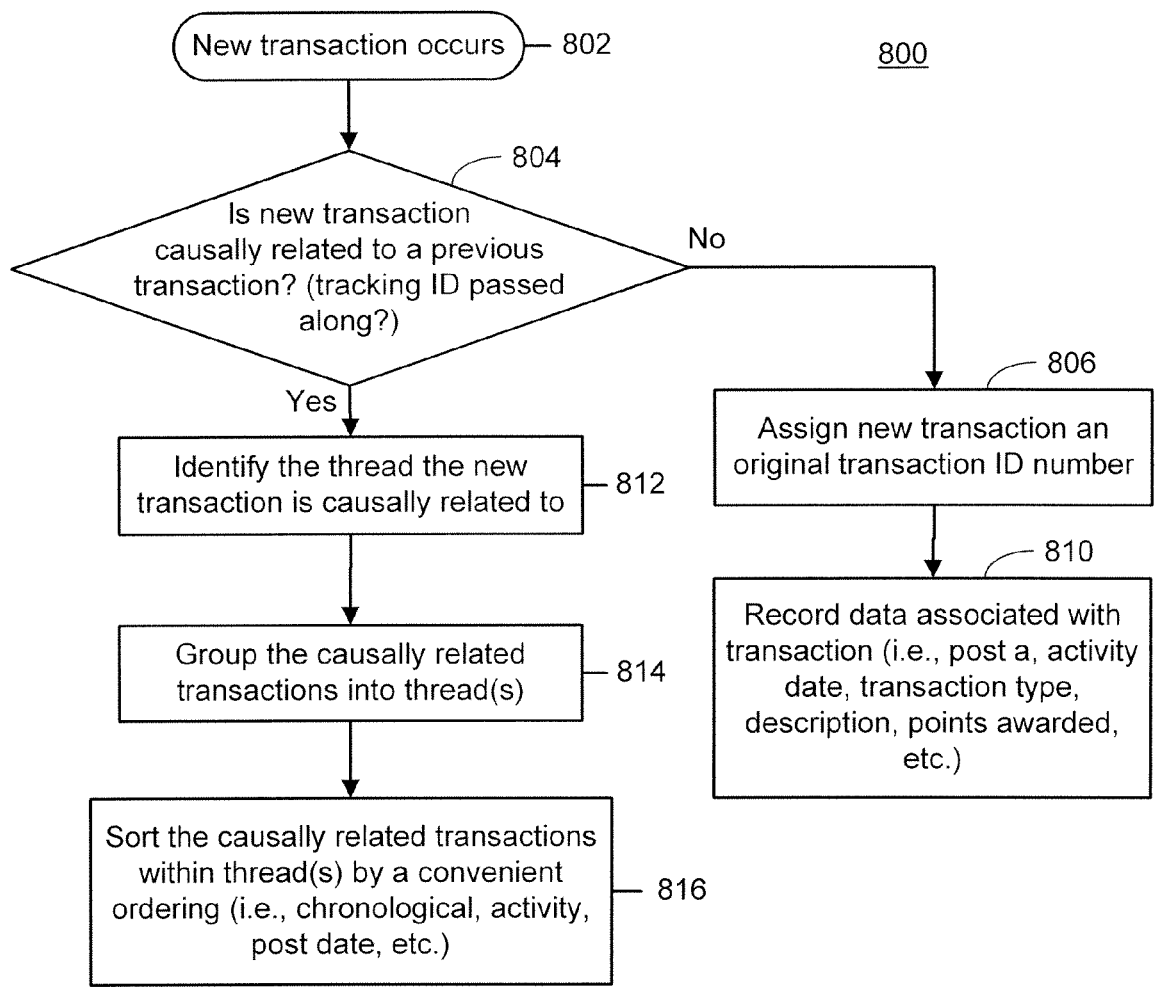
FIG. 19 is an exemplary flowchart illustrating several steps utilized in a method for tracking transactions.

A method of tracking transactions is shown in an exemplary embodiment which is illustrated in FIG. 19. The method 800 of FIG. 19 may begin when a new transaction occurs (block 802) and the method determines if the new transaction is causally related to a previous transaction by looking to see if a tracking ID was passed along (block 804). If it is determined at the block 804 that the new transaction is not causally related to a previous transaction, the method 800 will assign the new transaction an original transaction ID number (block 806) and record data associated with the new transaction such as, for example, post date, activity date, transaction type, description, points awarded, etc. (block 810).

If it is determined at the block 804 that the new transaction is causally related to a previous transaction, the method 800 will identify the thread that the new transaction is causally related to (block 812), group the causally related transactions into one or more threads (block 814), and sort the causally related transactions within each of the one or more threads by a convenient ordering (i.e., chronologically, activity, post date, etc.) (block 816).

As discussed above, the concept of a "tracking transaction" is one which initiates a thread. Typically, but not necessarily, this is a click transaction on an offer in an email or on a web site. Other examples include the initiation of some activity such as a consumer verifying ownership of an email account or initiating a referral of a friend. The tracking transaction may include a reference to terms and conditions of any associated offer or of the context of the thread as a whole.

As an example, a marketing cell may target some consumers with an offer to get 50 points for taking a survey. Another marketing cell may target a different set of consumers to take the same survey for 75 points. The terms and conditions for the thread of activity that follows will be determined by which offer a consumer receives and acknowledges, such as by clicking.

This provides two advantages over a non-threaded transaction. First, the tracking transaction for the thread provides confirmation to the consumer of the date and time they acknowledged the terms and, by the context of the thread, what the terms were. Second, if any adjustment is needed (for example if an incentive system were to fail to award the correct bonus or benefits to the consumer in response to an action they took according to the terms and conditions), customer care can make the adjustment simply by specifying the consumer's action and the system can then automatically apply the rules associated with the terms and conditions to generate any appropriate additional transactions.

As a specific example of these advantages, suppose a consumer who is a member of an online incentive program decides to take advantage of an offer to earn 3 points per dollar spent at an online store. Perhaps the usual offer is just 1 point per dollar, but by clicking on the offer, both the incentive program and the consumer are confirming the existence of an agreement to the offer of 3 points per dollar.

The incentive program then waits for confirmation of a purchase amount for the consumer from the online store. Reporting may not be perfect, however, and the online store may fail to accurately identify the consumer or their purchase amount to the incentive program, or may fail to do so in a timely manner as required by the terms and conditions. The consumer may have spent, say, $50, and is expecting 150 points. The click transaction confirms that they are entitled to the transaction but the purchase transaction fails to show up in the thread or shows an incorrect amount. Then the consumer clicks on the thread to issue an inquiry.

Customer care may request other evidence from the consumer of a qualifying purchase (for example a confirmation email or a receipt from the online store with a date consistent with the click transaction date). Upon receiving this evidence, customer care simply updates the purchase amount for that thread, indicating the actual purchase date and amount, and the system underlying the account statement can then apply the appropriate incentive rule to automatically award 150 points as required. The adjustment is indicated on the account statement as a member care adjustment and the system itself can keep track of how many adjustments (and the amounts) are associated with each separate incentive offer so that problematic merchants or offers can be identified (those with excessive adjustments). In short, the integrated ability to specify terms and conditions, represented visually and logically within a thread of transactions, provides a more robust way of completing a series of related transactions even when adjustments are needed.

By contrast, notice that if no click transaction were recorded, and if the usual incentive offer were 1 point per dollar, the consumer would have to remind customer care representative that they were offered a special 3 points per offer and they would have to provide some kind of evidence. Furthermore, customer care would have to enter both the purchase amount and the number of points for the incentive by computing it themselves.

When the offer is a simple multiple of points this may not seem so problematic, but incentive offers can be quite complex and may not be correctly adjusted by a typical customer care person. For example there may be some offers which can earn points for only one purchase per day rather than earning points for every purchase. In this case, the customer care person would have to research whether any other purchases had already qualified for an incentive on the day which needs to be adjusted to be sure they follow the rules. Other complexities could arise as well.

For example the number of points might be determined by a tiered arrangement where purchases between different target ranges earn different numbers of points. The offer also might be restricted by date range (for example only purchases between two given dates) or by type of product. By automating the terms and conditions as a set of rules and connecting them to a thread of activity with a click transaction or similar tracking transaction, the system can automatically follow the correct rules when making an adjustment even when the offer is complex and depends on other transaction history. Thus customer care need only enter the consumer action which had failed to be reported correctly (such as a purchase amount) and the system can take care of generating all the rest of the transactions correctly.

Transactions can be any kind of activity and need not be restricted to financial transactions. Besides a purchase or a return, a transaction can be a referral of a friend to a service. It can be the act of registering or subscribing for something, or agreeing to some terms and conditions for an offer, or sending a message, or searching for something (such as an online search). It can be the act of granting some kind of permission (for example to send email to the consumer or to use the consumer's personal information in some way).

The account statement can show a restricted time view to simplify the view and to reduce the computational overhead and delay associated with obtaining the related records and displaying them. For example an account statement might show just one week at a time or one month at a time. In each case, every thread which has at least one transaction occurring (or posting) within the given time period, will be displayed on the account statement for that period. Only the transactions that actually occur in the time period will be shown, however. If any transactions on the thread do not occur in the time period shown, then (in an online version of the account statement) there can be an additional link or command, possibly titled "See all related transactions", which shows a view of all of the transactions for the given thread, either within the same page (by expanding the page) or on a separate page.

Examples of Account Statements:

Week of Apr. 1, 2006 to Apr. 7, 2006:

|   | Post Date | Description | Amount Notes |
|---|---|---|---|
| Clickthru | May 1, 2006 | Home Depot | 3 points per dollar offer |
| Purchase | May 3, 2006 | Home Depot | $50.00 (purchase on May 1, 2006) |
| Reward | May 3, 2006 | Home Depot offer | +150 points (pending until Jun. 3, 2006) |
| Reversal | May 5, 2006 | Home Depot | −$20.00 (reversal on May 5, 2006) |
| Reward | May 5, 2006 | Home Depot offer | −60 points (pending until Jun. 3, 2006) |
|   |   | >>>VISA Credit Card Offer |   |
| Applied | May 7, 2006 | VISA credit card | 1000 bonus points 1 point per dollar |
|   |   | <See all related transactions> |   |

| | Post Date | Description | Amount Notes |
|---|---|---|---|
| Referral | May 7, 2006 | Refer-a-friend | 200 points for successful referral |
| Referred | May 7, 2006 | Referred joe@mypoints.com | |

The VISA card thread has more transactions. Clicking will take you to a view of ALL of the transactions for the thread:

| Clickthru | Mar. 17, 2006 | VISA Credit Card Offer |
|---|---|---|
| Applied | May 7, 2006 | VISA credit card 1000 bonus points 1 point per dollar |
| Issued | May 8, 2006 | Credit card issued |
| Reward | May 8, 2006 | VISA signup bonus +1000 points (pending until Jun. 8, 2006) |
| Purchase | Jun. 3, 2006 | VISA monthly spending $580.00 (spend May 7, 2006-Jun. 1, 2006) |
| Reward | Jun. 3, 2006 | VISA monthly spending reward +580 points (pending until Jul. 3, 2006) |

In the example below, most dates are dates the item is posted to the system. Where different, the actual "action" date is also indicated (such as the purchase date). If member services is viewing the statement, clicking on the CLICKTHRU word then shows a view of the rules for the campaign. Clicking on the transaction number allows an adjustment of that item. For example below, clicking on the "Purchase" transaction 8674854 takes member care to a view that allows a positive or negative amount to be used to adjust the total purchase amount. If they do so, an adjustment line shows and points may be added or removed.

Each grouping is a "thread". VERIFY and CLICKTHRU are two examples of "tracking" transactions that can act as the anchor for a thread.

transaction information relating to billing/revenue/expenses/ etc.). The "Revenue" item above is an example, showing that MyPoints earned $35.00 because the member was approved for the credit card, and for Avon we earned a 10% commission, and we had a $1.25 expense payable to the source from whom we acquired the member after the member activated their account.

Figure 20:
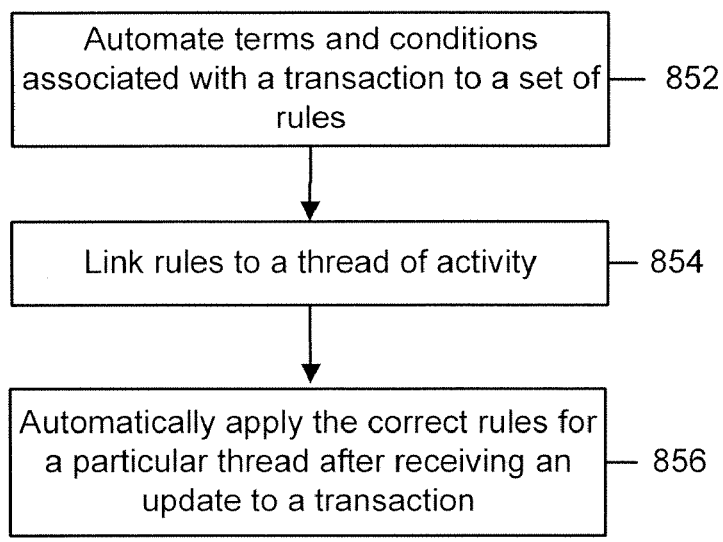
FIG. 20 is an exemplary flowchart illustrating several steps utilized in a method for automating terms and conditions as a set of rules and connecting them to a thread of activity.

FIG. 20 illustrates exemplary embodiment of a flow chart 850 that may be used to link a set of rules to a thread of activity. The method 850 may automate the terms and conditions for an offer as a set of rules (block 852), linking the set of rules to a transaction and linking the transaction to one or more causally related transactions (block 854). The method 850 may also configure a system to automatically follow the correct set of rules when adjustment to an activity is made by a customer care representative (block 856).

Figure 21:
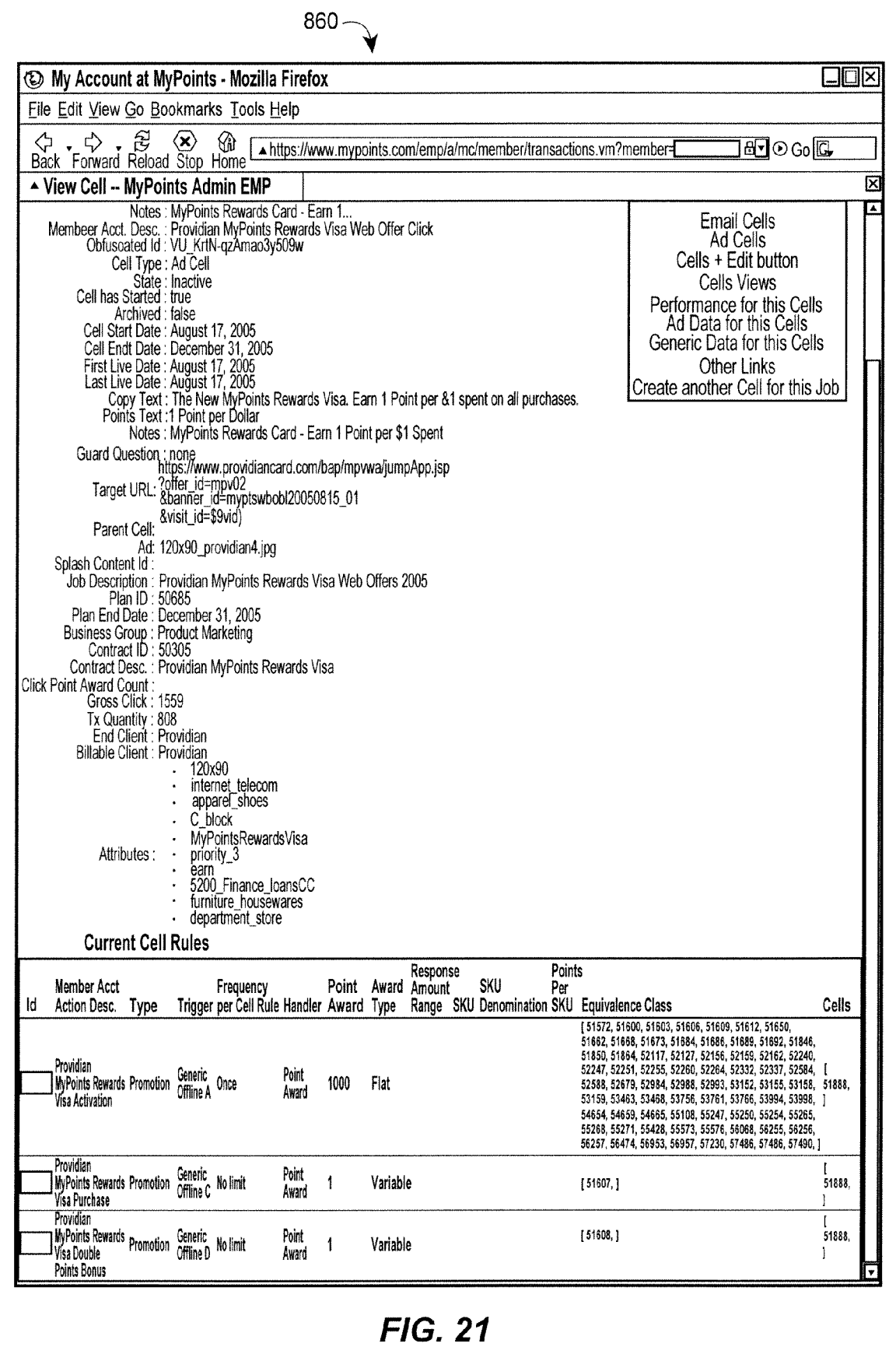

A screenshot 860 of an exemplary embodiment of an account statement showing campaign rule details for a cell is illustrated in FIG. 21. A screenshot 870 of an exemplary embodiment of an account statement showing a particular item in a thread selected for an adjustment is illustrated in FIG. 22. A screenshot 880 of an exemplary embodiment of an account statement showing a member with an adjustment is illustrated in FIG. 23.

The system may track member transactions in a variety of ways and these transactions are processed to give point awards to members and to record "achieved quantities" for billing purposes. There are several sources of transaction

| VERIFY | 49992040 | May 1, 2006 | Verified Email Address through Email Link |
|---|---|---|---|
| Expense | 9940342 | May 1, 2006 | Bounty to Co-Reg Partner –$1.25 |
| Earn | 99049320 | May 1, 2006 | Points for activating account +100 points |
| CLICKTHRU | 4323434 | May 5, 2006 | Avon Special Offer |
| Earn | 2343266 | May 5, 2006 | Email click points +5 points |
| Purchase | 8674854 | May 12, 2006 | Avon purchase $126.50 (purchase on May 5, 2006) |
| Revenue | 7812303 | May 12, 2006 | Avon commission $12.65 |
| Earn | 9969994 | May 12, 2006 | Avon purchase points +252 points |
| CLICKTHRU | | May 5, 2006 | VISA Credit Card Offer |
| Action | 5994935 | May 20, 2006 | Approved for card (action on May 18, 2006) |
| Revenue | 9400324 | May 20, 2006 | Bounty for new card holder $35.00 |
| Earn | 8594993 | May 20, 2006 | Approval bonus +1000 points |
| Purchase | 9956345 | Jun. 10, 2006 | VISA monthly spending +$803.00 (purchase on Jun. 1, 2006) |
| Earn | 7748834 | Jun. 10, 2006 | Monthly spend points +1600 points |
| Purchase | 4399943 | Jun. 11, 2006 | Double points spending $100.00 |
| Earn | 4399402 | Jun. 11, 2006 | Double points +200 points |
| Adjust | 9950043 joseph | Jun. 15, 2006 | VISA monthly spending +$50.00 |
| PointAdjust | 8949324 joseph | Jun. 15, 2006 | Monthly spend points +100 points |
| Purchase | 3230404 | Jul. 10, 2006 | VISA monthly spending +$654.30 (purchase on Jul. 1, 2006) |
| Earn | 5439854 | Jul. 10, 2006 | Monthly spend points +1308 points |

In the above example, joseph is the indicator that member care had a user named joseph who made the adjustment to the member's VISA monthly spending.

The member's view is similar, except that the member care person's name is not displayed (an asterisk is shown instead, with a footnote saying it means a member care adjustment). And . . . clicking on the CLICKTHRU doesn't show the campaign rules. Instead it shows a pre-filled member care inquiry form. Also some items in a thread may be hidden from members but shown to member care (for example internal events: Click-thrus, ShopStream proxied transactions, Real-time posting to EMP through http links, Offline files that are uploaded, Offline files that are pulled by EMP from third party sites (such as clients), Aggregator reports that are pulled (from the shopping affiliate networks.

Transaction processing may be affected by the nature of the source. For example, exactly how reversals and adjustments are processed may depend on how reversal or adjustment transactions are reported by each source. Transaction processing may also affected by the rules set up for each campaign. There may be job rules that determine the recognition of billable activity and cell rules that determine, for example, point awards that should be issued. The plan for a campaign can also affect some kinds of billable activity tracking (in particular for quantity tiering).

Any member activity which is tracked, awarded points, and/or billed for, must be quantified in some way. The system provides a general way of tracking member activities, but some kinds of activities are so common that there are special cases to make them more explicit. In particular, purchase transactions are amongst the most common activities tracked and special handling is provided for them, but any kind of member activity could potentially be recorded if there is a way to report it to the system.

Activities can be tracked by the fact that some event occurred (a "response") or they can be tracked by the amount of some activity, such as a purchase amount. The particular kind of activity is labeled by a BillingUnit. Billing Units which begin with the word "Response" count the number of actions taken by the member, such as the number of registrations or the number of purchases. Note that it often corresponds to the number of records reported back by a client, but not necessarily. In particular, a client may optionally provide an order ID for an activity along with an amount. This allows the client to make adjustments to the amount by reporting additional records with the same order ID. For example a purchase may be adjusted up or down, including complete reversal of the purchase. Such an "order" need not be a purchase in dollars, however. It could just as well be the number of phone minutes consumed by the member in a month, with a unique order ID each month, and with the possibility that the total minutes for that unique (monthly) order might be adjusted up or down.

Activity quantities, in general, are called either "Estimated quantities" for projecting how much activity will occur, or "Achieved quantities" for how much activity actually occurred and was successfully recorded into the system. There are also "Planned quantities" which are agreed to with a client for a particular campaign and documented in Insertion Orders and Plans. As a campaign is executed, one or more jobs carve out some portion of the planned quantity as an estimated quantity for that particular job.

When the activity is a purchase, the BillingUnit may be either "Response(Purchase in Dollars)" or "Dollars Spent". Response(Purchase in Dollars) indicates that the quantity being tracked is the NUMBER of purchases while "Dollars Spent" indicates that the quantity being tracked is the TOTAL PURCHASE AMOUNT IN DOLLARS of purchases.

When the activity is a simple event, such as registering on a web site, the BillingUnit is Response(Event). No amount is associated with an event. An activity may also have an amount of points, so the BillingUnit is either Response(Points) or just "Points" depending on whether the point amount is counted as the quantity or whether the fact that an award of points was given counts as the quantity.

Finally, the system supports arbitrary units for the amount by the BillingUnit Response(Units) or just "Units". In this case, the admin user of the system can specify a word to use for the units name on account statements and in reporting. For example one might specify that the BillingUnit label is "Minutes" for phone minutes consumed.

The basic accounting rule for the amount of revenue is governed by a simple formula. REVENUE=PRICE×QUANTITY Estimated revenue is the price (based on the BillingUnit) times the estimated quantity (measured in the BillingUnit). Achieved revenue is the price times the achieved quantity.

A plan specifies the expected levels of activity for different kinds of transactions and what the consequences will be: revenue that should be recognized, bounties that need to be paid, and point costs and other costs (labor for example). A plan can be broken down into groups. For example different email campaigns may be kept distinct in a single plan by having different groups with plan line items that otherwise might be confusingly similar.

Note, however, that if there is a plan-wide constraint or target, such as different pricing in quantity tiered billing, then there must be just a single plan line item which tracks it, even if it represents the combined result of the activity from several other groups in the plan. This is because the billing reports use the plan line items to correctly add up all the corresponding activity. Different plan line items in different groups would otherwise not be added up together and counted towards a single quantity tier structure.

Job line items include a description, a trigger (specifying a kind of event that triggers application of the job rule), a dollar amount (the "price" for each billable activity), and a billing unit. The estimated quantity is typically a subset of the quantity from the plan line item that the job line item corresponds to. Both the estimated and achieved quantities have different meanings depending on the billing units in the job rule. Furthermore, the way that "conversions" are displayed in account statements (for both member care and for the member) depend on the billing units.

Each job rule may be limited or unlimited. If it is unlimited, then revenue transactions are generated even if the estimated quantity is reached and surpassed. If it is limited, then revenue transactions are still generated for each qualifying conversion, but the amount in the revenue transaction is forced to be $0.

Each job rule has a "frequency" indicating how many times a billable activity may occur for each member. Frequency unlimited means all conversions are billable; frequency daily means only one conversion per day per member is billable (the first one processed, whichever that may be), where the particular day is based on the "action date" of the conversion record. For some sources, the action date is "today" because they are of a real-time nature (ShopStream proxy, real-time events to the system, etc.) but for others (such as aggregators or offline files), the action date is provided with the record of the transaction by the client. It is a required field but may not be accurate, depending on the client. Finally, a job rule frequency may be "once": only the first transaction processed is billable per member. Note that the system specifically does not attempt to find the "largest" billable transaction or any other optimization. For example if the member were to make two purchases at, say, $10 and $20, and the job rule frequency is ONCE, and the job rule is set up as a revshare of 5%, then if the $10 purchase gets processed first, then 5% of $10 will be recognized as a billable amount, not 5% of $20.

The billing units are used in plans and jobs to describe the kind of action which is being tracked. The billing units permitted may be restricted depending on what kind of job rule or plan line item is being created (for example what trigger is specified). Despite the name "billing unit" they are also used for purely tracking purposes in some cases, and for expense items (bounties payable) in others.

The basic unit is a Response which simply means that the member did something that a client, or the system, tracked. The quantity associated with any billing unit called "response" is the number of responses, one for each tracked item. For response billing units, the amount in parentheses indicates what kind of response it was so that the amounts may be properly interpreted on account statements and in campaign reports.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method for providing the appearance of a single data repository for queries initiated in a system incorporating distributed member server groups comprising:
   distributing a dataset to a plurality of data repositories;
   performing a query at the plurality of data repositories for a first number of satisfying records equal to a maximum number of displayable records, wherein a total number of records in the dataset satisfying the query is greater than the returned set of satisfying records;
   displaying the first number of satisfying records returned by the first query in a page;
   displaying a plurality of links to additional pages, wherein each link represents another number of satisfying records in the dataset other than the first number of satisfying records returned by the first query;
   establishing a location of each number of satisfying records in the dataset other than the returned set of satisfying records based on meta data of the first number of satisfying records returned by the first query;
   performing a second query upon selection of a link, the second query for a second number of satisfying records equal to the maximum number of displayable records, the second query returning the second number of satisfying records from the plurality of data repositories using the established location, wherein the second number of satisfying records is equal to at most the first number of satisfying records; and
   discarding an excess number of satisfying records, wherein the excess number of satisfying records is equal to the difference between one of the first or second number of satisfying records and a maximum number of satisfying records displayable on each page;
   identifying a subsequent query starting point from information related to the second number of satisfying records, including:
      modifying information associated with a location of the second number of satisfying records, the information including satisfying record metadata;
      wherein the satisfying record metadata includes at least one of a last member identifier, a last member record location identifier, or a data repository identifier;
      identifying a next record location at each of the plurality of data repositories from the modified satisfying record metadata; and
      beginning a next query at the next record location at each of the plurality of data repositories.

2. The method of claim 1, further comprising displaying a number of satisfying records from the second number of satisfying records;
   wherein the number of satisfying records from the second number of satisfying records is equal to at most a satisfying record displayable limit.

3. The method of claim 1, wherein the second number of satisfying records is equal to a combined total of a number of satisfying records from each of the plurality of data repositories.

4. The method of claim 2, wherein the satisfying record displayable limit includes a default value.

5. The method of claim 1, wherein querying the plurality of data repositories for a first number of satisfying records comprises dispatching an application control thread to the plurality of data repositories, the application control thread performing a query at the plurality of data repositories.

6. The method of claim 1, wherein returning a second number of satisfying records from the plurality of data repositories comprises:
   combining the second number of satisfying records from the a plurality of data repositories into a query result; and
   sorting the query result.

7. The method of claim 1, wherein returning a second number of satisfying records from the plurality of data repositories comprises segregating at least one of a new satisfying record or a changed satisfying record from the second number of satisfying records.

8. The method of claim 1,
   wherein the excess number of satisfying records is equal to the difference between the second number of satisfying records and the number of displayable records; and
   wherein the excess number of satisfying records comprises at least one of a previous page of displayable records or a subsequent page of displayable records.

9. The method of claim 1, wherein performing a query at the plurality of data repositories for a first number of satisfying records further comprises:
   determining a query starting point, the query starting point corresponding to a member of a set of all satisfying records on the plurality of data repositories;
   determining an arbitrary starting point record identifier, the arbitrary starting point record identifier residing on a first data repository of the plurality of data repositories;
   wherein the total number of satisfying records residing on the plurality of data repositories at a position relative to the arbitrary starting point record identifier is equal to a number of records corresponding to the query starting point; and
   retrieving an ordered set of satisfying records from the first data repository and a second data repository, the ordered set beginning with a satisfying record corresponding to the query starting point.

10. The method of claim 9, further comprising storing the information associated with the location of the second number of satisfying records.

11. The method of claim 1, further comprising determining a satisfying record displayable limit.

12. The method of claim 11, wherein determining the satisfying record displayable limit comprises:
   assessing at least one system performance parameter, the at least one system performance parameter including at least one of an amount of available system resources, or an amount of memory allotted to complete a combine and sort function;
   determining the satisfying record displayable limit based on the at least one system performance parameter.

13. The method of claim 12, further comprising completing the combine and sort function on the second number of satisfying records if the at least one system performance parameter includes at least one of an amount of available system resources or an amount of memory allotted to complete a combine and sort function.

* * * * *